(12) United States Patent
Mowry

(10) Patent No.: US 10,341,558 B2
(45) Date of Patent: Jul. 2, 2019

(54) SYSTEM AND APPARATUS FOR INCREASING QUALITY AND EFFICIENCY OF FILM CAPTURE AND METHODS OF USE THEREOF

(71) Applicant: Craig P. Mowry, Southampton, NY (US)

(72) Inventor: Craig P. Mowry, Southampton, NY (US)

( * ) Notice: Subject to any disclaimer, the term of this patent is extended or adjusted under 35 U.S.C. 154(b) by 53 days.

(21) Appl. No.: 15/419,810

(22) Filed: Jan. 30, 2017

(65) Prior Publication Data

US 2017/0208248 A1 Jul. 20, 2017

Related U.S. Application Data

(63) Continuation-in-part of application No. 14/886,820, filed on Oct. 19, 2015, now abandoned, which is a continuation of application No. 13/646,417, filed on Oct. 5, 2012, now Pat. No. 9,167,154, which is a continuation of application No. 11/611,793, filed on Dec. 15, 2006, now Pat. No. 8,319,884, which is a continuation-in-part of application No. 11/510,091, filed on Aug. 25, 2006, now abandoned, application No. 15/419,810, which is a continuation-in-part of application No. 14/068,883, filed on Oct. 31, 2013, now abandoned, which is a continuation of application No. 13/464,347, filed on May 4, 2012,
(Continued)

(51) Int. Cl.
| | |
|---|---|
| *G06T 7/73* | (2017.01) |
| *G03B 17/00* | (2006.01) |
| *G03B 17/17* | (2006.01) |
| *G03B 17/24* | (2006.01) |
| *G03B 17/48* | (2006.01) |
| *G03B 19/00* | (2006.01) |
| *G03B 35/00* | (2006.01) |
| *G06T 11/60* | (2006.01) |
| *H04N 5/232* | (2006.01) |

(52) U.S. Cl.
CPC ........ *H04N 5/23232* (2013.01); *G03B 17/00* (2013.01); *G03B 17/17* (2013.01); *G03B 17/24* (2013.01); *G03B 17/48* (2013.01); *G03B 19/00* (2013.01); *G06T 7/74* (2017.01); *G06T 11/60* (2013.01); *G03B 35/00* (2013.01)

(58) Field of Classification Search
CPC ........ H04N 5/23232; H04N 1/23; G06T 7/74; G06T 11/60; G03B 17/00; G03B 17/17; G03B 17/24; G03B 17/48; G03B 19/00
USPC ..................................................... 348/222.1
See application file for complete search history.

(56) References Cited

U.S. PATENT DOCUMENTS

| | | | | |
|---|---|---|---|---|
| 5,063,603 A | * | 11/1991 | Burt .................... | G06K 9/00255 382/115 |
| 5,999,194 A | * | 12/1999 | Brunelle ................ | G06T 13/80 345/470 |

(Continued)

*Primary Examiner* — Pritham D Prabhakher
(74) *Attorney, Agent, or Firm* — Leason Ellis LLP

(57) ABSTRACT

A system, apparatus, or method is provided for imaging and for capturing visuals to provide image manipulation options for increasing resolution of subject images. A system, apparatus or method for increasing resolution of subject images using a camera to deliver unexposed photographic emulsion or a digital image and to generate images of greater resolution by modifying digital images or modifying digital and emulsion images.

11 Claims, 47 Drawing Sheets

That knows the POSITION of everything in the image

Related U.S. Application Data now Pat. No. 8,599,297, which is a continuation of application No. 11/447,406, filed on Jun. 5, 2006, now Pat. No. 8,194,168, application No. 15/419,810, which is a continuation-in-part of application No. 15/174,781, filed on Jun. 6, 2016, now abandoned, which is a continuation of application No. 14/469,170, filed on Aug. 26, 2014, now abandoned, application No. 15/419,810, which is a continuation-in-part of application No. 14/989,596, filed on Jan. 6, 2016, now abandoned, which is a continuation-in-part of application No. 14/861,646, filed on Sep. 22, 2015, now abandoned.

(60) Provisional application No. 62/292,756, filed on Feb. 8, 2016, provisional application No. 62/319,541, filed on Apr. 7, 2016, provisional application No. 60/750,912, filed on Dec. 15, 2005, provisional application No. 60/739,881, filed on Nov. 25, 2005, provisional application No. 60/739,142, filed on Nov. 22, 2005, provisional application No. 60/732,347, filed on Oct. 31, 2005, provisional application No. 60/727,538, filed on Oct. 16, 2005, provisional application No. 60/712,189, filed on Aug. 29, 2005, provisional application No. 60/710,868, filed on Aug. 25, 2005, provisional application No. 60/711,345, filed on Aug. 25, 2005, provisional application No. 60/702,910, filed on Jul. 27, 2005, provisional application No. 60/701,424, filed on Jul. 22, 2005, provisional application No. 60/696,829, filed on Jul. 6, 2005, provisional application No. 60/693,011, filed on Jun. 22, 2005, provisional application No. 60/692,501, filed on Jun. 21, 2005, provisional application No. 60/692,502, filed on Jun. 21, 2005, provisional application No. 60/688,454, filed on Jun. 9, 2005, provisional application No. 60/686,883, filed on Jun. 3, 2005, provisional application No. 61/869,832, filed on Aug. 26, 2013, provisional application No. 61/871,650, filed on Aug. 29, 2013, provisional application No. 62/053,438, filed on Sep. 22, 2014, provisional application No. 62/129,550, filed on Mar. 6, 2015, provisional application No. 62/143,663, filed on Apr. 6, 2015, provisional application No. 62/175,830, filed on Jun. 15, 2015.

(56) References Cited

U.S. PATENT DOCUMENTS

| | | | | |
|---|---|---|---|---|
| 6,011,901 A * | 1/2000 | Kirsten | ............ | G08B 13/19645 348/E7.086 |
| 6,496,607 B1 * | 12/2002 | Krishnamurthy | ...... | H04N 19/46 375/E7.082 |
| 6,559,923 B2 * | 5/2003 | Iwaki | ..................... | G03B 27/52 355/40 |
| 7,301,568 B2 * | 11/2007 | Smith | .................... | G03B 15/08 348/231.3 |
| 7,321,400 B1 * | 1/2008 | Chou | ..................... | H04N 7/012 348/448 |
| 7,443,447 B2 * | 10/2008 | Shirakawa | ........... | H04N 5/2251 348/262 |
| 7,489,303 B1 * | 2/2009 | Pryor | .................... | B60K 35/00 345/173 |
| 7,751,628 B1 * | 7/2010 | Reisman | .............. | G11B 27/034 382/232 |
| 8,135,261 B1 * | 3/2012 | Black | .................... | H04N 9/8205 386/239 |
| 2003/0133019 A1 * | 7/2003 | Higurashi | ............. | G06T 3/0081 348/218.1 |
| 2004/0027465 A1 * | 2/2004 | Smith | .................... | G03B 15/08 348/231.3 |
| 2005/0259888 A1 * | 11/2005 | Ozluturk | ............ | H04N 5/23248 382/260 |
| 2005/0275747 A1 * | 12/2005 | Nayar | .................. | H04N 5/2351 348/362 |
| 2006/0165179 A1 * | 7/2006 | Feuer | ....................... | H04N 7/01 375/240.18 |
| 2007/0036467 A1 * | 2/2007 | Coleman | ............... | G06T 3/4061 382/294 |
| 2007/0098381 A1 * | 5/2007 | Oshima | ................ | H04N 3/1575 396/52 |
| 2011/0043315 A1 * | 2/2011 | Kobayashi | .......... | H01F 27/2828 336/192 |

* cited by examiner

LENS IMAGE (light gathered)

LENS, whether one lens or two

CAMERA housing

UNEXPOSED film provided horizontally to the gate(s)
EXPOSED film returned to magazine
SINGLE or DOUBLE gate area

EXPOSURE AREA

FILM CONTAINMENT/MAGAZINE
OPTICS/MIRRORING and/or OTHER LENS IMAGE RELAYING/DIVERSION
ROLLERS or other means to turn film stock 90 degrees
BEAM SPLITTER or ROTATING MIRROR or other means to provide lens image simultaneously or sequentially to two gates

DRAWING 3

TV ratio film gate setting

HIGH DEF monitor ratio setting

Conventional cinema ratio setting

Wide-screen cinema setting

Figure 7

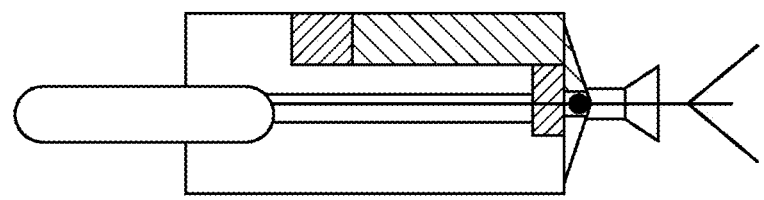
TOP VIEW OF CAM AND HORIZ MAGAZINE
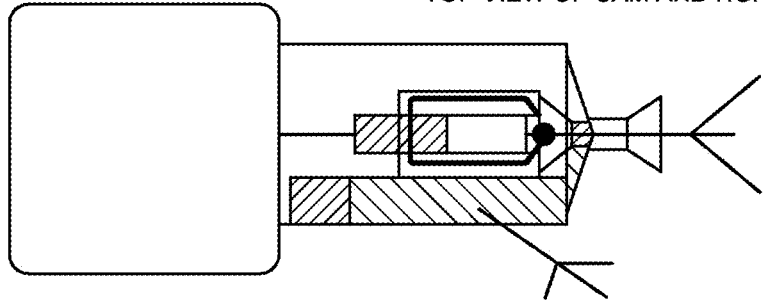
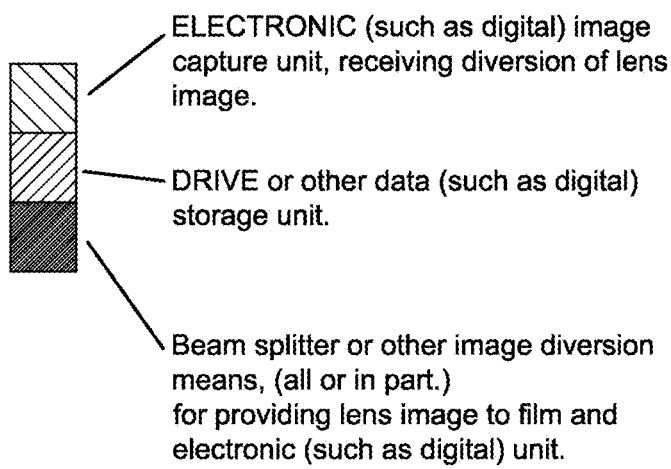
ELECTRONIC (such as digital) image capture unit, receiving diversion of lens image.
DRIVE or other data (such as digital) storage unit.
Beam splitter or other image diversion means, (all or in part.) for providing lens image to film and electronic (such as digital) unit.
Figure 10

From one or more vantage points

Figure 33B
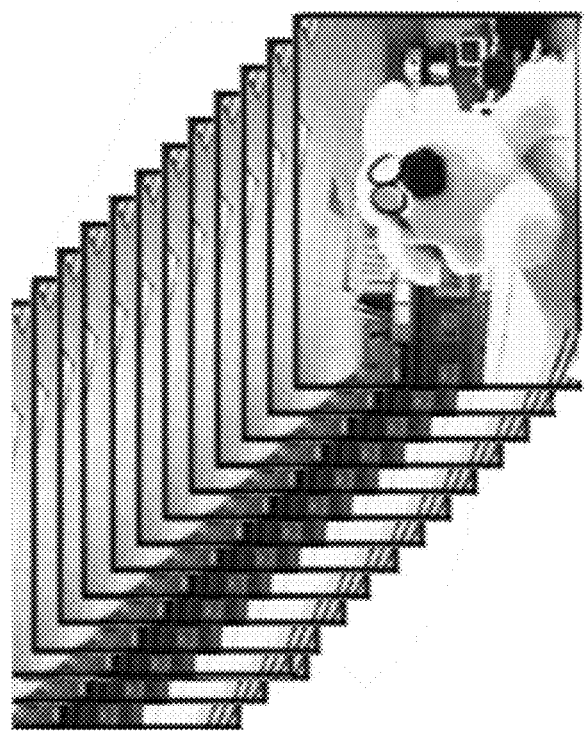
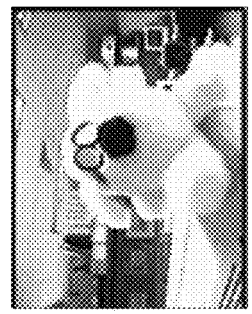
To seamlessly create 24 frames per second equally high res images

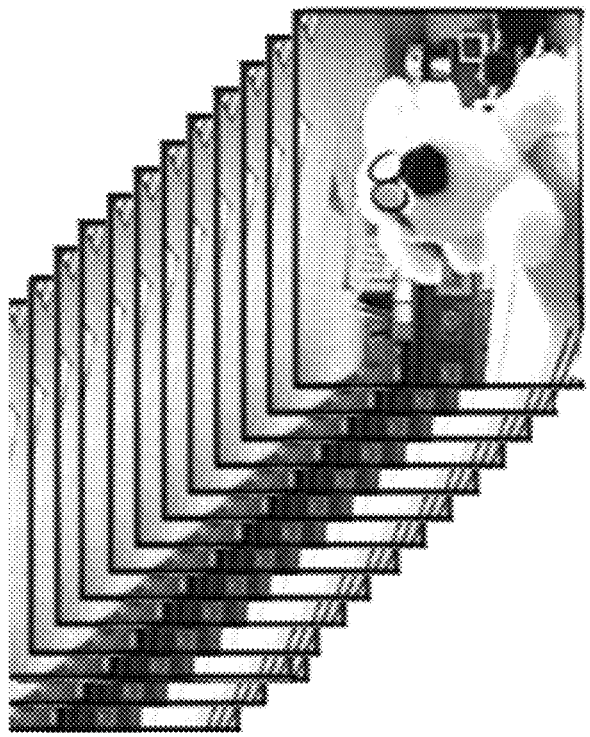
Referred to herein as key frame "expansion" because it's a better, *anti-compression* solution to data capture, storing and transmitting efficiency
Figure 33C

Working together, wirelessly...

Where you can move through the crowd, in real, frozen or slowed time, to experience the event

SYSTEM AND APPARATUS FOR INCREASING QUALITY AND EFFICIENCY OF FILM CAPTURE AND METHODS OF USE THEREOF

CROSS-REFERENCE TO RELATED APPLICATIONS

This application claims priority to and is based on U.S. Patent Application Ser. No. 62/292,756, entitled "COLLABORATIVE AND VARIABLE IMAGING SYSTEM AND METHOD," filed Feb. 8, 2016.

This application claims priority to and is based on U.S. Patent Application Ser. No. 62/319,541, entitled "SYSTEM AND METHOD FOR CROWD SOURCED IMAGING," filed Apr. 7, 2016.

This application claims priority to and is based on U.S. patent application Ser. No. 14/886,820, entitled "SYSTEM AND APPARATUS FOR INCREASING QUALITY AND EFFICIENCY OF FILM CAPTURE AND METHODS OF USE THEREOF," filed Oct. 19, 2015. U.S. patent application Ser. No. 14/886,820 claims priority to U.S. patent application Ser. No. 13/646,417, entitled "SYSTEM AND APPARATUS FOR INCREASING QUALITY AND EFFICIENCY OF FILM CAPTURE AND METHODS OF USE THEREOF," filed Oct. 5, 2012, now U.S. Pat. No. 9,167,154, issued Oct. 20, 2015, which is based on U.S. patent application Ser. No. 11/611,793, entitled "SYSTEM AND APPARATUS FOR INCREASING QUALITY AND EFFICIENCY OF FILM CAPTURE AND METHODS OF USE THEREOF," filed Dec. 15, 2006, now U.S. Pat. No. 8,319,884, issued Nov. 27, 2012, which is based on U.S. patent application Ser. No. 11/510,091, entitled "SYSTEM AND APPARATUS FOR INCREASING QUALITY AND EFFICIENCY OF FILM CAPTURE AND METHODS OF USE THEREOF," filed Aug. 25, 2006, which is based on U.S. Patent Application Ser. No. 60/750,912, entitled "METHOD, SYSTEM AND APPARATUS FOR INCREASING QUALITY AND EFFICIENCY OF FILM CAPTURE," filed Dec. 15, 2005.

This application claims priority to and is based on U.S. patent application Ser. No. 14/068,883, entitled "MULTI-DIMENSIONAL IMAGING SYSTEM AND METHOD," filed Oct. 31, 2013. U.S. patent application Ser. No. 14/068,883 claims priority to U.S. patent application Ser. No. 13/464,347, entitled "MULTI-DIMENSIONAL IMAGING SYSTEM AND METHOD," filed May 4, 2012, now U.S. Pat. No. 8,599,297, issued Dec. 3, 2013, which is based on U.S. patent application Ser. No. 11/447,406, entitled "MULTI-DIMENSIONAL IMAGING SYSTEM AND METHOD," filed Jun. 5, 2006, now U.S. Pat. No. 8,194,168, issued Jun. 5, 2012, which is based on: U.S. Patent Application Ser. No. 60/750,912, entitled "METHOD, SYSTEM AND APPARATUS FOR INCREASING QUALITY AND EFFICIENCY OF FILM CAPTURE," filed Dec. 15, 2005; U.S. Patent Application Ser. No. 60/739,881, entitled "SYSTEM AND METHOD FOR VARIABLE KEY FRAME FILM GATE ASSEMBLAGE WITHIN HYBRID CAMERA ENHANCING RESOLUTION WHILE EXPANDING MEDIA EFFICIENCY," filed Nov. 25, 2005; U.S. Patent Application Ser. No. 60/739,142, entitled "DUAL FOCUS," filed Nov. 22, 2005; U.S. Patent Application Ser. No. 60/732,347, entitled "METHOD, SYSTEM AND APPARATUS FOR INCREASING QUALITY AND EFFICIENCY OF FILM CAPTURE WITHOUT CHANGE OF FILM MAGAZINE POSITION," filed Oct. 31, 2005; U.S. Patent Application Ser. No. 60/727,538, entitled "METHOD, SYSTEM AND APPARATUS FOR INCREASING QUALITY OF DIGITAL IMAGE CAPTURE," filed Oct. 16, 2005; U.S. Patent Application Ser. No. 60/712,189, entitled "METHOD, SYSTEM AND APPARATUS FOR INCREASING QUALITY AND EFFICIENCY OF FILM CAPTURE," filed Aug. 29, 2005; U.S. Patent Application Ser. No. 60/710,868, entitled "METHOD, SYSTEM AND APPARATUS FOR INCREASING QUALITY OF FILM CAPTURE," filed Aug. 25, 2005; U.S. Patent Application Ser. No. 60/711,345, entitled "SYSTEM, METHOD AND APPARATUS FOR CAPTURING AND SCREENING VISUALS FOR MULTI-DIMENSIONAL DISPLAY (ADDITIONAL DISCLOSURE)," filed Aug. 25, 2005; U.S. Patent Application Ser. No. 60/702,910, entitled "SYSTEM, METHOD AND APPARATUS FOR CAPTURING AND SCREENING VISUALS FOR MULTI-DIMENSIONAL DISPLAY," filed Jul. 27, 2005; U.S. Patent Application Ser. No. 60/701,424, entitled "METHOD, SYSTEM AND APPARATUS FOR INCREASING QUALITY OF FILM CAPTURE," filed Jul. 22, 2005; U.S. Patent Application Ser. No. 60/696,829, entitled "METHOD, SYSTEM AND APPARATUS FOR CAPTURING VISUALS AND/OR VISUAL DATA AND SPECIAL DEPTH DATA RELATING TO OBJECTS AND/OR IMAGE ZONES WITHIN SAID VISUALS SIMULTANEOUSLY," filed Jul. 6, 2005; U.S. Patent Application Ser. No. 60/693,011, entitled "FILM SHEATH ASSEMBLY SYSTEM, METHOD AND APPARATUS FOR USE IN DIGITAL FILM SIMULATION," filed Jun. 22, 2005; U.S. Patent Application Ser. No. 60/692,501, entitled "METHOD, SYSTEM AND APPARATUS FOR PROVIDING EXPANDABLE OR ELASTIC PHOTOGRAPHIC FILM TO INCREASE IMAGE QUALITY," filed Jun. 21, 2005; U.S. Patent Application Ser. No. 60/692,502, entitled "METHOD, SYSTEM AND APPARATUS FOR EXPOSING IMAGES ON BOTH SIDES OF CELLOID OR OTHER PHOTO SENSITIVE BEARING MATERIAL," filed Jun. 21, 2005; U.S. Patent Application Ser. No. 60/688,454, entitled "SYSTEM, METHOD AND APPARATUS FOR CAPTURING AND SCREENING TWO OR MORE DIFFERENTLY FOCUSED VERSIONS OF THE SAME LENS IMAGE, AND/OR SAME VISUAL SCENE," filed Jun. 9, 2005; and U.S. Patent Application Ser. No. 60/686,883, entitled "METHOD AND SYSTEM FOR CAPTURING AND DISPLAYING A VISUAL IN MULTIPLE LAYERS, BASED ON DIFFERENT FOCUSING PRIORITIES," filed Jun. 3, 2005.

This application claims priority to and is based on U.S. patent application Ser. No. 15/174,781, entitled "SYSTEM, METHOD AND APPARATUS FOR CAPTURE, CONVEYING AND SECURING INFORMATION INCLUDING MEDIA INFORMATION SUCH AS VIDEO," filed Jun. 6, 2016. U.S. patent application Ser. No. 15/174,781 claims priority to U.S. patent application Ser. No. 14/469,170, entitled "SYSTEM, METHOD AND APPARATUS FOR CAPTURE, CONVEYING AND SECURING INFORMATION INCLUDING MEDIA INFORMATION SUCH AS VIDEO," filed Aug. 26, 2014, which is based on U.S. Patent Application Ser. No. 61/869,832, filed Aug. 26, 2013 and U.S. Patent Application Ser. No. 61/871,650, filed Aug. 29, 2013.

This application claims priority to and is based on U.S. patent application Ser. No. 14/989,596, entitled "SYSTEM, METHOD AND APPARATUS FOR CAPTURE, CONVEYING AND SECURING INFORMATION INCLUDING MEDIA INFORMATION SUCH AS VIDEO," filed Jan. 6, 2016. U.S. patent application Ser. No. 14/989,596 claims priority to U.S. patent application Ser. No. 14/861, 646, entitled "SYSTEM, METHOD AND APPARATUS FOR CAPTURE, CONVEYING AND SECURING INFORMATION INCLUDING MEDIA INFORMATION SUCH AS VIDEO," filed Sep. 22, 2015, which is based on U.S. Patent Application Ser. No. 62/053,438, entitled "SYSTEM, METHOD AND APPARATUS FOR CAPTURE, CONVEYING AND SECURING INFORMATION INCLUDING MEDIA INFORMATION SUCH AS VIDEO," filed Sep. 22, 2014. U.S. patent application Ser. No. 14/989,596 also claims priority to U.S. Patent Application Ser. No. 62/129,550, entitled "MULTI DIMENSIONAL IMAGING COMPONENT SYSTEM AND METHOD," filed Mar. 6, 2015, U.S. Patent Application Ser. No. 62/143,663, entitled "KEY FRAME AND MULTIDIMENSIONAL BASED IMAGE AND DIMENSIONAL INFERENCE VIA WIRELESS DEVICE," filed Apr. 6, 2015, and U.S. Patent Application Ser. No. 62/175,830, entitled "KEY FRAME AND MULTIDIMENSIONAL BASED IMAGE AND DIMENSIONAL INFERENCE VIA WIRELESS DEVICE," filed Jun. 15, 2015.

All of the above patents and patent applications are hereby incorporated in their respective entireties as if expressly set forth herein.

This application further incorporates by reference in their respective entireties: U.S. patent application Ser. No. 11/562,840, entitled, "COMPOSITE MEDIA RECORDING ELEMENT AND IMAGING SYSTEM AND METHOD OF USE THEREOF" filed on Nov. 22, 2006; U.S. patent application Ser. No. 11/549,937, entitled "APPARATUS, SYSTEM AND METHOD FOR INCREASING QUALITY OF DIGITAL IMAGE CAPTURE," filed on Oct. 16, 2006; U.S. patent application Ser. No. 11/495,933, filed Jul. 27, 2006, entitled: SYSTEM, APPARATUS, AND METHOD FOR CAPTURING AND SCREENING VISUAL IMAGES FOR MULTI-DIMENSIONAL DISPLAY; U.S. patent application Ser. No. 11/492,397, filed Jul. 24, 2006, entitled: SYSTEM, APPARATUS, AND METHOD FOR INCREASING MEDIA STORAGE CAPACITY; and U.S. patent application Ser. No. 11/472,728, filed Jun. 21, 2006, entitled: SYSTEM AND METHOD FOR INCREASING EFFICIENCY AND QUALITY FOR EXPOSING IMAGES ON CELLULOID OR OTHER PHOTO SENSITIVE MATERIAL; the entire contents of which are as if set forth herein in their entirety. This application further incorporates by reference in respective entireties: U.S. patent application Ser. No. 11/481,526, filed Jul. 6, 2006, entitled "SYSTEM AND METHOD FOR CAPTURING VISUAL DATA AND NON-VISUAL DATA FOR MULTIDIMENSIONAL IMAGE DISPLAY;" U.S. patent application Ser. No. 11/473,570, filed Jun. 22, 2006, entitled "SYSTEM AND METHOD FOR DIGITAL FILM SIMULATION;" U.S. patent application Ser. No. 11/472,728, filed Jun. 21, 2006, entitled "SYSTEM AND METHOD FOR INCREASING EFFICIENCY AND QUALITY FOR EXPOSING IMAGES ON CELLULOID OR OTHER PHOTO SENSITIVE MATERIAL;" and U.S. patent application Ser. No. 11/408,389, entitled "SYSTEM AND METHOD TO SIMULATE FILM OR OTHER IMAGING MEDIA" and filed on. Apr. 20, 2006, the entire contents of which are as if set forth herein in their entirety.

FIELD

The present invention relates to imaging and, more particularly, to capturing visuals to provide image manipulation options for increasing resolution of subject images. The present invention further relates to a system, apparatus or method for increasing resolution of subject images using a camera to deliver unexposed photographic emulsion or a digital image and to generate images of greater resolution by modifying digital images or modifying digital and emulsion images.

BACKGROUND

Problems exist in the art of cinematography which include the influx of digital origination systems and options for cinema and television, cutting into the film origination market. Film is the preferred artistic medium of many cinematographers, though the drawbacks including the expense of film and processing, the cumbersome and heavy aspects of the equipment, and the inability to see as definitely what is being captured as digital and video options provide, make film an increasingly difficult choice in today's imaging environment. Digital manufactures strive, and claim, to provide image recording means that rivals or surpasses the present potential of 35 mm filmed images. A need exists in the art for improved systems and methods for maintaining the quality of filmed images while employing the flexibility of digital origination systems to modify and enhance the filmed images.

SUMMARY

The present invention relates to a system, apparatus, or method for selectively increasing both quality and quantity of film images captured without significantly altering the capture equipment configuration(s) and without significantly altering the capture media, e.g., film stock. In one configuration, the present invention at least doubles the "amount" of emulsion available for recording or capturing visuals without increasing weight necessarily, as all remains on the same "amount" of celluloid or related emulsion supporting material. The present invention further provides a system, apparatus, or method for selectively increasing both quality and quantity of film images captured without significantly altering the capture equipment configuration(s) and without significantly altering the capture media, e.g., film stock The present invention provides a system, apparatus, or method that at least doubles the "amount" of emulsion available for recording or capturing visuals without increasing weight necessarily, as all remains on the same "amount" of celluloid or related emulsion supporting material.

A system for concurrently capturing and storing two distinct information records of a single visual scene to generate one or more final images is provided which comprises a camera comprising an image capture assembly for capturing and recording aspects of said visual scene within a photographic emulsion as high resolution image captures, an electronic imaging module within said camera for capturing and recording aspects relating to said visual scene operating concurrently with said image capture assembly, said capturing and recording by said electronic imaging module and said image capture assembly occurring sequentially or simultaneously, said module at least capturing aspects related to said visual scene that are not recorded within said emulsion by said assembly, an image data management component comprising a computer readable medium to generate final images from image data derived from visual information recorded within said emulsion, said final images including modified versions of said visual information from said emulsion, said modified versions modified in part in accordance with information captured by said electronic imaging module, wherein one or more of said final images simulate high resolution image captures by said image capture assembly that said assembly did not in fact capture.

A method for transforming image data on a computer readable medium operable by a computer is provided which comprises identifying corresponding image zones from image data provided by a first electronic imaging module and a second electronic imaging module, modifying said image data captured by said first module to provide final images, said first module providing more data per image at capture than said second module, and repositioning selected image information related to said image zones from said image data provided by said first module, based on image information provided by said second module, said second module providing a plurality of image captures for each image capture by said first module.

A system for generating final images of greater resolution from originally captured images is provided which comprises a camera operable to deliver unexposed photographic emulsion to at least one image capture zone within the camera for exposure to light related to a subject visual, said zone being of a selected size and dimension, said emulsion being exposed within at least said image capture zone to said light, an electronic imaging module operable to record aspects of said subject visual, and an image data management component comprising a computer readable medium to apply information related to said emulsion exposed to said subject visual and information related to aspects of said subject visual captured by said electronic imaging module to create one or more final images.

A system for increasing resolution of subject images is provided which comprises a camera operable to deliver unexposed photographic emulsion to at least one image capture zone within the camera to record visuals on said emulsion, said zone being of a variable size and dimension, and an electronic imaging module in said camera operable to record aspects of said visuals recorded by said camera on said emulsion. The system can further comprise an image data modification program for generating final images from information in visuals recorded by said emulsion and from information recorded in aspects of visuals by said electronic imaging module. An apparatus is provided for increasing resolution of subject images. The camera can deliver unexposed photographic emulsion intermittently or continuously to at least one image capture zone within the camera.

A method for increasing resolution of subject images is provided which comprises delivering unexposed photographic emulsion to at least one image capture zone within a camera to record visuals on said emulsion, said zone being of a variable size and dimension, and recording aspects of said visuals by an electronic imaging module in said camera. The method can further comprise generating final images with an image data modification program from information in visuals recorded by said emulsion and from information recorded in aspects of visuals by said electronic imaging module. The camera can deliver unexposed photographic emulsion intermittently or continuously to at least one image capture zone within the camera.

A system for increasing resolution of subject images is provided which comprises a camera operable to deliver unexposed photographic emulsion to at least one image capture zone within a camera, said zone being of a selectable size and dimension, said image capture zone receiving said emulsion from the top or bottom of said zone with the emulsion exiting through the top or bottom of said zone following exposure, or receiving said emulsion from any side of said zone to exit said zone from the other side, following exposure of said emulsion, and an image data modification program for generating final images from information recorded within said emulsion, said program being operable to infer a selected number of images, of selectable equivalent total image information, between available images recorded within said emulsion. The camera can deliver unexposed photographic emulsion intermittently or continuously to at least one image capture zone within the camera.

A method for increasing resolution of subject images is provided which comprises delivering unexposed photographic emulsion to at least one image capture zone within a camera to record visuals, said zone being of a selectable size and dimension, receiving said emulsion into said image capture zone from the top or bottom of said zone with the emulsion exiting through the top or bottom of said zone following exposure, or receiving said emulsion from any side of said zone to exit said zone from the other side, following exposure of said emulsion, and generating final images from information recorded within said emulsion using an image data modification program, said program being operable to infer a selected number of images, of selectable equivalent total image information, between available images recorded within said emulsion. The camera can deliver unexposed photographic emulsion intermittently or continuously to at least one exposure zone or image capture zone within the camera.

Other features and advantages of the present invention will become apparent from the following description of the invention that refers to the accompanying drawings.

BRIEF DESCRIPTION OF THE DRAWINGS

For the purpose of illustrating the invention, it being understood, that the invention is not limited to the precise arrangements and instrumentalities shown. The features and advantages of the present invention will become apparent from the following description of the invention that refers to the accompanying drawings, in which:

FIG. 7 shows a drawing legend for FIGS. 8 through 12.

FIG. 10 shows configuration of high definition digital unit coupled to film camera for capture of same lens image.

DETAILED DESCRIPTION

Figure 1:
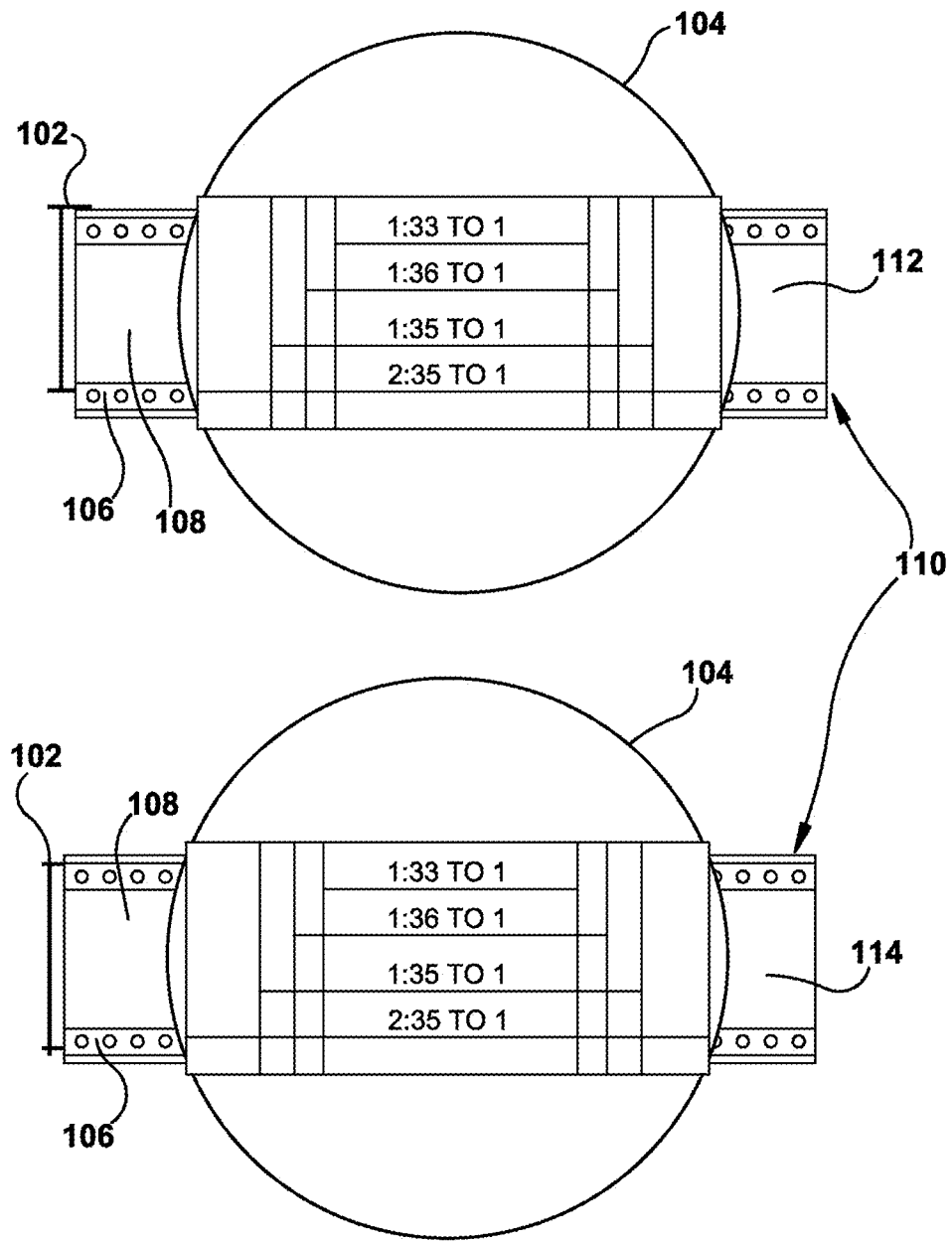
FIG. 1 shows 16 mm film stock and 35 mm film stock as it is delivered to a horizontally configured camera film gate mechanism by transport component (such as roller) exiting the gate as exposed film stock.

The present invention relates to a system, apparatus, or method for selectively increasing both quality and quantity of film images captured without significantly altering the capture equipment configuration(s) and without significantly altering the capture media, e.g., film stock. The present invention further relates to the simulation of high resolution image captures that did not occur from single high resolution "key frames," which can be derived from actual image captures within emulsion or other capture media such as digital image captures. Herein, these "key frame" pictures are subsequently informed, as employed by an image data managing computer, by a second data record to modify the key frame image aspects to reposition such aspects as they "would have" occurred had the high resolution image capture system in fact captured the simulated image; for example, had the high resolution image capture system been operating at a high capture frame rate and thus generating more original captures per second. In one configuration, the present invention at least doubles the "amount" of emulsion available for recording or capturing visuals without increasing weight necessarily, as all remains on the same "amount" of celluloid or related emulsion supporting material. A system for concurrently capturing and storing two distinct information records of a single visual scene to generate one or more final images is provided which comprises a camera comprising an image capture assembly for capturing and recording aspects of said visual scene within a photographic emulsion as high resolution image captures, an electronic imaging module within said camera for capturing and recording aspects relating to said visual scene operating concurrently with said image capture assembly, said capturing and recording by said electronic imaging module and said image capture assembly occurring sequentially or simultaneously, said module at least capturing aspects related to said visual scene that are not recorded within said emulsion by said assembly, an image data management component comprising a computer readable medium to generate final images from image data derived from visual information recorded within said emulsion, said final images including modified versions of said visual information from said emulsion, said modified versions modified in part in accordance with information captured by said electronic imaging module, wherein one or more of said final images simulate high resolution image captures by said image capture assembly that said assembly did not in fact capture. A system for increasing resolution of subject images is provided which comprises a camera operable to deliver unexposed photographic emulsion to at least one image capture zone within the camera to record visuals on said emulsion, said zone being of a variable size and dimension, and an electronic imaging module in said camera operable to record aspects of said visuals recorded by said camera on said emulsion. The system can further comprise an image data modification program for generating final images from information in visuals recorded by said emulsion and from information recorded in aspects of visuals by said electronic imaging module. An apparatus is provided for increasing resolution of subject images. A method for increasing resolution of subject images is provided which comprises delivering unexposed photographic emulsion to at least one image capture zone within a camera to record visuals on said emulsion, said zone being of a variable size and dimension, and recording aspects of said visuals by an electronic imaging module in said camera. The method can further comprise generating final images with an image data modification program from information in visuals recorded by said emulsion and from information recorded in aspects of visuals by said electronic imaging module.

It is to be understood that this invention is not limited to particular methods, apparatus or systems, which can, of course, vary. It is also to be understood that the terminology used herein is for the purpose of describing particular embodiments only, and is not intended to be limiting. As used in this specification and the appended claims, the singular forms "a," "an" and "the" include plural references unless the content clearly dictates otherwise. Thus, for example, reference to "a container" includes a combination of two or more containers, and the like.

The term "about" as used herein when referring to a measurable value such as an amount, a temporal duration, and the like, is meant to encompass variations of .+−0.20% or .+−0.10%, more preferably .+−0.5%, even more preferably .+−0.1%, and still more preferably .+−0.0.1% from the specified value, as such variations are appropriate to perform the disclosed methods.

Unless defined otherwise, all technical and scientific terms or terms of art used herein have the same meaning as commonly understood by one of ordinary skill in the art to which the invention pertains. Although any methods or materials similar or equivalent to those described herein can be used in the practice of the present invention, the methods or materials are described herein. In describing and claiming the present invention, the following terminology will be used. As used herein, the term, "module" refers, generally, to one or more discrete components that contribute to the effectiveness of the present invention. Modules can operate or, alternatively, depend upon one or more other modules in order to function.

"Lens image" refers to any image or light stimulus, for example, images provided by lenses or other light delivery means existing or that will come to be in exposing image receptive media and elements to light or other stimuli that are the focus of rendering displayable final images.

"At least one image capture zone" refers to within a camera, film, digital, otherwise electronic or of other types, a film gate, CCD chip or other image capture aspect or component occurs within a zone where an image, typically delivered through a lens, is manifest. This image capture zone is where light delivered typically related to an image from that lens related to the visual scene a camera user intends to capture, and typically systems of different capture zone sizes related to gauge size for film, for example, require optics and optic arrangements capable of covering larger image capture zones with a delivered image, such as 70 mm film cameras relative to 35 mm and 16 mm cameras. Within hybrid cameras, including those with multiple electronic capture aspects or capture means involving different media, (film and digital for example) more than on image capture zone occurs within and/or relative to a single camera (or capture system.) Film cameras with "video assists" are for example systems wherein a single lens image is delivered to a film capture zone and electronic capture zone, simultaneously.

"Visual framing" refers to the subjective choice of a camera operator with regards to a desired visual, the elements of the visual to be included in an image capture, their composition, and visual boundaries reflecting the selection and restriction of the totality of what will be visible within a resulting final image from the "selected visual framing."

"Distinct information records" refers the information captured and stored relating to the two capturing and recording portions of the hybrid camera, system and method. Namely, one assembly for generating high definition key frame information, typically from a lens image, and a separate module for generating higher frequency (24 frames per second for example) full frame captures and corresponding information record, logically of a lesser overall per image data amount than provided by the separate (and thus distinct) key frame image capture assembly and resulting information record.

"Single visual scene" refers to the actual subject area to which the camera or imaging device of the present invention is trained and focused. For example, the camera pointing at a beach volleyball gameface for 5 seconds of image capture time, (as in the FIG. 4 featuring the composite/mosaic key frame face capture) means the full frame image of the volleyball game the camera user has selected and directed the camera to capture, is the single visual scene that all imaging aspects of the camera are sharing and capturing.

"Image capture assembly" refers to the emulsion based imaging component array and film based visual storage aspect of the hybrid key frame imaging camera of the present invention.

"High resolution image captures" refer to the key frame captures of individual or composite captures related to a single visual scene, from which image information will be repositioned based on a secondary data record captured concurrently with the high resolution captures, to simulate high resolution captures that did not actually occur.

"Electronic imaging module" or "Image capture module" refers to the electronic image capture component array of the hybrid imaging system and camera of the present invention; this component array, (preferably housed within the same camera as the high resolution image capture assembly for generating key frame captures) in the preferred configuration receives the full intended visual scene as a full frame lens image conveyed to the module either continually or intermittently, to allow uninterrupted capture of preferably 24 frames of video per second without interrupting or compromising key frame captures from the same lens image.

"Image data management component" refers to the transform program unique to this system and method, for applying positional, (such as wire frame) selectively discerned image aspect shape and position information to create modified versions of high definition key frame information toward simulated high definition image captures, embodying up to as much information as the key frames themselves, per image.

"Image capture zone" refers to the area or areas within the imaging device (such as camera) of the present invention, where the selected full visual in the form of a lens image preferably, is trained for capture. Such a zone may include and in fact primarily does, a film gate exposure area in the film hybrid configuration of this invention, though a CCD or related video imaging device or other digital or electronic data capture device also embodies an exposure zone or image capture zone on which full or partial lens image light may be trained for electronic capture and electronic image data generation and storage in response to light stimuli affecting such an electronic imaging image capture zone.

A system for imaging is provided. More particularly, a system, apparatus, or method for increasing resolution of subject images is provided. A system and method provides records visuals and that records aspects of the visuals, such as captured by an electronic imaging module, in addition to a visual scene, referred to herein, generally as a "visual," that is captured by a camera. A visual as captured by the camera is referred to herein, generally, as an "image." Visual data and aspects of the visual data collectively provided such that data regarding variable size and dimension of the visual can be used, for example, during post-production processes.

The system, apparatus or method relates to the simulation of high resolution image captures that did not occur, from single high resolution "key frames," which can be actual image captures within emulsion or other capture media such as digital image captures. These "key frame" pictures are subsequently informed by a second data record, as employed by an image data managing computer, to modify the key frame image aspects to reposition such aspects as they "would have" occurred had the high resolution image capture system in fact captured the simulated image. For example, the system provides that the high resolution image capture system had been operating at a high capture frame rate and thus generating more original captures per second.

A digital image data transform is thus another aspect of several configurations of the system, method, or apparatus described herein. Such a transform "program" as operated by a computer, creates final images from data related to the mentioned "key frames" as informed by a second data record captured in and around the time of the key frames' origination or initial capture. In essence, a second data record, such as an electronic image capture record at 24 frames per second, contrasts with key frame creation of only one image per second, and may provide all of the positional or "wire frame" information necessary about discernable zones, such as subject objects, to manipulate, via the computer employed transform, the data-rich image aspects of the high resolution key frames to assume positional properties of lower resolution corresponding aspects within the 24 frames per second captures. In fact, the electronic image capture record, which may, for example, be a film camera "video assist" imaging component, allowing for multiple applications of such reference video destined for use by the transform computer program, need only embody enough image information to provide image zone outline information for the data rich key frames to be "modified," while potentially retaining all of their original resolution, thus resulting in final filmed images that may provide in digital form images surpassing 20 k per image, including images that approximate quite exactly those that "would have" been captured had the film capture aspect acquired images at the time that, in fact, only the lower resolution electronic capture system captured image information at the instant the modified key frame information is now simulating as an original approximately 20 k film capture; ideally the lower resolution 24 fps electronic capture system is acquiring images through the same lens as the film capture assembly of the same camera to allow visual stimuli, such as a red ball occurring with the lens image, to be easily identified as corresponding "image aspects" or zones between the film and electronically captured images. As this red ball moves from left to right through the frame over one second of time, though the film key frame captures provide only an image of the ball on the left of the frame, and then on the right, the electronic capture aspect of the camera has in fact provided 24 full frame captures documenting the ball's journey across the frame with 24 images, for example 2 k digital image captures, providing all of the positional information necessary to reposition the corresponding red ball from the first key frame, on the left of the image, where it "would have" been had the film system captured not 1 frame per second but 24. The resulting 24 images, each 20 k, in this example, now feature the ball with the proper position throughout the frame during this one second of final images. Benefits include the fact that a single frame of motion picture film and slow capture frame rate, such as an 8 perf/sprockets per image horizontal emulsion stored key frame, not unlike a "still 35 mm" camera exposure, will allow the typical 10 minute film magazine to now last many times this record time, 8 perforations of film stock being employed in lieu of the conventional 96, proving 2 hours or record time per 1,000 feet of 35 mm film stock, for example, while simultaneously increasing the resolution of final images for digital cinema or other display purposes by at least 3 times, in this example. Indeed, more for less as a result of image extrapolation from pertinent information, increasing the efficiency of application of the high resolution image information from information less material and cost intensive capture options may provide, such as a video imaging aspect, such as a video assist unit acquiring images through the same lens as the film capture aspect.

The media of the "hybrid" systems, as described herein, is not the issue. For individual key frame capture scenarios, as above, film provides a useful configuration as in the present field, no digital imaging for entertainment can efficiently provide individual image captures capable of providing electronic image information at or beyond 15 k. One valuable benefit of such an extreme high resolution record is future project value, such as the option of "re-resing" a feature film to 15 k per image, for digital projection at 15 k when in ten years, for example, the best digital screening venues are not 4 k projection systems, but 15 k. Thus, quality acquired "now" can provide the compatibility with the screening technology and quality of "tomorrow." This is not unlike being able in the 1920's to shoot color motion picture information, despite the fact that it would be years before the actual color information captured in the 1920's could provide color projected prints for audiences to enjoy the stored yet not before exploited image information. The fact being, the information is "in the can," providing future processing and/or display options otherwise lost of having to be "guessed," such as in the case of colorized black and white films. Herein, the resolution is the key, and while costly projects shot originally as 2 k data captures, such as the recent STAR WARS films, even inexpensively produced motion pictures created under the present invention, will have the capacity to provide screening data files with, as said, 15 k per image results, or much higher as the following configuration summary demonstrates.

Advancing beyond the single key frame full image capture configuration of the present system, methods, and apparatus, to follow includes specification relating to mosaic or "composite" key frame configurations of this innovation. Specifically, optics and/or capture media within a film gate, or an electronic capture modules such as CCD, have repositioning operability to allow for sequential capture of not the full lens image, or otherwise provided image, but portions of the image. In one version, the optics relaying the visual delivered through a camera lens vary three times, to allow a "triptych" of portions, to be conveyed for exposure on film or an electronic imaging module. With repeating sequence of portion captures, an increased amount of emulsion for example, allows for subsequent digital assemblage of the full visual from the portions, in essence the digital assemblage of the mosaic picture puzzle captured in distinct "pieces, to provide an ever more data-rich potential series of key frames; and as described initially above, thus equally data-rich potential "simulated" or extrapolated intermediary images, between available key frames as informed by an ancillary data capture system, such as the forementioned video assist unit. It is very important to mention that this electronic capture aspect, providing at least the shifting image aspect position information necessary for discreet revision of key frame data into proper final images, need not capture image data. Such a unit may simply capture positional data allowing for the "wire frame" study of the visual being intermittently captured as well by the key frame generating camera aspect. An example of such non-image data being captured and providing this data, is a transmission and receiving sampling device, e.g., echo or audio or other electronic transmission, returning and providing a record, or study, of the shapes and depths of objects relevant to the key frame captures, for application of such shifting shape and position data to generate a plurality of final images between available key frames, simulating the key frame capture system images had they actually been operating not at 1 frame per second, or capture per second, but at 24, for example.

Thus, configurations to follow relate to the creation of high resolution key frame, or reference images, which may or may not provide images included among generated final images. This further relates to boosting potential key frame resolution by providing the option of not only single full visual key frame image captures, on film or other media, but multiple distinct captures of sequential portions of a subject visual, concurrently with the same 24 fps captures by an imaging module or other electronic data gathering module to provide image aspect shape and positional data for revising assembled mosaic key frames into, again, simulated high resolution images to approximate intermediary images not actually captured by the high resolution key frame generating aspect/assembly of the camera and system.

Continuing the potential benefits, clearly a composite/mosaic key frame generated from 6 portions of a lens visual, sequentially, by a 2 k digital capture camera may provide key frames of up to 12 k, minus any image portion overlapping to be seamlessly corrected by the computer operated transform program. Thus, the assembled 12 k reference or key image, may as with the film originated images above, be revised as final images to provide potentially (for example) 24 of the 12 k images for every second, and every available computer assembled key frame created, from ultra high resolution composited captures (on any selected media) representative after assemblage of the mosaic image of the full desired visual (framing and composition) a system user has selected.

One unique component is the transform program mentioned. This "software" provides compositing functions to allow image portions captured as mosaic key frames of a subject visual, to be assembled seamlessly into one image. Such assembling may also rely on secondary full image, for example, "video assist" captures optionally at lower resolution, to provide proper reference to overlapping aspects of such portions, toward seamless final key frame images, and thus final generated image simulations.

The transform further may provide operability to revise high resolution, and potentially extremely high data volume image data files, based on selectively distinguished "wire frame" information from the ancillary full image captures, or ancillary positional data captures if not actual image data, potentially repositioning and repeating available high resolution information in zones where such data may indicate certain image aspects with key frame pictures appear to have moved, or been uncovered between available key frame images.

FIG. 1 shows 16 mm film stock, 112, and 35 mm film stock 114, as it is delivered to a horizontally configured camera film gate mechanism, 116, by transport component (such as roller) 102, exiting the gate as exposed film stock 110.

Gate 116 provides unique versatility and image capture quality potential for each of the gauge sizes featured, single perf/sprocketed 16 mm film stock 112 and double perf/sprocketed film stock 115. The capture ratio options, selectively slaved to available screening dimensions potentially selectable for a project, include for example 1:33 (standard TV) 1:65 (plasma monitor high def) 1:85 (standard cinema) and 2:35 (a wide screen cinema ratio) though options are in no way limited to these sizes or dimensions.

Lens (or otherwise conveyed) image target zone 104 provides represents a dramatically larger image manifest zone than conventional 35 mm film capture for cinema or TV, which has a typical ceiling of information at 6 k, based on the 3 perf vertical stock (delivery to gate configuration) film emulsion size. Limited only by edge to edge, edge to sprockets or sprockets to sprockets space when in the horizontal exposure position, an image delivered by modified optics arrangement to the larger image target area within a 16 mm camera, will result in one option, with a 3 perf horizontal key frame image capable of providing higher image quality and resolution than standard 35 mm cinema capture, involving 3 perf exposure areas on vertically exposed stock, and thus 72 perf of film per second. Herein, the 3 perf horizontal film exposure hybrid 16 mm camera, can provide key frames (one per second for example) providing the data basis for imparting they high res key frame generated image data within final images, (as informed selectively by 24 frames per second of digital or the electronic image or related data record.) Thus only 3 perf in the 16 mm format, allows for better final image quality of final images while increasing media efficiency of 16 mm (for example) from 10 minutes per roll to 80 minutes; this has obvious benefit and savings on a number of important levels. Further the ability to select image ratio without any distortion or compromise to the image as captured by emulsion means one will not be "compressing" images as the use of highly resolved key frames and image aspect position references provided from a video record of the same visual, basically, means that full resolution, uncompressed capturing remains entirely not data capture intensive, one "file" affecting as few as 1 and as many as over 24 final images, every second.

Similarly, 35 mm can provide image resolution and available per-image data in the range of 70 mm stock and 24 fps capture, with a single 10+ perf horizontal capture on conventional 35 mm film stock, per second. The number of key frames captures depending much on the end-user's objectives and creative/logistic priorities.

Figure 2:
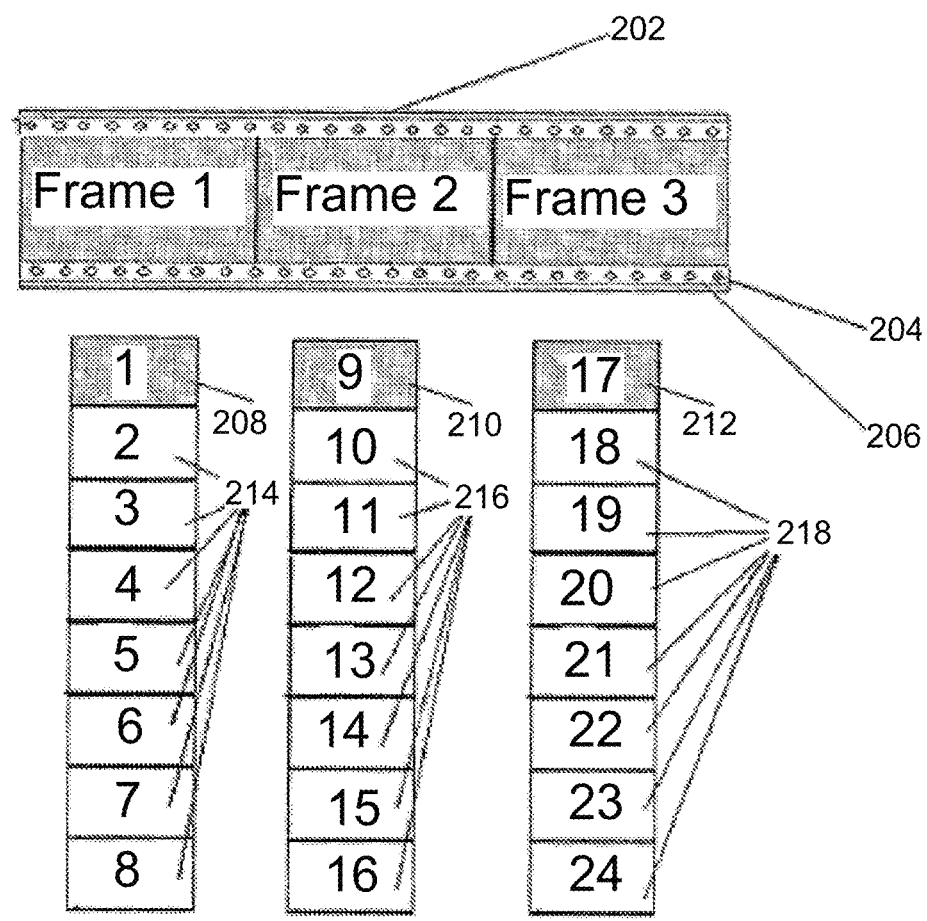
FIG. 2 shows three frames of horizontally exposed film stock representative of a full second of camera operation time.

FIG. 2 shows three frames of horizontally exposed film stock, 202, representative of a full second of camera operation time. Also illustrated are 24 frames of corresponding video in groups of 8 data files related to images, 214, 216 and 218, such as digital image information, captured by an electronic capture module working in tandem with the film frame exposures, as an aspect of the same camera, thus a hybrid camera.

206 marks and example data track, such as magnetic recordable stripe though not limited to being such, for recording corresponding non image data to provide image reference data between filmed images, 202, and the electronically captured images, 214, 216 and 218, among potentially other system function data beyond this image linking reference data.

Film 202 has sprockets 204 indicated, though one configuration involves film stock that does not feature sprockets, as images are digitized and sprocket transport is not necessary for proper subsequent registration to be accomplished in the digital domain (for example) and thus image exposure area would be selectively increased to allow the full 35 mm height of the stock (in this instance, though any gauge size is exemplary of the system/method herein) to record image information.

Frames 1, 9 and 17 of digitally captured information, for example, are in this example, captured at the time, or close enough to the time of the filmed images, that they are substantially identical to their corresponding filmed images, 202, with regards to the position of aspects of the images captured.

Though morphing or other inferring image generation means can allow all images between the "key frames" 1, 2 and 3 represented by film frames 202, is one configuration of the present invention, herein an approach to the fluid image aspect positioning reference data available from the 24 frames per second of video captured during the same one second of image capture time, (214, 216 and 218) allow an prepared image data transform program to reference the 24 frames of video capture for actual image aspect position data, not inferred, in allocating the potentially far more resolved, and rich in image information, image data resulting from the filmed key frames, for example, when they are digitized. Thus, these electronically captured images, will match the image position aspects of final images generated by way of this invention, however, the final images will optionally have resolution of a selectable overall amount, and overall per image data amount, higher than each of the electronic captures, for example 208, though not higher than any of the individual filmed key frames can provide, such as Frame 1 in 202, the corresponding filmed image to electronically captured image 208.

Figure 3:
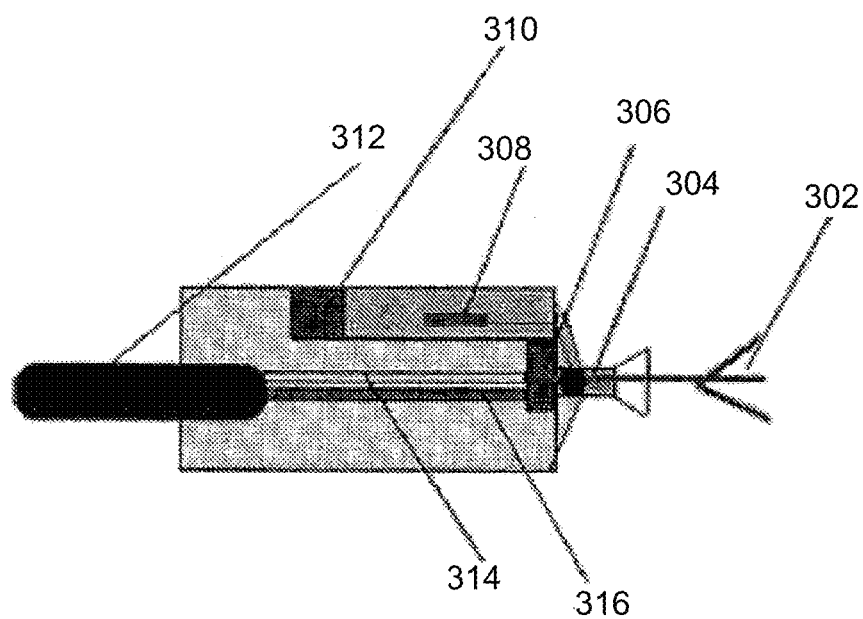
FIG. 3 shows a hybrid imaging camera, related to an embodiment of the system, apparatus or method of the present invention.

FIG. 3 shows a hybrid imaging camera, related to an embodiment of the present invention. An image, 302 enters through lens to be dispersed temporally or literally, by beam splitter, by image diversion component 304. It is important to mention, image delivery means need not be a lens, as the issue is a light or other image related stimulus being delivered for capture by more than one capture component, in this case, including an emulsion capture aspect.

Film gate 306 is a horizontally positioned gate, receiving film stock, unlike the familiar PanaVision top mounted magazine camera threading, wherein stock enters the gate from the top, exposure is between two rows of sprockets when 35 mm film is the gauge size, exiting the bottom of the gate, herein a rear mounted film magazine provides stock already in the horizontal position for exposure, much as a still film camera typically provides stock horizontally for exposure.

Image diversion means sends all or a portion of the image to electronic capture component 308 stored within tape or other data storage means 310, also storing corresponding time code data recorded onto the film stock. See FIG. 2, component 206. After processing of film stock, non image system data recorded on 206, selectively corresponding to electronically captured images, may be provided within the same final electronic media representation, such as scan and DVD, tape or digital store, though not limited to these, alongside and linked to the information relating to the original images recorded within emulsion.

Unexposed stock is delivered to the gate, 314, and returned to the magazine or other containment as 316. In this configuration, key frames are captured, one per second, 8 sprockets wide, counting one side. Thus providing key frames of at least a final image data potential of 15 k, and with one per second being exposed, the 1,000 feet of conventional 35 mm film typically allowing for 10 minutes of recording time approximately, at 24 fps, now providing a total recording time of approximately 2 hours; while by the operation of the present invention, resulting in final electronic images embodying selective aspects of the film stock images, each with a total image information threshold in excess of 15 k selectively, despite the 2 k capture maximum in this configuration of the electronically generated images, captured by component 308 and stored within 310, employed by the present system's computer program (software) aspect if not all, mostly for image-aspect shifting position information between available, more highly resolved, filmed key frames.

The present camera need not provide emulsion in the conventional, strip celluloid configuration, 312. The present invention includes a further configuration option for key frame and even full 24 fps exposure on emulsion) involving emulsion contained in a "feed" container within 312, no longer a film stock container but just and emulsion supply and take up storage component, being provided to the exposure area, or modified gate 306, in an unfixed state. Rather than a solid attached to celluloid, liquid, gel or in this configuration, a "dust," or powdered solid, may be "blown" in and/or magnetically guided into proper position within the selectably sized exposure area. Such "smart emulsion dust" may be maintained for exposure by an external influence, such as a magnetic force, though not limited as such. Like toner in a printer cartridge, computer data informs the dispersal of particles creating an acceptable image. Herein, the toner is replaced by fragments of film emulsion or other light sensitive recording material, transported for exposure randomized relative to other fragments.

Now, the emulsion can be fixed at this point to a separate component, for further operations and return for storing; though one configuration involves particles of recordable "dust" that have secondary data recording means included therein. For example, modified emulsion or visually influenced recordable particles, may have received a coating of magnetic or other recordable matter prior being rendered into a the dust, or "partical-ized" form. Such a magnetic or other data recording medium might result on each particle like chocolate on a strawberry after being dipped, covering only a portion of the strawberry.

Once intermittently influenced by a magnetic force in the exposure area, for example, such particles, some if not all, may shift position to allow the magnetic material to face down, and image recording emulsion, or other material, to face up, toward the coming visual influence, such as light related to a visual from a lens of other component, including laser units that record on to film and other such potential image providing influences.

Before, during or after the image data is captured, one configuration provides the other recordable aspect of the dust, such as magnetic coating, to be influenced by a data providing magnetic or otherwise data influencing electronic means; while the dust is fixed in place in the exposure area. Such data may record and be maintained on some, if not all, such dust particles prepared for this purpose. Thus, when re-randomized and "blown" or otherwise, such as magnetically, removed from the exposure area and placed into a containment or other area no longer maintaining the image receiving position of the particles within the gate or exposure area, the position data of each particle is maintained selectively on each particle that appropriately recorded the data, which logically would provide "which image" and "where in the gate or exposure area" that particle rested during exposure. Thus, unlike computer toner that is limited to being dispersed based on external data imposed, this "smart dust" knows it's own location relative to the images it relates to. Naturally, relating to toner itself or printing and related processes, this smart dust technology may allow printing to involve toner that does not have a limit on how discreet it might be color wise, such as three colors provided resulting in a dispersal of those three based on computer data imposed. If toner too were of the "millions of colors" option, like emulsion can record, and "knew" where it belonged independently, (down to the individual dust particle size) that would have clear advantages. A toner cartridge holding in fact potentially many "images" just as colored dust, or dust that later may render color after a particular influence causes such a change in the "toner" or otherwise evolving color material provided in dust, powder or otherwise granulated form.

In processing such granulated emulsion, it may be fixed into place, such as onto a familiar film-like strip, or otherwise secured for those post production phases. Though, in digitizing or other image manifesting phases, the actually final images may not result until a system re-assembles the image "puzzle" after, for example, scanning the dust after it manifests it's color reaction to the original image stimulus, and the system then places that pixel or other bit of image data into the image and image position the "granule" of emulsion, or "smart emulsion dust," tells the system it belongs, from the distinct magnetic or otherwise recorded non-image data information maintained selectively within the granule itself on an added property or encoded aspect of the existing visual recording ability of the image receptive piece of a selectively small size or granule.

Image data as small as a single pixel, or equivalent, of image information may be maintained by each such granule, though not necessarily. As long as the piece of emulsion or other recordable, unfixed media "knows" where it belongs, all image data it provides will thus be able to be "placed" electronically into the correct image zone and visual it corresponds to, in post production.

Figure 4:
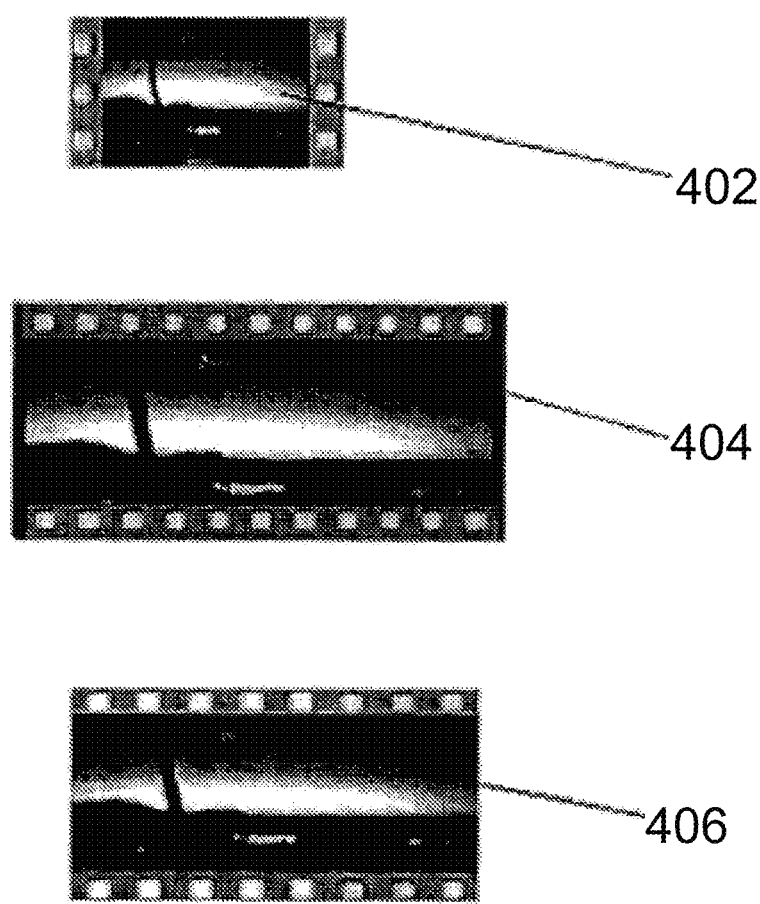
FIG. 4 shows the advantage of an embodiment of the system with regards to final image quality and efficiency.

FIG. 4 shows an advantage of an embodiment of the system with regards to final image quality and efficiency. 402 illustrates a conventionally captured, industry standard, 35 mm image recorded within color negative film stock. For cinema, 3 sprockets vertically of emulsion area provide the total available image recording area, which tests have revealed can provide not more than 6 k of distinct digital image data, after selective scanning to electronic data form after film processing.

406 illustrates a horizontally captured key frame of the same visual, provided by a camera with optics, or other image providing components, configured more similarly to familiar 70 mm motion picture cameras, as the image target area must be larger of the same visual to expose this much larger emulsion area. Herein, the 8 sprocket width example is a key frame taken every one-second, which will be used to influence 24 final images providing a whole second of final image data. This image, based on the 6 k tests of 3 sprocket images, thus provides over 2.65 times the image information, or more than 16 k of data per image. Further, as only 8 sprockets of film, counting one side have been involved in this image, unlike the 4 perf that occur 24 time per second of conventional cinema capture today, 3 perf or sprocket exposures typically still involve 4 perf transport by cameras, which utilizes 96 perf, or sprockets of film, every second to provide those 6 k images.

Herein, the system program provides the efficiency that allows uncompressed captures of over 16 k to occur, while resulting the in attributes and goals of compression and other data volume managing approaches, while in fact increasing available image quality and media use efficiency. For example, the 8 perf filmed key frames by way of the present invention will provide resolution and overall image data to "up-res" 24 images captured by an electronic aspect capture, such as a video assist unit working in tandem with the film capture aspect of the camera, to over 16 k per image. Thus, 384 k of image data per second versus the 144 k that 24 frames of conventional 35 mm film stock can provide in electronic form; while in this systems configuration, increasing the recording time of the same 10 minutes roll of 35 mm film stock from 10 minutes approximately, to 2 hours approximately. The advantages and costs savings potential are evident and in synch with the industry goals of increasing image quality while reducing weight, costs, media usage and equipment size. The latter being addressed by resulting 16 mm camera systems providing image quality in excess of conventional 35 mm motion picture film capture, and 35 mm systems now able to exceed once often used 70 mm film capture quality while in fact still reducing the amount of media (by weight) dramatically in doing so.

404 illustrates a wide screen cinema key frame capture requiring no anamorphic distortion to fit the full image ratio onto film for recording; a procedure not only once used to "fit" images onto film stock restricted from left to right due to vertical film configuration for cinema during capture and projection, but the issues of using more than 1,000 feet of film to capture 10 minutes of material made recording images of such large emulsion size, such as Vistavision horizontal capturing, logistically problematic. This not only from the "amount of media" necessary issues, but also from performances being interrupted by camera "roll out" after just a few minutes of operation. 404 illustrates a 22 k film captured image, surpassing the image quality of 70 mm conventional capture, though herein while increasing film roll recording time from 10 minutes to more than 87 minutes. The result, provided by the software affected (program) reallocation of data rich image zone information within image 404 to 24, for example, electronically captured images, during the same second of time, will result in final images indistinguishable from a system that may have been exposing 24 of such 11 perf horizontal image per second, as Vistavision's approach was designed to do, in part. Further, the color and image attributes of film emulsion are further provided to final images, (such as the filmic color response versus the color response found within the electronic captures) is among the other aspects brought to the final images by the key frames to maintain the filmic response preferred in the industry and by viewers.

A further advantage clearly, is that film cameras need not be reconfigured radically, necessarily. 35 mm and 16 mm cameras may maintain their current profiles, optics experiencing a revision to provide larger image target areas toward the improved quality emulsion area captures. Thus, directors of photography preferring film capture options and approaches, including different stocks, filters and artistic options for film capture not typical to digital capture, maintain essentially all of the aspects of a "film shoot," despite the option of fewer exposure per second on film, even 1 or fewer than that, (potentially 1 for a period of time exceeding one second.) However, as the key image aspects come from the key frames, it remains a film shoot.

Again, enough key frames, 4 per second, for example, can eliminate the need for secondary electronic images to be captured, morphing or other image inferring program technology providing the inferred images between such key frames. But, with video assists being typical to film capture, the dual use or improved video assist configuration of this invention, (potentially allowing such electronic capture to cover multiple purposes, such as those video assists are designed to address and to allow such video images to actually play a roll in the creation of the final images.

Figure 5:
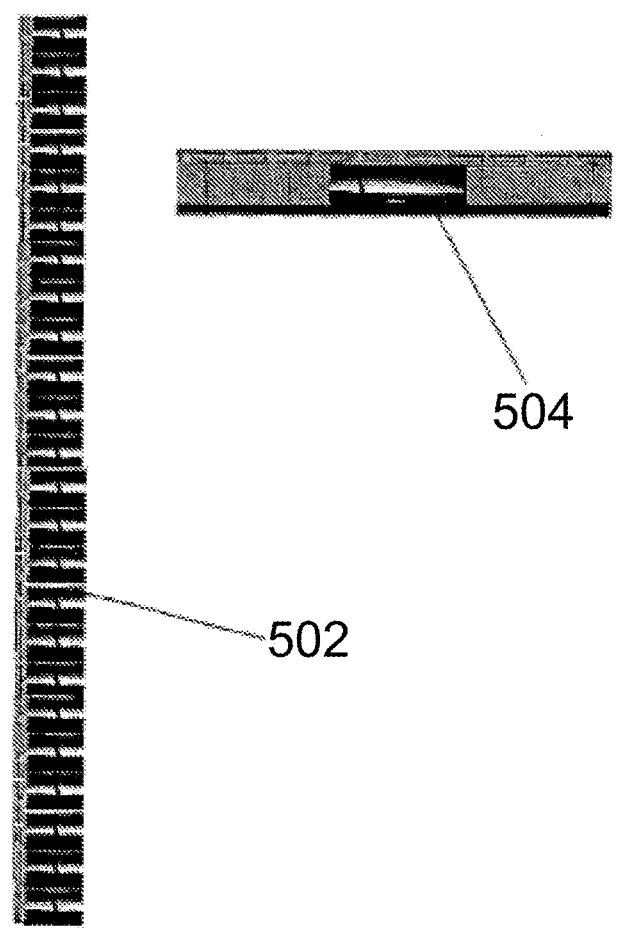
FIG. 5 shows a 16 mm camera configuration, wherein a single horizontal 16 mm key frame.

FIG. 5 shows a 16 mm camera configuration, wherein a single horizontal 16 mm key frame of 3 perf size, 504, for cinema and/or television ration images, such as plasma TV high def, results in a key frame image superior to conventional 35 mm 6 k capture, while reducing the amount of film potentially shot from 24 perf, or 16 mm sprockets, per second to 3; again increasing film roll recording time from approximately the 10 minutes a 400 foot roll of film provides, to 80 minutes while resulting in 24 images per second, each of over 6 k image data size potentially, as opposed to conventional 16 mm images, 502, that can be restricted approximately to a 2 k size, single sprocket vertical exposures in a conventional 16 mm camera, such as the Arriflex SR cameras.

Figure 6:
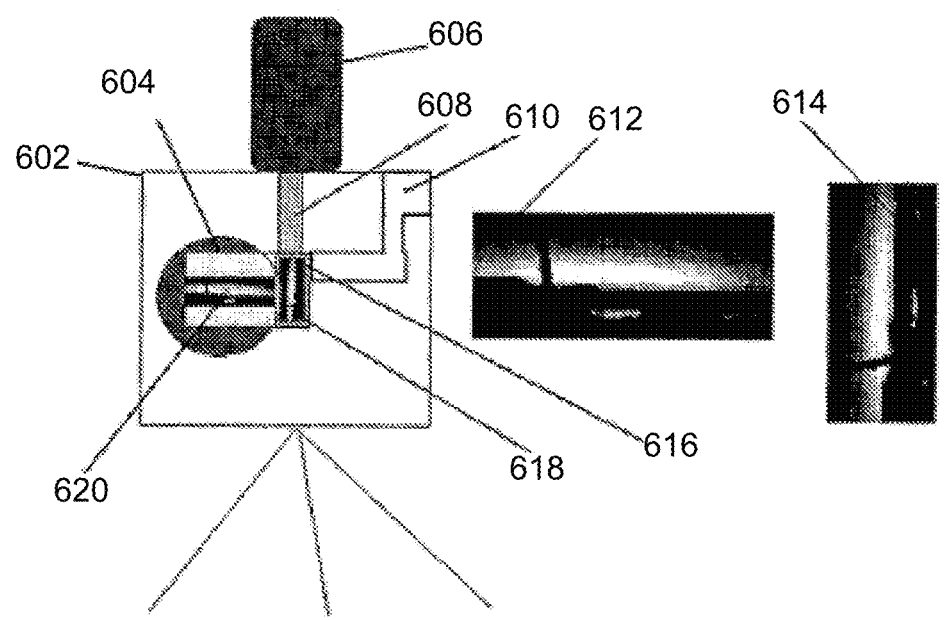
FIG. 6 shows an optically or otherwise repositioned image as captured by a film or hybrid camera for recording horizontally onto selected emulsion type.

FIG. 6 shows an optically or otherwise repositioned image as captured by a film (or hybrid) camera 602, for recording onto selected emulsion type 608 horizontally, despite vertical delivery of the stock from magazine containment 606 to the film gate 616.

In one configuration, a lens delivers a visual as image 620 to an in-camera target area 604 selectively of the size necessary to expose the volume of emulsion properly, desired. Optic element(s) and/or mirroring or other image affecting means relays said image while affecting a repositioning, for example, a 90 degree repositioning. This allows visual 612 conveyed through the camera as image 620 to become modified image 614 prior to affecting (exposing) film stock 608 within modified film gate 616, the image being recorded as vertically repositioned image 618 held within the selected emulsion prior to continuous or intermittent advancement to the next length of unexposed emulsion within stock 608, perhaps one time per second.

This configuration allows a type of film camera conventionally designed to provide film stock for exposure to a film gate from a top mounted, vertical film delivering format, to benefit from the present inventions larger, horizontally relative to a length of stock recorded key frame image onto film for affecting a plurality of final images with each key frame recorded within the emulsion.

Optionally, electronic, e.g., video, digital video, or other medium, capture unit 610 may capture selectively 24 frames of video per second, and further provide film camera "video assist" functions and benefits, while capturing the same (selectively) lens image, or other capture aspect, providing the visual stimulus continuously or intermittently to the emulsion for recording. This use of the same visual for electronic and emulsion capture may involve a diversion of all or a selected amount of the lens image temporarily to provide the light stimulus for electronic capture, or a beam splitting component may selectively extract a small portion of the lens image for separate relaying to the electronic capture aspect, reducing overall lens image light selectively used to expose the emulsion.

The electronic capture unit can be a part of the camera, 602, or working at least in tandem with the film capture aspect should the same lens or related image capture element relay the visual to the electronic capture unit within the same prescribed time period as the emulsion receives related image(s) for example one second of time.

As before mentioned, time code data may be recorded or otherwise tracked from added or existing media information provided within the film stock and/or electronic capture media storage means, for subsequent automatic and other reference between corresponding images related to the same visual(s) to be modified by the present invention's software/program aspect.

Figure 13:
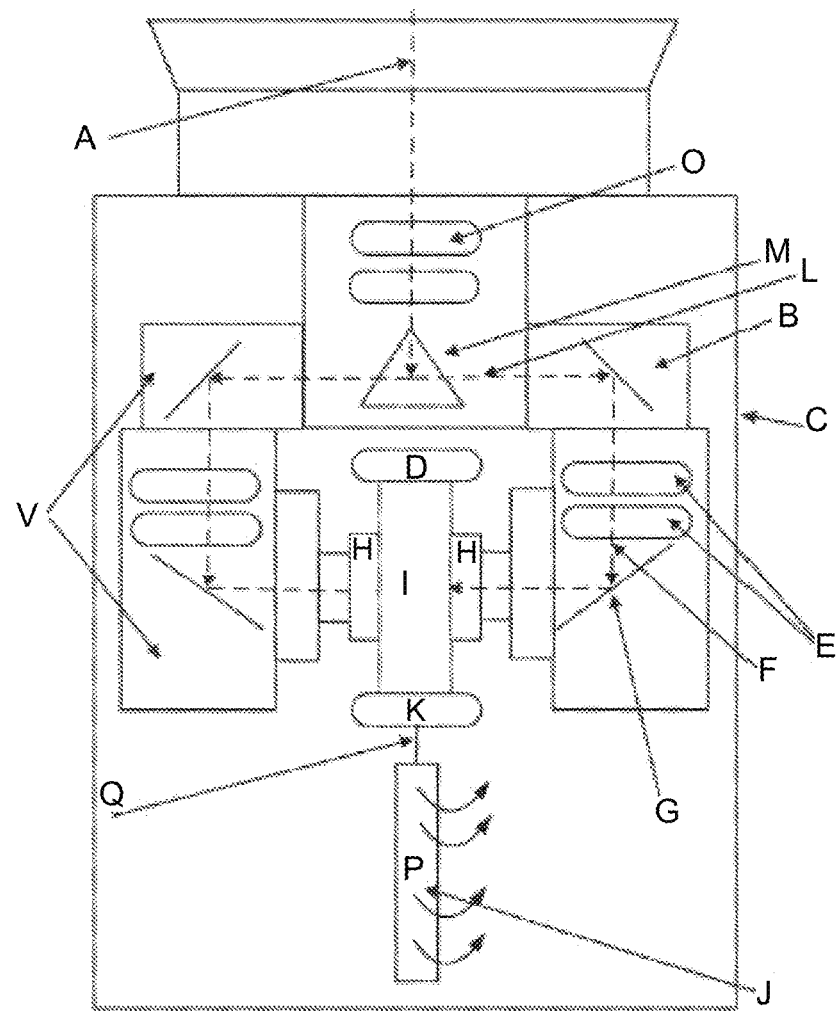
FIG. 13 shows an over camera view of a double sided emulsion exposing camera.

FIG. 13 shows an over camera view of a double sided emulsion exposing camera. A: Original lens image; B. Mirror or other relaying means to send diverted of divided lens image toward offset gate to expose one side of the film strip; C. Camera housing; D. Roller for returning film to magazine, selectively twisting the film 90 degrees, to reposition it as film coming out of a non-offset gate would foe provided by a film magazine; E. Selective optional secondary optics and/or exposure means to affect the lens image, including the ability to focus the lens image uniquely; F. Lens image or portion thereof selectively affected or not by secondary optics and affecting means; G. Additional selective lens image diversion means, such as a mirror, toward exposing film within an effect film gate; H. Film gate; I. Offset film containment and management, optional; J. Film being returned to the magazine, exposed; K. Roller to selectively repositioning film for return to film magazine; L. Diverted and/or divided lens image, after mirror or beam splitter affect on lens image; M. Lens image after primary optics, such as "zooming" are imposed; N. Beam splitter and/or variable mirror for relaying all or part of the lens image to more than one location, for selectively intermittent (or continual) relaying to media; O. Primary optics, such as zooming; P. Film from magazine moves toward roller and gate; Q. Film twisted 90.degree. by roller means (or other)

Figure 14:
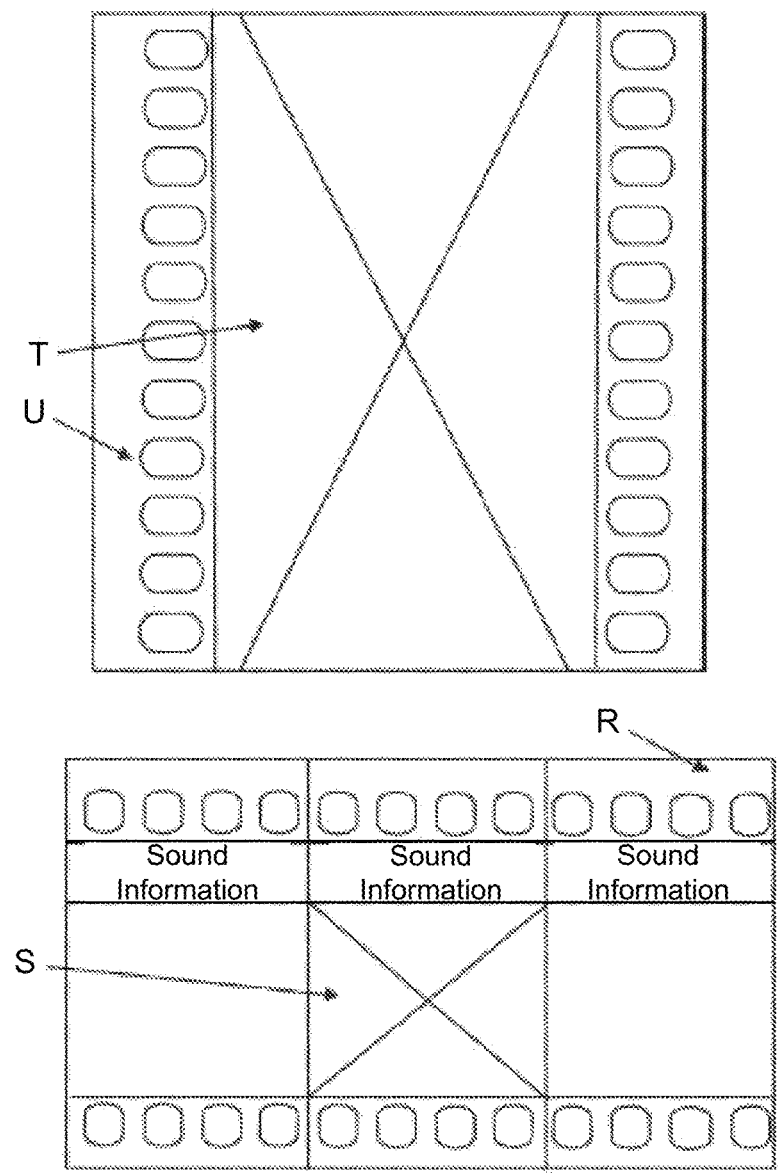
FIG. 14 shows enlarged 35 mm film stock.

FIG. 14 shows enlarged 35 mm film stock. R. Enlarged 35 mm film stock, Vertical as it approaches film gate for exposure in conventional film camera; S. Image recording area for a selected cinema dimension; T. 3 mm film (enlarged) in the horizontal position as it approaches film gates (both sides) of the present invention; U. Image recording area more than 4.times. that of conventional 35 mm filmed recording. Total recording time of 1,000 ft of 35 mm, double sided stock, in this configuration is minutes.

Figure 15:
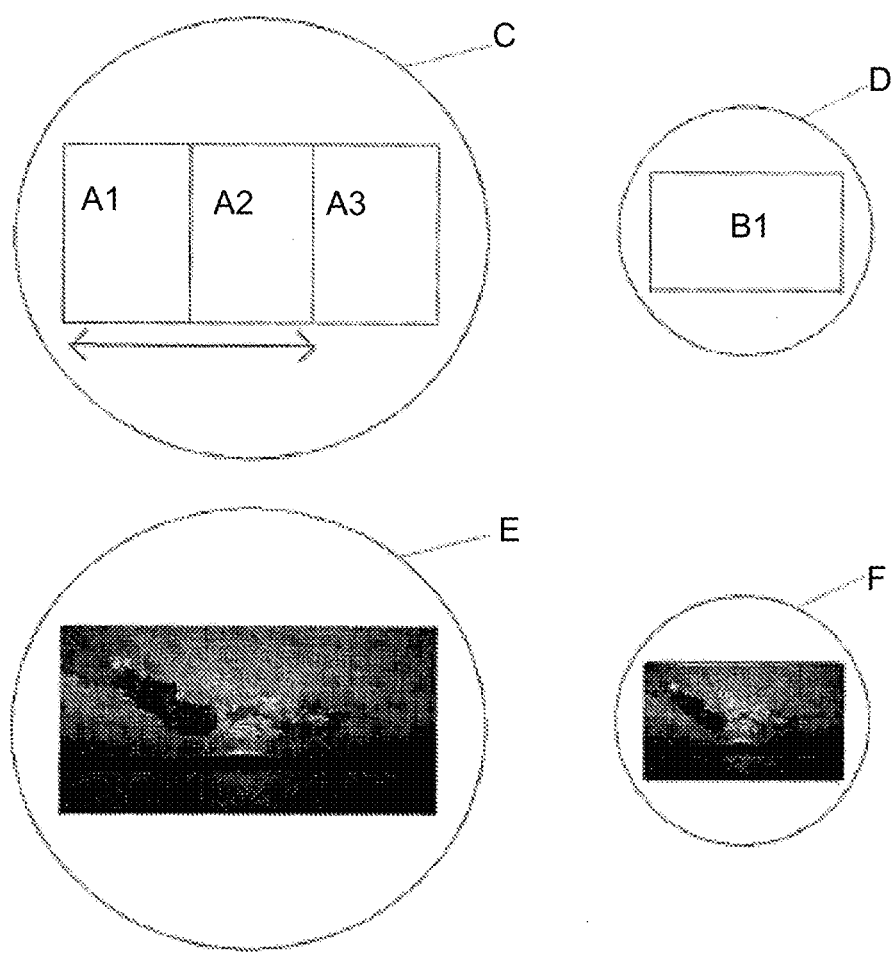
FIG. 15 shows an embodiment of a hybrid imaging system configuration of the present invention.

FIG. 15 illustrate a hybrid imaging system embodiment of the present invention. A conventionally placed electronic imaging element, such as a CCD, hereafter this element will be called the "chip(s)") may be selectively (and not essentially) repositioned, 90 degrees, A1. Thus the rectangular dimension of the capture device, typically relaying information for a 1:65 to 1 dimension monitor display, may provide a similar 1:65 dimension coverage in a different way, as illustrated by A1, A2 and A3 when factored collectively as a single imaging plane within a larger lens image target area than is conventionally provide for such a chip(s).

The vertically positioned CCD, or other light sensitive electronic imaging device positioned typically in line with a lens image, when "moved" left to right, continually or intermittently, though any motion allowing for clean capture of a new portion of lens image C is primary, e.g., from A1 position to A2 and then A3. After repositioning, the chip(s) will cover at least the 1:65 to 1 when moved from one side to the other, (left to right, or vice versa) a three-stop coverage of a larger lens image area may allow for a single chip (or array of 3 chips, if color is fragmented) to provide as few image captures as the operator may desire within a single second of time; in this example, three in one second. As few or as many separate image "portion" captures may be acquired within configurations of this system, the more captures made creating a more fragmented "mosaic" or puzzle version of the lens image and also providing potentially more image data for an ever more highly resolved "composite" or mosaic key frame, which may be assembled from the distinct image portion captures under functions of the present invention.

During the three-stop capture of a lens image that is large enough to cover the entire zone through which the chip(s) or other capture element(s) will move, a secondary function of the hybrid system is to capture a more frequent sampling of position information of aspects within the lens image, as they shift during that second of time.

In a further embodiment, capture a sampling of position information over time is accomplished with a second imaging device, B 1, receiving a portion or all of the same lens image, either continually or intermittently; during the second of time the other capture device is moving and capturing "portions" of the lens image, on a second imaging plane. This diversion of the lens image to another imaging element to capture the entirety of the image area being also sampled and converted to electronic data/signals by the moving imaging element, provides a constant (24 fps for example) record of the entire desired framed image for at least "positioning" information related to image aspects as they shift potentially, during those 24 frames captured in a second of time.

Several goals are accomplished by way of the moving chip configurations potential of the present invention. Video cameras, including digital cameras, either still or for entertainment imaging, may employ capture elements of conventional resolution potential in providing image information resulting in final images with resolution potentially many fold beyond any known stationary chip imaging devices available. For news organizations, for example, as their video camera captures relatively simultaneously a full frame video capture 24 times per second, the "mosaic" or moving CCD assembly of the camera herein may provide (as with this example) only three additional images for storage and relay, via satellite if in the field, in resulting in 24 final images per second with nearly three times the image information each, as any one of the 24 initial full frame image captures; factoring potential overlap between the mosaic image portion captures and considering the chips all have the same resolution potential, (2 k for example.)

E and F demonstrate the different sizes of the lens image versions relayed to the different imaging planes within the camera, wherein distinct imaging elements (chips) A and B capture the same visual; one as full frame captures and the other capturing three portions of the visual, moving to do so, resulting in all the information for program implemented by an image data managing computer to reassemble a seamless final version of the visual, e.g., sunset, with as much as three times the image information as a single full frame capture affected by B1, given A and B being identical chip/imaging element types. FIG. 1 illustrates that the mosaic capture is affected by a chip with double the data capture means of the full frame imaging chip, and demonstrates that the resolution of the full frame imaging chip capturing the "positioning" data, as discussed below, need not be comparable to the one involved in capturing the series of partial image captures. The partial image captures are responsible for the true final resolution of all final images provided by way of this invention.

It is important to say that the hybrid camera, with secondary full-frame capture of 24 fps data may be affected by non-imaging data sampling means; as long as a continual discreet record of elements being photographed and any change of position they incur during a selected number of samplings over a single second of time. For example, a signal transmission and receiving sampling device, resulting in even a wire-frame representation of the lens image and/or scene captured by the lens (or other imaging means) would be an example of a potential replacement of the second imaging unit (full frame) providing all of the data necessary to affect final images and working in tandem with the partial image captures to provide data necessary for subsequent computer assemblage of those final images.

Figure 16:
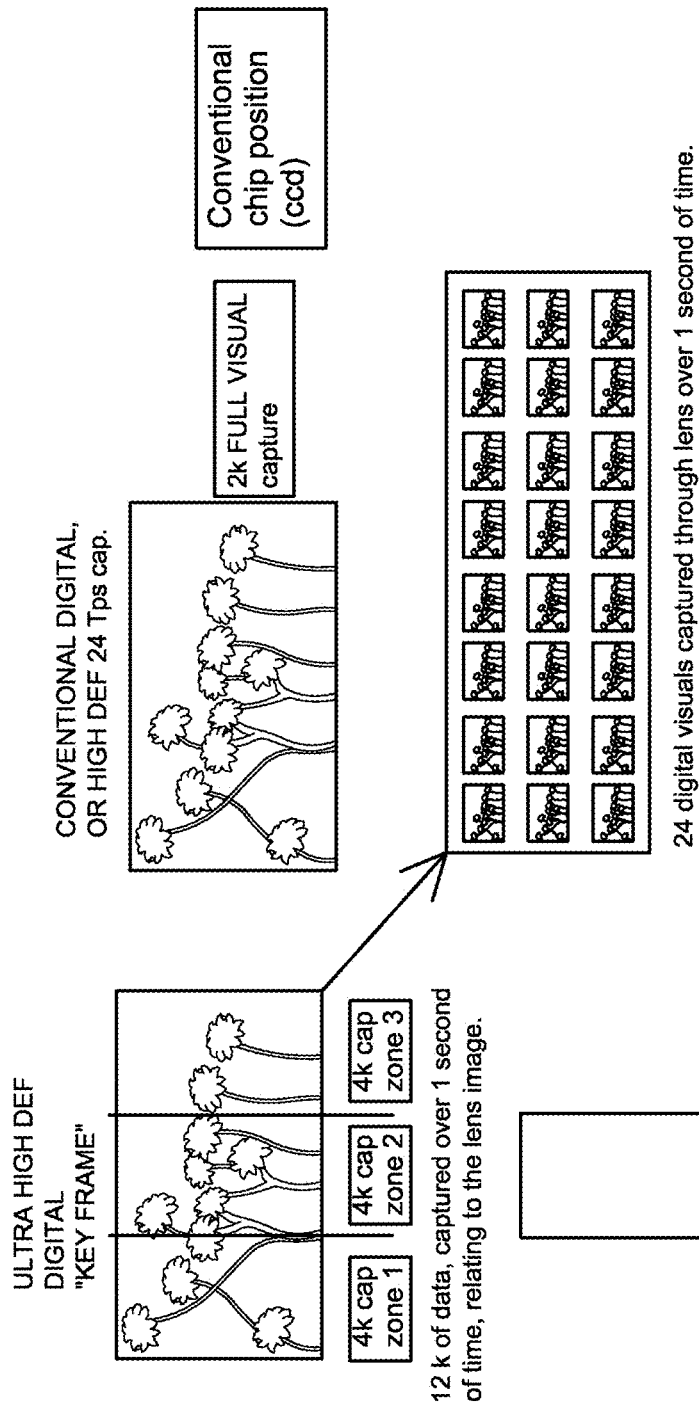
FIG. 16 shows an embodiment of a hybrid imaging system configuration of the present invention.

FIG. 16 shows a hybrid imaging system configuration as an embodiment of the present invention. As the conventional 24 fps captures provide the "wire frame" image aspect position data, the richer Key Frame data, by image zone, can replace image data in every one of the 24 images with exactness, resulting in 24 images each with up to 12K data. These images are indistinguishable from images of the same scene from a hypothetical camera, not yet in existence, with a 12 k image capture capacity.

Figure 17:
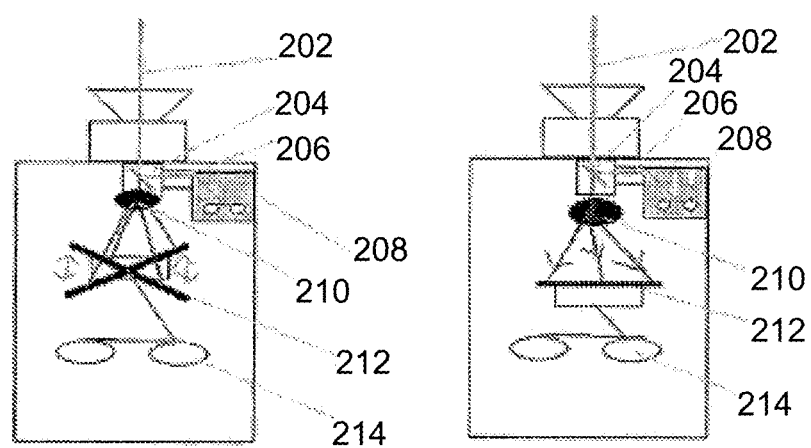
FIG. 17 shows the moving and static configuration potential of the electronic imaging element.

FIG. 17 illustrates the moving and static configuration potential of the electronic imaging element, such as a CCD, and optic element, such as lenses/mirrors, to achieve the mosaic key frame capture and store the result.

Lens image, 202 enters the hybrid (full frame/partial frame capture system) camera, encountering image diversion component 204, e.g., mirror/prism or other aspect. Full frame capture element 206 captures and relays for storage the full frame image data, to storage means/component 208, e.g., drive, tape or other.

Optic array 210 relays the selected portion of lens image 202 to partial/mosaic image capture component 212, which may be static or move in a selected direction or directions in order to function in tandem with image portion relaying component 210 to cover the selected number of image portions to form the desired mosaic key frame image result. The present example of the motion potential these components is not limiting, as they may move even in complete circular motions potentially, in a configuration, in relaying and capturing the cycle of image portions representing the full frame image captured distinctly 206.

Once again, the entire 206/208 assembly, potentially similar to a "video assist" aspect of a camera, may be replaced potentially by a different data sampling means working in tandem with the captures affected by 212 and stored by drive/tape or other storage means 214. Therein, as long as a proper record of image aspects' shifting during a selected duration affects final images assembled from key frames (created from data captured sequentially by 212) provides the seamless aesthetic result, e.g., of 24 fps of fluid video with the data thresholds of the full key frames.

Figure 18:
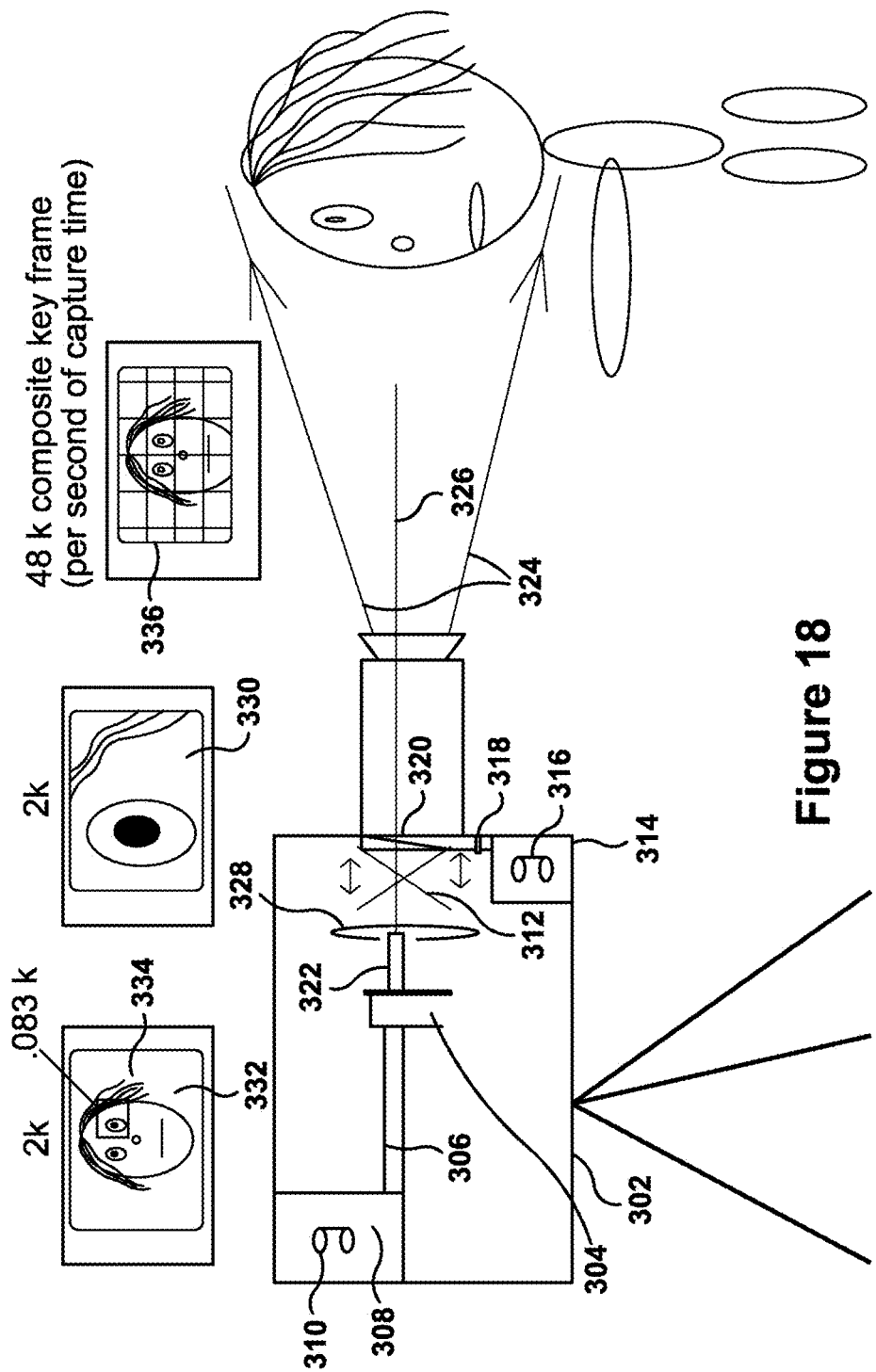
FIG. 18 shows a camera configuration of the mosaic capture function as an embodiment of the present invention.

FIG. 18 illustrates another camera configuration of the mosaic capture function as an embodiment of the present invention. Herein camera 302 is delivering lens image 324 to two distinct imaging elements, 304 and 318, for example, CCD imaging devices. Lens image diversion means, 320, for example, a mirror, delivers the full intended framed image, represented on monitor 332, to imaging element 318 for storage on drive, tape 316 or other image data storage component, 314.

Optical element(s) 312 and/or 328 represent both a magnifying of lens image portion 326, into relayed lens image portion 322, represented on monitor 330, and a preferably intermittent shifting of the portion of the lens image being delivered to the now static imaging element, such as CCD, 304. Herein 24 distinct portions of the lens image 324 are captured by element 304 within a single second of time, relayed 306 to image data storage component 308, which is a drive, tape 310 or other image storage means.

As imaging component 318 captures 24 full frame images of the entire desired lens image, 324, a program distinct to this invention operable by a computer reassembles the image portions stored by 308, in essence reconstructing the puzzle of the lens image, as seen on monitor image 336. The benefit herein being, that as optical elements 328 and/or 312 complete their "sweep" of the image area to deliver the 24 distinct, clean image-portion captures to imaging device 304 Imaging device 304 has in fact captured a mosaic "key frame" with as much as 48 k data, e.g., if 304 is a 2 k capacity imaging chip.

Thus, informed by the "wire frame," or changing positioning of the elements within the overall image, recorded as frill frame data by 24 fps capture store 314/316, the program can create 24 fps final image data that applies the potentially 48 k data, in this example, to each and every of the 24 final images, allowing for enormously data rich final images; by using a single image per second, for example, to provide resolution and 24 frames per second of standard resolution captures to provide the positioning data for shifting elements captured within lens image 324.

Again, the ancillary capture aspect, 314/316, may be as simple as a "video tap" adjunct, to the camera. However, this image aspects' positioning data may be captured as literal image data or as wire frame data acquired through a non-imaging sampling means, radar, sonar, and other send/receive systems for collecting position data within a selected area, are some examples.

So, just as a "zoomed in" still camera with 5 megapixel capture means, still captures that much data even if it is zoomed in to a portion of the lens image, optically, the present invention allows for several of such "zoomed in" portions of the overall lens image to be assembled to create a tandem visual; if 4 portions of the image are captured thus, a final still image of up to 20 megapixels is the result. In a still camera configuration, a single full frame capture may be followed by a quick series of image portions affected by shifting optics, to provide the image portions to be "pasted" into the proper position, represented by the single instant taken by the one full frame visual/capture; which preferably occurred just prior to the image portion captures, if not during.

The computer program of the present invention, as operated on an image data managing computer, factors potential overlap within the mosaic/composite captures and seamlessly recreates a full frame visual, of the lens image with several times the resolution (and data threshold) of any single capture affected by the chip(s). Further the computer and program manage data provided by the "image aspects' positioning data samples," preferably secondary full frame captures of the lens image, to allocate the highly resolved composite key frame data over 24 final images, shifting the highly resolved elements of that key frame image based on true image information informing such element's shifting positions, provide by the full frame captures, or other positioning sampling means working in tandem with the mosaic image capture aspect(s) of the camera.

The advantage to optical elements, or other image diversion means, delivering the subject image, or light, to the capture element for mosaic capture, is that the target area for the light (in this example the light of the lens image) need not be enlarged relative to what is normal. Herein, the stationary chip(s) receive the conventional lens image coverage, with the "shift" in what aspect of the lens image being conveyed to that chip(s) being affected/altered optically until all portions of the image comprising the desired mosaic image, (be it 3 portions or 24) are covered and recorded. The present example provides one complete mosaic/composite key frame every second, as the secondary capture element provides 24 frames of full frame information. However, the frequency of each key frame being generated relative to samplings of image aspects' shifting positions within the frame, is entirely selective.

Figure 19:
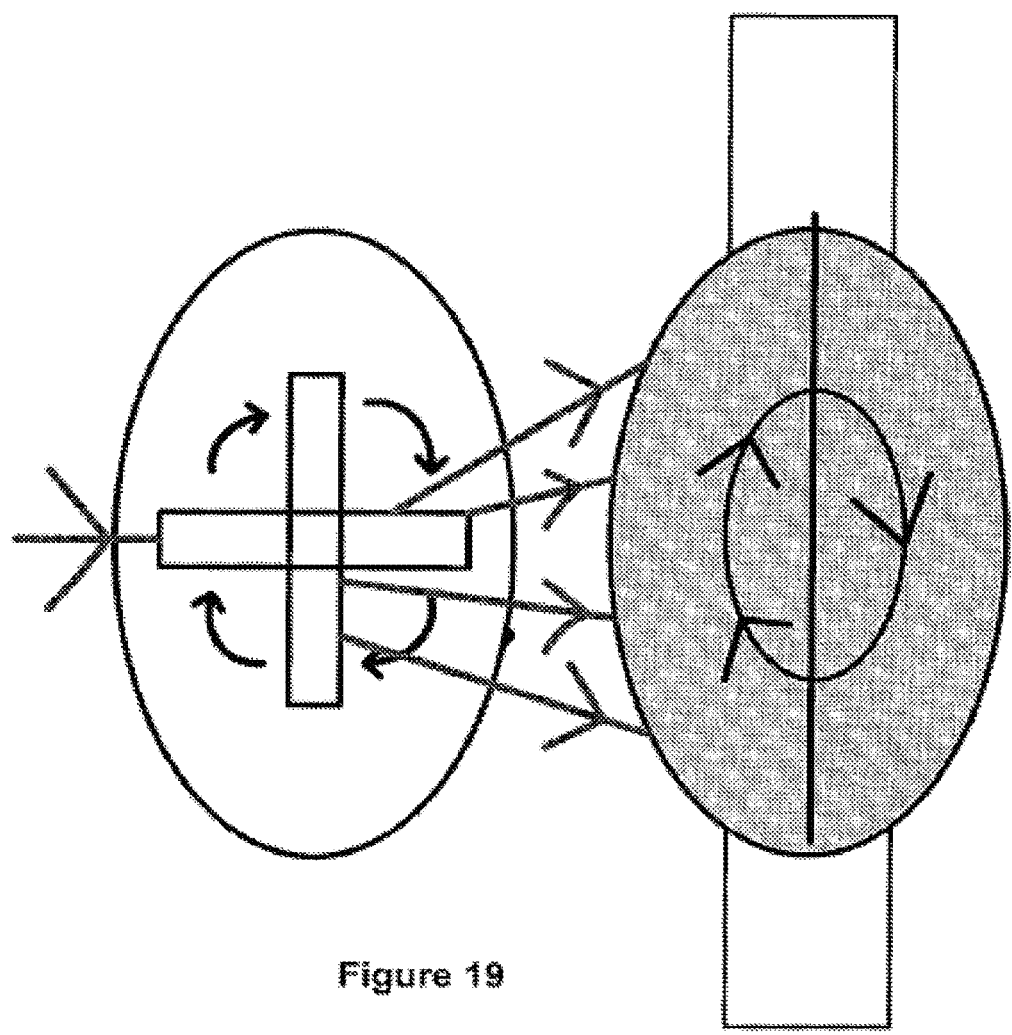
FIG. 19 shows an assembly of rotating imaging elements, e.g., chips, working in tandem with moving optical components.

FIG. 19 shows an assembly of rotating imaging elements, e.g., chips, working in tandem with moving optical components. High speed motion picture cameras include moving elements, such as optic elements, to provide static images onto moving film, foregoing aspects of intermittent transport to facilitate faster transport speed through the camera— while maintaining sharp image captures. Herein, a further configuration of the present invention replaces intermittent, or "stop and go" motion of imaging elements (chips) and/or optical elements, such as lenses/mirrors, with an assembly of rotating or otherwise moving chip(s) working in tandem with moving optical components, to deliver sharp image portions to at least one chip (or imaging element) varying the portions of the lens image captured with intermittent motion being selectively replaced by fluid tandem motion of cooperative components that complete a cycle of a (preferably variable) number of image portions to create a mosaic key frame, before repeating the cycle, for example, every second.

Figure 20:
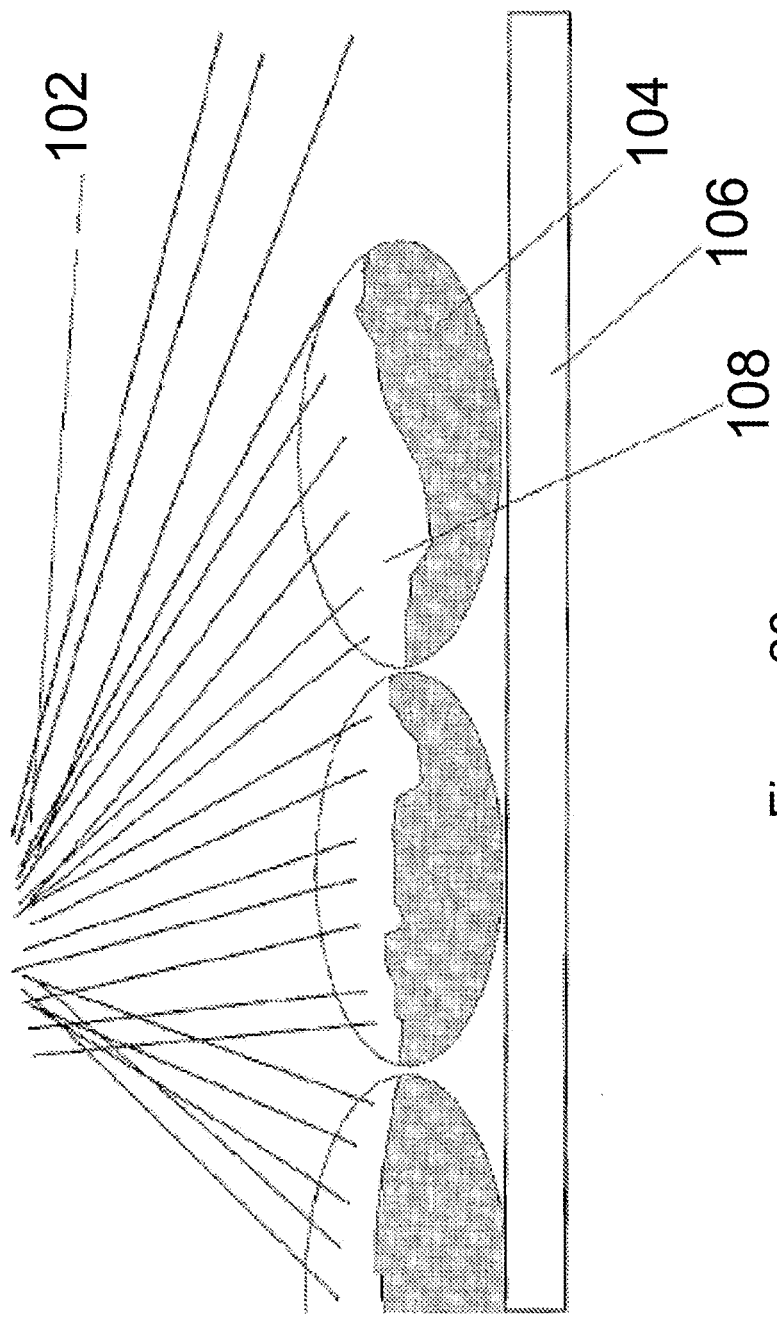
FIG. 20 shows several recording particle "elements" comprised of an image recording media component and a non-image data recording material component.

FIG. 20 shows several recording particle "elements" comprised of an image recording media component, 108, and a non-image data recording material component, 104. Herein these components are shown mutually fixed within each independent, unfixed element. These elements are freestanding, (granules or particles are reasonable terms related to these small recordable bits) and a physically repositioning affecting means places these elements at random within the exposure gate in selected density and general dispersal basis. These elements rest in an exposure gate, 106, herein, but prior to this resting state were, for example, blown into this position or magnetically moved to this exposure gate resting state and following exposure to a light stimulus, 102, the elements are again similarly moved out of this gate area to allow for a new group of elements to be positioned in the gate for a subsequent image exposure. Containments, in one embodiment not unlike the toner cartridges of printers, may provide the unexposed elements destined to the gate, and the exposed and recorded component bearing elements out of the gate, to another containment.

Thus in either containment the elements are randomized. The data recorded by gate electronic recording aspect, such as a magnet, 106, affects the non-image data recording element, 104, for example with specific reference data related to the resting position within the overall surface area of the gate, during exposure. This "where in the gate was I during exposure" data, corresponds thus directly to the position within an "image" provided to the elements, and thus a final image as well, as the image is being provided in the light stimulus provided to expose the image information, in this configuration photographic emulsion, 108.

Non-image data recording material, 104, for example, magnetic recording media, further stores information provided by gate electronic recording aspect 106 related to what image an element is related to, among a plurality of images representing individual distinct exposures to the light stimulus. The exposed elements containment from which the elements removed from the gate are sent and maintained, in this configuration will hold a large number of randomized elements later to be allocated by computing means and a distinct image data managing program, to the correct final image and the correct point, (in this configuration pixel placement) within the overall image.

Figure 21:
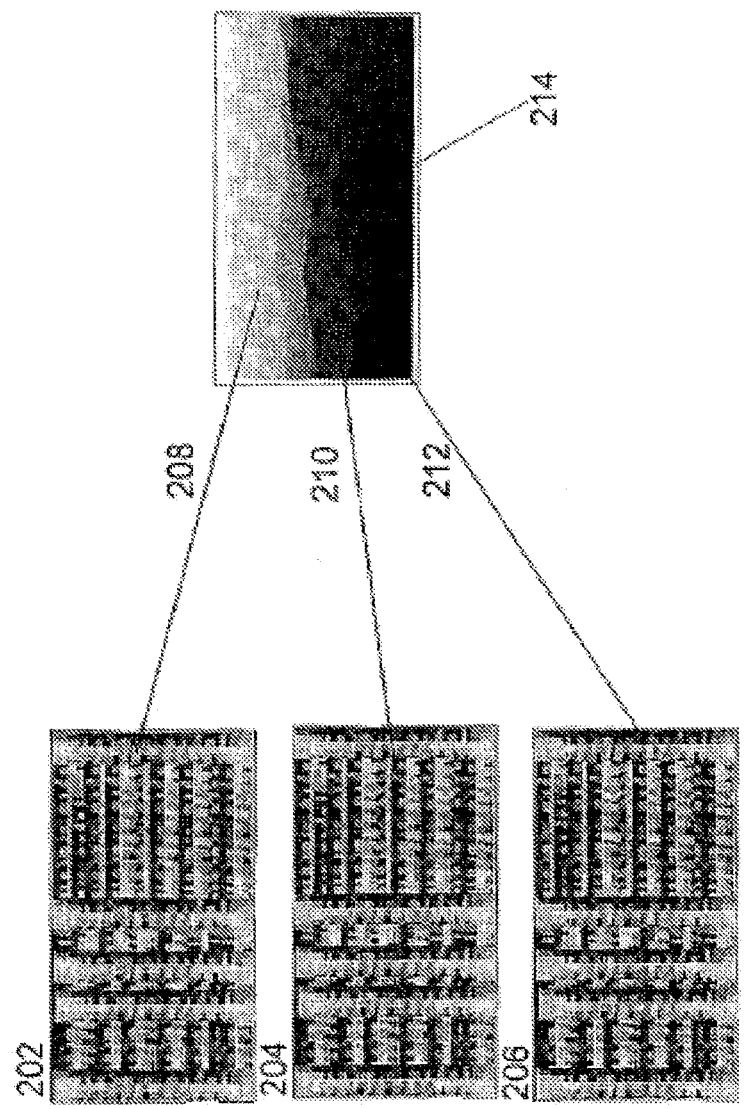
FIG. 21 shows three groups of processed and digitized image data components of a large number of elements.

FIG. 21 shows three groups 202, 204, 206, of processed and digitized image data components of a large number of elements, given that potentially an element may hold as little data as that corresponding to a pixel or the equivalent, though larger element component sizes are indeed fine based on the aesthetic discretion of the desired system.

These groups in the present configuration, (though not only option) are elements spread to a thin, one element thick, layer on a containment surface. This containment herein is to allow for more conventional emulsion processing and digitization. This containment also allows for uninterrupted subsequent reading of the non-image data components of the elements.

Image aspect corresponding reference 208, demonstrates computer and specific program operation to read the non-image data related to element 208, which is pointed out in it's randomized presentation prior to final image creation, and then after non-image data dictates which final image this element pertains to, and what aspect/position within that final image this element represents. Indeed, as demonstrated by elements 210 and 212 and their non-image data record as computer implemented, also occur in the same final image as element 208. This demonstrates the widely randomized elements due to the bulk containment following exposure; again, this containment is a box holding many elements, similar to the color particles occurring within a printer toner cartridge. An important difference is that a toner cartridge provides particles that a computer must indicate where to place, in the creation of a printed image, the toner itself having no such reference to any specific image. Herein, the elements in their particle form, in fact "know" where they belong within a series of final images, by way of the non image data recorded within the appropriate component, (under the emulsion side, which faces up) which receives such data for storage while the elements are motionless in the exposure gate.

Options for maintaining maximum proper component in position, e.g., up and down, may be achieved potentially by magnetic means, for example, the non-image data side being affected to pull down toward the gate. A sufficient plurality of image information bearing elements may occur without such extra steps, with a proper quantity of elements being provided in a selectively effective dispersal within the gate.

The exposure gate can be of any selected size. By reducing enormously the weight, mass and surface area of raw material, for example, film stock, by eliminating at least the celluloid aspect and providing the unexposed emulsion in a powder-granulated-dust like form, the final image resolution result can be profound. For example, a gate can be larger than those known to 65 mm and all related to 70 mm motion picture systems. If configured in the Key Frame system configuration, wherein a single emulsion image is captured for every 24, for example, through the same visual providing camera lens, the emulsion elements or granules exposed and blown by compressed gas, for example, into a containment for the exposed granules may provide to all final images data thresholds equivalent to, for example, 20 k images and higher. See, for example, U.S. Pat. No. 5,687,011, and U.S. application Ser. No. 11/549,937, filed Oct. 16, 2006, each incorporated herein by reference in their entirety.

In one aspect, a hybrid emulsion and digital originating camera features discreet cartridges similar to large printer-toner plastic cartridges, that like the old super-8 cartridges for film, may be popped on and off following expose of the entirety of a cartridge of such emulsion elements or granules, and each of these potentially surprisingly compact and light cartridges may provide final images many fold more resolved than the heavy, large, cumbersome 1,000 feet of 35 mm film stock, and the single cartridge of the granules may further provide total recording time far in excess of 10 minutes per cartridge, improving on several aspects of emulsion imaging. By contrast, an emulsion originating camera requires a large celluloid emulsion magazine of film, allowing for only 10 minutes of capture time within the overall camera configuration. These elements, or granules, of recordable emulsion which contain a separate record of "where they belong" both in regard to which final image and exactly where within that final image their image data pertains, might be called "smart dust" emulsion, to simply imply their functionality.

Although in one aspect these elements are disclosed as a hybrid media scenario, for each element, in fact a further embodiment can involve only emulsion as both recordable media aspects. For example, image data is recorded on side, or part, of the elements. Recordable emulsion on the other side, or another part of the element might receive a visual or other appropriate stimulus encoding information, for visual recording and subsequent reading. Such a usable code for the image data positioning information, might be a micro bar code or other type of scannable-readable data encoding approach. The issue would be for each element, or granule of "smart dust" to be of a large enough size, however small, to provide sufficient non-image data recording media, e.g., emulsion, to inform the location of the corresponding image information bearing media, however small or large an amount of information that image information may be.

In an embodiment having an emulsion only recordable element, a third component, at the core of the granule or element that is potentially non-recordable, or possibly recordable, may provide a core for emulsion to coat, potentially as a ball or particle featuring only recordable emulsion on its entire three dimensional surface. One benefit of such an approach is that in providing such granules to the camera exposure gate for image capture, there is no question that recordable media is covering the gate area, at least entirely where each element granule occurs. Further the question of "which side is up" is no long an issue, the non-image data being potentially provided through a transparent gate floor where the granules rest during exposure to original visuals-light.

Like the moon which remains dark on one side while being exposed to the sun, where the moon is an example of an enlarged element granule, coated in emulsion with the interior being made of a structure and shape maintaining moon rock, the dark side of the moon might receive an emulsion recording stimulus also, to store a bar code or other information encoding image for subsequent reading resulting in a granule with an image of just a part of the sun recorded on one side and a bar code, for example, on the reverse. Following emulsion processing, the image information can be potentially digitized or otherwise prepared for image display. The information recorded on the dark side of the moon can provide reference to where within a specific final image of the entire sun that element's piece of the sun visual information will be provided in subsequent image data processing and final image creation.

Like VistaVision technology, film would be provided to the film gate horizontally, making the image size only limited "vertically" by the width of the film (gauge size) such as 16 mm or 35 mm. In a further configuration, the film stock, (16 mm in this example though 35 mm is equally exemplary) the film stock itself would not need sprockets; with the registration technology options today, and transport options, sprockets are cumbersome and wasteful of potential image storing media. The present invention, in the 35 mm configuration, would provide an image of a resolution and quality (original) that surpasses any digital originating information capturing means existing, providing the sole option today to capture a visual that only "tomorrow's" digital or other technology will have the ability to approach, during image capture.

Film can be selectively provided by a conventionally positioned film magazine, (of the normal or "disposable" configuration disclosed herein, involving reusable magazines loaded and unloaded by the manufacturer only). Film could be provided by a horizontally positioned magazine; meaning 90 degrees perpendicular to the normal upright position of film magazines. This precludes additional film management and positioning needs, such as rollers turning the film 90 degrees to get it into the horizontal position for the film gate, and then back 90 degrees again after exposure to replace within a vertical film magazine. This positioning of film stock is useful in the present configuration as described for the present invention.

Herein, the providing of film stock to a film gate which is selectively similar, and selectively variable, in dimension to a rectangular cinema display screen, such as 1.66, or 1.85, (or for the present configuration the width herein will be 2 to 1. The advantage is that, in the case of 16 mm film, the visual can be selectively stored on an emulsion surface 16 mm "high," or closer to 14 mm if perforations are maintained on one side, and as wide as desired, in this instance, 33 mm or wider, for example. Though, the width would be entirely selective, potentially, by virtue of the virtually unlimited left/right media space per visual.

The present invention, in part, thus provides means for generating 35 mm, for example, wide visuals on 16 mm film stock, and visuals in very close dimension to cinema and HD screening dimensions, requiring little adjustment or distortion in the processes of providing final images to these screens. And, as said, 35 mm film stock would provide the means to originate material that surpasses the information capturing/storage means of any digital system, potentially for the foreseeable future. The emulsion surface area will approximately quadruple the visual information per image stored in the film stock. In fact, the use of 35 mm double-sided emulsion film stock and modified 35 mm film cameras, allow for an increase of emulsion area per visual of between 2 and 4 times, or more, than that typical to 35 mm film capture, depending on the amount of overall recording time the magazine of film is selectively reduced to, for example, from 10 minutes.

In one configuration, a single visual is recorded horizontally onto the film stock, which is selectively positioned parallel to the horizon line, relative to the film recording plane, and the lens capturing the visual. The recorded single visual would selectively occupy the space once allocated to, for example, three frames of 35 mm images. The dimension of such a recorded image is selectively very close to the horizontal dimension required for theatrical visuals, utilizing the increased emulsion made available, to a great degree and with minimal waste and "masking" needed to achieve the motion picture screen dimension, such as 1:85 to one, or even more rectangular in shape.

Herein, the use of the space of three typical film frames' emulsion area, would be compensated by the use of the opposite side of the film stock for recording as well, resulting in total recording time of a typical 1,000 foot roll of 35 mm film, 10 minutes approximately at 24 frames per second, to just under 7 minutes, though with a total emulsion surface area per image increased to approximately 4 times what is conventional on 35 mm, if not even greater recording surface area. Maintained as 10 minutes of material at 24 fps, the emulsion surface area over typical 35 mm vertical, single side of stock standard) still vastly increased without affecting the standard recording time of a "roll" of film.

Again, as films today typically reach a "digital intermediate" stage, the fact that the film exposed is not created with "projection" in mind is logical and inherent to this invention. In fact, sprocket holes are not necessary, in a film transport means based on a selected advancement distance; digital post production means may provide perfect registration of final images, (and matching of images by code or other means) from one "side" or strip of the film stock and the other. The sprocket hole and other film area may thus be employed selectively entirely in the recording of visual and other data, either entirely in the emulsion or within selected other means provided in the stock, including, but not limited to, magnetic recording material.

After exposure of the double sided film stock, it is likely that after processing of the film, prior or selectively after being "split" and separated into two strips, the lengths of larger horizontal filmed visuals will be digitized by an adapted "data-cine" or "telecine" apparatus capable of scanning the larger film frames; following digitization, these "negatives" on the thinner strips, relative to conventional 35 mm film, will be stored then for possible future "re-scan" when increased scanning and data storing means exist, beyond what today's technology can offer . . . . These larger filmed frames thus contain the additional image data for future application, relative to conventional 35 mm productions, or conventional digital cinema, e.g., digital origination, available today.

In a further aspect, the present invention provides selectively mirroring or related optics/image diversion means may relay the lens image to one film gate on one side of the film stock, for recording, and then the other gate, in a staggered delivery, prior to the film stock being advanced to the next horizontal frame of unexposed emulsion; in this configuration, the film stock would thus need only be advanced twelve frames per second, to achieve the 24 fps overall recording, both sides having been utilized. The image diversion means may selectively provide all, rotating mirroring or other means, or part of the lens image by beam splitting means, to each of the respective larger film gates. The lensing and hardware would be naturally adapted to accommodate the selectively width variable film gates which now are closer in size to the old "70 mm" film gates, in size, (which recorded visuals closer to 50 mm in actual recorded image width, depth of field and related photographic aspects selectively being affected by the change in "gauge size" or gate size, to the degree that optics and related hardware would need to accommodate same.

The present invention thus provides means to expose both sides of film of a selected gauge size, with the use of 35 mm film, for example, providing filmed visuals of a resolution far superior to typical 35 mm filmed recordings. These film recorded visuals would selectively provide more information per visual than conventional digital systems can deliver today, thus providing filmed visuals potentially more compatible with digital (and other imaging systems) of the future, as the larger emulsion area holds a vast amount of visual information, surpassing image origination data typical to even the newest digital cinema options.

Should the 16 mm format be used to originate under the present invention, a final "print" from the "horizontally exposed" images to a conventional 35 mm film stock in the conventional direction and format, might be affected by printing means to alter the exposure level and/or color aspects as the visuals are "printed" onto another film stock, such as an "internegative" stock.

The goal being, to end up with a high quality negative of the "larger" gauge size, embodying aesthetic adjustments chosen in the digital domain and also benefiting from the unconventional use of the smaller gauge format, for example, 16 mm, to achieve visuals of, or nearing, those typically recorded by the larger gauge size, conventionally.

In total, the present invention provides means to originate with film using "smaller" lighter equipment while resulting in the comparable "original negative" surface area, and resolution and quality, to larger film gauge bases. Further, the present invention allows for origination with familiar 35 mm systems, including the lensing and housings familiar to the industry, while resulting in visuals with quality and resolution comparable to "70 mm" originated visuals, thus achieving the goal of surpassing the amount of visual information captured and stored during original photography of any digital system presently available, even if the initial use and screening means does not employ larger than existing digital technology, such as 2 k or 4 k, as the "existence" of an original "negative" that future technology can extract vastly more visual information from, for example, 20 k, renders that project "future ready" and in fact more in synch with the future of digital cinema and television than any existing digital origination means may provide.

With the enormous expense of making and releasing films, the availability of an original negative that may provide future applications in synch with the capture devices of the future, increases the potential for that project to be displayed more in the future, should systems upgrade to larger information management/display means, without significantly changing the capture, weight and expense aspects of originating on film.

Further, the staggered relaying of the lens image to one side of the film emulsion and then the other allows for the double sided film emulsion to be advanced once for it's entire length, without employing the other options of reversing the direction of the film, or employing a continuous "loop" and reversal-of-side or twist, means to allow the camera to expose one side of the stock entirely and then the other, entirely. However, the present invention does not preclude those or other options being employed in the horizontal exposure of the film stock, on both sides.

In another configuration of the present invention, conventional film stock of any gauge size, is exposed horizontally. The "magazine" of film storage means, often placed behind, or above the camera's mechanism and film gate, is selectively placed behind the camera, as is common in cameras by Arriflex and Aaton; this positioning is however not essential.

The film in this storage, e.g., magazine, would be horizontal not the typical vertical position, and thus parallel with the horizon, if the shot being captured were of a sunset/horizon for example. Thus, the film would enter the camera mechanism or film gate area as with Arriflex cameras, in the horizontal position. In the case of 16 mm film, the sprocket holes on single per stock, would selectively be occurring on top, or on the bottom of the stock, as it is presented to the camera film gate for exposure; without necessity, the present invention positions these sprocket holes on the bottom.

In the case of typical 35 mm stock, the sprockets occur on top and bottom; the present invention in one configuration involves film stock with only one side bearing sprocket holes, or in a further configuration, no sprocket holes as the digital domain eliminates the issue of registration, such subsequent picture matching occurring selectively in digital post production reducing concern over exacting position of film stock through the mechanism and film gate of film cameras.

The optics of film camera(s) would be modified to be similar to those of a larger gauge camera, as the present invention provides for exposure of emulsion areas typical to the "next step up" in gauge size: 16 mm cameras providing more like a 35 mm exposure emulsion area and 35 mm cameras of the present invention providing a remarkable gate and emulsion exposure area potentially surpassing that of typical 70 mm stock exposure by known 70 mm film cameras (and 65 mm, and others related to this large gauge size.)

The distance of optics to the film plane as well would be adjusted to allow for proper exposure of the larger provided emulsion surface area.

The width of the exposure area would be, selectively variable and, typical to high definition television display, thus the ratio of width to height would selectively be the same or similar to that of the eventual intended display systems/units. However, though an important configuration of the present invention is for this important dimension (such as with plasma TV monitors providing high-def content) the width of the gate size could be variable in the present invention. Thus, the actual amount of film moved through the gate area would change selectively based on the display system, or setting, intended for the material, potentially. The film can be moved intermittently or continuously through the gate area. For example, if the material is destined for conventional TV display, a 1:33 to 1 ratio of film would be exposed so the potential of the present invention in the 16 mm camera configuration, would expose a negative image of approximately 14 mm.times.18.6 mm. If the intended display were high definition TV, the negative exposed and amount of film moved into the gate area would change to be approximately 14 mm.times.23 mm; and if the eventual display were a theatrical screen as wide as approximately 14 mm high.times.33 min wide. These dimensions are important, as with the theatrical screen shooting intent, it is important to note that the present 16 mm configuration provides a significantly larger emulsion area for material that actually makes it to the screen, than today's typical 35 mm cameras, which for wide screen are often limited to capture emulsion dimensions for "live" material of approximately 14 mm high.times.21 mm wide.

In this configuration, the film gate is in the same position basically, as all film cameras used conventionally. In a supplemented version of this configuration, the film gate could occur horizontally, or otherwise, to allow for the second film gate of the other configurations of this invention, wherein both sides of the stock are exposed.

Though in both versions, the single and double gate versions, the selective variability of the exposed frame width is a one aspect of the present invention, changing literally the length of film advanced into the film gate based on the desired width of negative selected. In this way, film negative is never "cropped" and wasted as oft happens with 35 mm photography, wherein cropping vertically allows for the negative dimension to match the very rectangular shape of some film screens; the present invention allows thus for a superior image quality for such screens, on 16 mm for example, than 35 mm is capable of rendering via the currently configured camera systems.

The Film Stock and In-Camera Configurations

Embodiments of the invention that need not be in one particular configuration, include the double sided emulsion film stock and the double side exposing film camera:

The double film gate disclosure of the present invention and filings, may selectively not be perpendicular to the lens surface area, but positioned as typical film gates occur, though the two gates may be staggered (above and below, or at different points within the camera) allowing for optics and selectively mirroring and/or other lens-image diversion means, to relay the lens image in it's totality, or a portion of it selectively if beam splitting is employed, to one gate and then the other.

In this configuration, reference information can be imprinted visually or by way of a data track or other recording means, to allow selectively the frames of film representing sequentially captured visuals, whether one exposed immediately after the other, or simultaneously, or later. Thus, film stock may undergo looping or other related in-camera management, via rollers and related components common to film cameras, in order to provide the reverse side of the same length of film stock for exposure. See U.S. Pat. No. 5,687,011, incorporated herein by reference in its entirety.

The length of double-sided film, e.g., emulsion occurring on both sides as it moves through the camera, may be exposed in a staggered frame-by-frame approach, e.g., an image on one side, then the other and then advancing the film to the next unexposed portion of stock, or the entire length of film may be exposed by way of a single gate system, whether parallel or perpendicular to the image capture lens, or otherwise positioned, with the reverse side of the same length being provided via film direction reversal means, or continuous loop and mechanical turning of the film stock to provide the second side after exposure of the first, or other such physical approaches for providing same.

Also, it is important to reiterate that the double sided film stock can be employed as a recording "time" enhancement, not quality related, allowing for the two sides of the film stock to be recorded as discussed above, with a conventional "gate" and exposure dimension to typical film cameras. The advantage therein being that recording time is exactly doubled, and conventional digitizing and film printing and processing machinery is set to deal with those particular exposure sizes, the vertical position of the images and the number of "perforations" per visual (or sprocket holes) thus requiring only the issue of the potentially (selectively) thinner strips of film, if double sided film is "split" in to two strips prior to digitizing and/or processing and/or film printing, etc. An objective of the present invention is to provide film stock, (whether single or both sides emulsioned) that is the same or similar weight and thickness to the stock that cameras typically manage today, though this is not essential or a limiting aspect.

Regarding the film stock of the present invention, in the single sided configurations of the horizontally provided film stock, one configuration would eliminate sprocket holes/perforations, allowing the film to the moved through the gate through the motion of the rollers (holding the stock and/or within the camera) to allow the extra emulsion area lost with such sprocket holes to become media/image recording space. However, the present invention also works with the configuration of using typically available film wherein such sprocket holes occur. As both options may be provided in the future, the option of selectively adjusting the exposure area both with regards to width and height would be selectively provided in one configuration, to allow optimal use of emulsion area provided by a given stock's composition, for example, with or without perfs.

Therein, it is selective that film stock of the present invention that lacks sprocket holes may be transported roughly by the machinery of the camera, with subsequent perfecting of the "registration" of the pictures to each other occurring in the digital domain, or selectively markers occurring optically or on other data storage means, as an aspect of the film stock, may allow for laser or otherwise guided registration and film transport, such guidelines or markers also providing the means for a variable transport camera of the present invention, those moving a selectively adjustable length of film into a selectively wide gate area, to precisely quantify the transport of an amount of film per exposure.

Again, such cameras may operate ad variable speeds as with conventional cameras, however in the double sided configuration, wherein 24 fps is the anticipated final "digitizing" or display goal basis, even if altered in the video/digital real for digital display, the film need only be moved 12 time per second, in the configuration where the exposures are staggered (side 1, side 2, side 1, side 2 and so on), if the goal is to achieve a conventional 24 visuals per second of time.

The double sided, two sided emulsion coated film stock can be produced in a variety of configurations. In one non-limiting configuration, two lengths of "thinner" film stock are married to create a length of film stock that is a conventional weight and thickness for cameras, despite the emulsion occurring on two sides. Other configurations of doubled sided two sided emulsion coated film stock can be produced. Further, selectively, an opaque partition between the emulsions. on each respective side, such as a white celluloid, and/or plastic, or other reflective material, can provide that in the digitizing stage of the double sided emulsion, the film stock may be maintained, and created as, a single strip, as with conventional film stock: It would thus mean that in digitizing light would be reflected back from the film emulsion, based on the opaque later behind allowing for such reflectivity, to allow for digitizing as with reflective art, rather than as with light typically being projected through the film stock.

If digitizing in this way were of sufficient quality, relative to the projected approach, the need to "split" the film for separate digitizing, or printing or other use, of each separate strip would be avoided. The film could be digitized, both sides, one after the other, or simultaneously by a digitizing unit configured for that purpose, and maintained and stored as a single strip of selectively the same thickness and weight as conventional stock, with the only difference being that this double sided stock contains twice the image recording area means.

In the management of visuals shot in this "double sided" configuration, data referencing, e.g., visual or other magnetically or otherwise recorded data, on the film itself, each side, would selectively allow for all stock to be scanned, and even though the "second strip" might be digitized some time after the first, in the "split" stock two-sided configuration, the time-code or visual reference information (the "data") would allow for computing means to automatically assemble the visuals in digital form into their proper sequence, as they were captured. Thus, though not limited by this, the present invention is most geared to film capture of visuals destined to be, at some point, digitized and/or managed in the digital domain; even if eventually returned to film for display or other purposes.

Quality and Efficiency of Film Capture

Key filed frames can be exposed through the same lens as video/digital material, being used subsequently in the digital "recoloring" of that digitally originated material.

Aspects of the present invention are not limited by the term video, as digital visuals and digital visual data is indeed applicable, if digital origination was employed, e.g., for the "high definition" material. Further, high definition images stored on tape, does not preclude or is not limited in the present invention or that invention by how said digital (and/or video) images are stored, on tape, in a "drive," or on disc. The issue is the selectively simultaneous exposure of video and/or digital material and filmed visuals of the same or similar visuals (through the same lens, or lenses selectively positioned to capture similar material.

To provide new options affecting the quality and efficiency of film capture, herein is disclosed the selective further aspect of the system or method of exposing filmed visuals on any gauge size in conjunction with video and/or digitally originated images, and captured through the same lens or selectively by lenses separate but positioned for use by the present invention.

In one aspect, the film gauge is 16 mm film and the video media is digital high definition, e.g., digital data, and/or video data captured by CCD or other electronic capture means.

In the 35 mm configuration of the present invention, regardless of whether the film is exposed conventionally, horizontally, or on one side of film stock or on both sides of double-sided-emulsion on both sides-film stock, the opportunity is to capture, selectively, original visuals containing a vast amount of visual data surpassing today's standards, even surpassing old 70 mm film capture systems. Again, this is relevant for potential future digital or other visual means that may utilize the extra visual data of this large negative area, such as future systems able to manage "20 k" or higher.

A further aspect of the invention provides means to capture visuals on 16 mm that surpass 35 mm conventional image quality, and 35 mm images that surpass any digital capture for cinema means conventionally available.

Herein, the selective option of capturing fewer than 24 fps of film originated images is provided. Further, the "video tap" is in fact a high-definition video (and or digital) capture and storage means. This accomplishes the dual goal of enhanced preview on set during capture, by way of the digitally captured visuals, providing material at conventional digital rates such as 24 fps, or 29.97, or 30 or other known options employed for digital origination. Further, the digitally originated visuals, would contain cross reference image data related to the filmed visuals, e.g., selectively captured through the same lens, by way of beam splitting and/or image diversion means, such as mirrors and known optics, for later cross referencing between digitally originated (and stored) visuals and the film originated visuals. Magnetic striping or visual reference, or other data recording means on film, may be provided to allow for easy and selectively automatic cross referencing between the two types of originated visual material. In this configuration the film camera is primary, the digital unit relative equal or secondary with regards to "on line" capture material.

The further use of the approach is expanded, to acknowledge filmed visuals not used solely in "re-coloring" digitally originated material. The combination of highly resolved filmed visuals, exposed by the usual means and with the usual care, typically handled by a director of photography, with the secondary capture and storing of digitally captured material of the same scenes, and or visuals, selectively at the same or similar points in time.

The expanded purpose, herein, involves the desirable aesthetic and post production use of film originated material, potentially different from re-colored digitally originated material. Further, "morphing" and related image extrapolation e.g., inferring, technology may provide proprietary software to allow for the following:

Filmed material captured to be done so at a lesser frame rate than is conventional, such as 12 fps, or even fewer frames per second. Present technology employed as an aspect of the present invention, would thus allow for extrapolation of the "intermediary frames" not captured by film, to occur by way of digital approximation, based on inference of the digital data's position and shifting between available "film originated" frames, once digitized.

Further, exacting means to provide this "morphing" or creation of inferred visuals between available filmed ones, by way of the high definition digitally originated material. Therein, visuals indeed exist, highly resolved, to potentially aid in the creation of the inferred, and/or morphed visuals, which were not filmed, but are created from the filmed visual elements nonetheless. The positioning of aspects of the filmed visuals would be entirely referenceable within the digitally captured visuals, which doubled also as the visuals used for on-set preview, and initial editing.

Indeed, all editing of a project can begin and even be completed using the digitally originated materials, prior to receiving the filmed visuals, after processing, in digital form. In the "final edit," or creation of the digital master and/or related intermediates, the digitized filmed material would "replace" the digitally originated material, selectively as a final stage of post production, prior to selective additional adjustments of the visuals by a look manager system or related digital "look" refining means.

Visual code cross referencing data, carried through from the film negative to it's digitized version, relative to the high definition originated material, would selectively allow for immediate visual cross referencing exact to each frame.

Thus, several goals are accomplished:

16 mm film may provide conventional 16 mm and super 16 mm visuals, vertically exposed, either on one or both sides of film stock selectively, which may be exposed at a selectively slower frame rate, e.g., 12 fps, to allow for a longer record time from a single roll of film stock. Further, horizontally exposed visuals may provide emulsion areas per visual as large as approximately 14 mm.times.33 mm, surpassing typical 35 mm film origination quality, and selectively without changing, or even while increasing the overall record time a single roll of 16 mm provides.

Selectively few filmed frames may actually provide a sufficient amount of filmed image data to infer digitally, with or without use of the digitally originated material. Further, the disclosure of dual film gates, allowing for exposure of both sides of a two-sided-emulsioned film stock, with optics relaying the lens image first to one gate, and then the other, would selectively double the available visual data recording area provided therein. In total, the present invention would selectively allow for a final result, in digital form, or other visual form including film final, of filmed visuals surpassing 35 mm conventional filmed quality and/or resolution, while selectively maintaining all or even increasing the typical record time provided by a roll of 16 mm film, such as approximately 10 minutes. In one configuration, the record time would at least be doubled to 20 minutes per roll, while gaining the approximate 35 mm filmed quality emulsion area from a 16 mm stock; digital extrapolation means and/or double sided film stock aiding the effort.

A further benefit of the horizontal exposure variable film gate and film advancing quantity would be selectively employed, allowing for filmed visuals of any gauge size) to maintain the full vertical available recording area of a film stock, such as 35 min if 35 mm sprocketless film were provided, while adjusting for the display ratio (1:33, 1:65, 1:66, 1:85, 2:35, all to 1) by providing a selectively larger (wider) amount of film stock for exposure per visual; thus affecting the length of each "advance" of the film stock, selectively intermittently or continuously, to provide the next portion of unexposed stock to the selectively varied film gate. Little or no waste occurs, or masking then, in providing a film stock ratio specific to a display ratio, all rectangular display systems, no matter how narrow or wide, being potentially serviced by visuals exposed based on the same screen ratio.

For 35 mm film stock, one configuration involves, as with 16 mm camera configuration, film stock that no longer involves perforations/sprocket holes. However, accounting for same presently and still claiming the improved image recording area of one configuration when that is available, the present invention and the above means described, would allow for film capture of visuals superior to the old 70 mm film originating, from 35 mm film, while not reducing, in fact selectively increasing, the total record time provided by a 1,000 or other size or length of 35 mm film. Thus, the filmed negative, of 24 fps or fewer, may be stored and referred to in the future when that negative may provide image data for higher information management systems, such as 20 k or higher, which present digital information would not be able to supply with visual data utilizing the capacity of such future, standard systems and options.

Further, digitally originated material may be employed in affecting the final digital material, it's look or other aspects, selectively; the digitally originated material may provide improved resolution or aspects to the filmed images, inherent to such electronic capture, selectively able to be contributed to digital visuals created from referring to both digitally originated and film originated material.

So, in a further system configuration, a firm(s) can provide the film stock for the system, whether conventional or adapted from what is typical, the digital "look management" and frame "inferring" or morphing software, the digital cross referencing between digital and film originated visuals, selectively exposed through the same lens selectively at the same or similar times, means to process and scan selectively horizontally exposed film frames of potentially different widths, among other necessary aspects of configurations of the present invention.

An incomparably efficient film camera would thus, in certain aspects, provide filmed material for the best present and future resolution options, with the ideal "video assist" in the form of high definition digital material captured through the same lens as the film. The end result being a minimally changed shooting scenario and equipment scenario on-set, an improved or at the least minimally affected shooting time per quantity of film stock, and an uncompromised or improved final "film originated and film look" digital result, selectively equal to or superior to such results from typical film systems of the next "larger" gauge size, (16 mm providing 35 mm quality, 35 mm providing 70 mm quality, etc.)

The present uses do not limit, though, the fact that high quality filmed and digitally originated material then exists relative to the same scenes and production; options beyond what have been stated exist and will exist relative to the existence of superior film negative and high definition digital material relative to the same shots or lens visuals.

Whether applied to conventional film stock and conventional vertical exposing and frame sizes, or adapted stock and exposure approaches, as described herein, embodiments of the present invention improves the visual quality and/or efficiency of film capture.

Horizontally Positioned Film Gates

In providing the camera lens image to the film stock, herein a horizontally positioned gate, or gates, has been disclosed in creating options to increase image capture quality options. In a further aspect, optics (and/or mirroring means) may "turn" the lens image 90 degrees before providing it to a vertically positioned film stock, as with today's conventional film cameras, wherein a fixed or variable film gate, where the width of the exposure area on the film stock is selectible, is not in the usual horizontal position relative to the lens and scene being captured, but offset 90 degrees.

Thus, film magazine(s) of cameras need not be repositioned and film stock need not be twisted or repositioned to achieve a horizontal film plane relative to the lens, as disclosed previously. Herein the lens image visual (light) is turned and/or bounced to be relayed at a 90 degree offset, as occurs with flatbed film editing tables, the film stock image being turned for display on the projection monitor. Again, the optics of a 16 mm system would be that of a 35 mm camera, or other option, including custom made option, to allow for the larger image area relay to the film stock. Again, the image area for exposure on the film stock would exceed that of the "next up" film gauge, as the film would be exposed horizontally on the stock, relative to it's length, to allow for the image height to be limited only by the gauge size, and the image width to be variable, limited only by the selected image ratio, based on selected final display system/option dimension or ratio. See drawing. In essence, the film gate is turned 90 degrees, is optionally of the variable type, as disclosed herein, and is provided with a lens image that has also been turned 90 degrees, to allow for proper exposure of the lens image in the ratio/dimension desired, though on film stock horizontally, as opposed to the typical film systems of today, wherein visuals are exposed vertically. The width of the visual is limited only by the gauge width of the film stock.

Hybrid Digital and Film Camera

Yet another embodiment related to the present invention is a hybrid digital and film camera, utilizing conventional 16 mm negative motion picture film stock. This in no way limits the application of the following with regards to gauge size, and it should be noted that sprocketless versions of any film gauge size, (or sprockets on only one side as with single perf stocks) would allow for proper application of the present option(s):

Herein, the conventional film gate (vertical) associated with 16 mm motion picture cameras would be replaced by a modified "double sided gate," which would accommodate two strips of 16 mm stock, emulsion out, facing the lens image, allowing the sprocket holes of the stock to be on the "outside" of both strips, thus also on the left and right sides of the double gate.

Separate, linked film transport means, would allow selectively one side to move down, while the other side or strip of film would move up. Intermittently, unexposed portions of film stock would be "side by side," with only the very small strip, or line, between the separate stocks interfering with the capture of the lens image.

Selectively, the lens image delivered to the side-by-side strips of emulsion, would occupy 4 conventional 16 mm or super 16 mm frame areas. Thus, a single visual would be delivered to (selectively) approximately an area of emulsion, comprising the two separate strips, of more than conventional 3 perf 35 mm image recording means/area; in fact, the actual area provided selectively by the present invention is 15 mm high by 26 mm wide, two vertical frames/perfs per strip, side by side, providing an overall area of 364 square mm. This is an improvement over the emulsion provided by 35 mm 3 perf (1:85 to 1 image ratio) of over 5%, selectively.

Employing the "key frame" approach to utilizing filmed frames, whether captured as a single image or as a composite of separate captures, to improve resolution and/or aesthetics of digitally captured material, the present invention would allow 16 mm film cameras, with selected modifications, to capture the image data necessary to infuse digitally captured visuals with over 6 k of per-image data.

Proprietary software would allow for such image captures on two strips of emulsion, to be referenced by time code or other image coding referencing means, for application to the respective selected digitally originated visuals, captured selectively through the same lens at, or in and around the time said key frames were captures. This digitally originated material may be at a normal frame rate, such as 24 frames per second, selectively. The selectively flickerless and selectively high-definition digitally originated material, may selectively provide the image-zone (aspects') positioning data for proper allocation of the filmed key frame image data, in the creation of final visuals, (24 per second for example) which embody in excess of 6 k per visual image data, as a result of application of key frame data to more than one digitally originated visual.

Herein, magnetic and/or visual coding means on the film stock, (selectively restricted to the film area to the thin side or edge of the perforated side of stock, or to other areas not restricting the emulsion area for image recording will provide cross referencing data for easy and/or automatic referencing between digitally originated visuals and filmed key frame visuals, for post production applications.

Thus, the film stock in one configuration is from a single roll of unexposed stock, as with conventional film cameras, the lens image is selectively diverted to allow for recording of the full lens image by a digital capture and recording means, with the same lens image providing the full lens image for selectively exposure as a variable, e.g., 1:33, 1:85, 2:35, ratio image on film stock selectively providing an emulsion area larger than conventional 35 mm capture, e.g., for cinema.

This film stock would undergo a repositioning, e.g., by rollers of other means, after initial exposure by the left side of the gate, allowing for the "flipped" stock to be returned for exposure by the other side of the gate, with the "emulsion area" still facing out, toward the lens image. Selectively, "double sided film stock" could allow for film to be returned to either side, both sides containing film emulsion, with a final result of a single roll of film stock having both sides full exposed, embodying latent images within emulsion on both sides of a single celluloid strip. In the simple configuration, conventional single sided 16 mm stock is described.

Selectively, each gate "side" would expose on, for example, two conventional "frame" areas, or emulsion related to two perforations of stock, and advance skipping the next two, as the other side can use that stock to expose the "other side" of the lens image, ongoing, continuously or intermittently. Time code reference for each and every perforation, or image portion, would make this jumble of visual parts easily sorted and allocated in post, automatically, selectively after a project has been edited from the digitally originated visuals, and final visuals are selected for affecting with the digitized filmed key frame visuals which are of improved resolution and/or aesthetic appearance.

In further aspects of the present invention, provides increase in visual quality, and also improvement in efficiency. As a single key frame per second, with appropriate post-production software, may be used to affect at least an entire "second" of digitally originated visuals, such as 24, a single roll of 16 mm film typically providing only approximately 10 minutes of recording time, may in fact provide now 60 minutes, selectively, while also providing a final film originated "look" result of 4.times. the normal resolution provided by typical super 16 mm systems. Selectively, more key frames per second may be exposed, and/or frames of different overall emulsion surface area, providing more or less recording time per roll of film. Should a roll provide 6 key frames per second, or one for every 4 digitally originated corresponding images, the recording time of a single roll of film still is not less than a conventional 16 mm camera and recording system, at 24 fps.

The present invention can provide the film stock to a conventional "take up" spool, changing the mechanics of the film camera as little as possible or selectively necessary; the stock having traveled through the double sided gate twice, being the key modification and mechanical modification. Further, in a modified film camera, two rolls or two separate strips of film may be delivered to the double gate, allowing separate rolls to literally be transported in the same direction through the double sided film gate. In this configuration, the advantage would be the amount of film stock overall, increasing recording time even further, the fact that smaller stock, for example, 16 mm as opposed to 35 mm, may provide images with higher resolution than conventional capture by 35 mm stock, and the further advantage is the elimination of the need for "twisting" the stock through various repositioning means to allow it to be exposed, and redelivered to the other side of the double sided film gate, for re-exposure, selectively in the same direction (up to down) as before, or in the opposite direction (down to up) before return of the exposed stock to the take-up reel.

Again, this system relates to a hybrid camera, selectively, wherein a digital image capture means captures through the same, or an adjacent, lens full conventional image captures at a selectively normal frame rate such as 24 fps, while the double-sided gate provides selectively very high quality filmed "reference" or key frames of the same or very similar lens image/visual.

It is very important to add, that the application of the horizontal aspects of film gate and film emulsion recording would provide an enormous gain in resolution, regardless of the film gauge size involved. Describing this improvement relative to 16 mm stock, a 1:85 ratio intended display dimension, and thus image capture dimension, and wherein one key frame, from two strips of the same length of celluloid/stock, is generated per second:

The emulsion area exposed, with the two strips positioned now as "top and bottom," instead of left and right, is increased to selectively 24 mm high.times.45 mm wide, each strip of 16 mm stock from selectively the same length traveling selectively in opposite directions providing 12 mm, or half, of the vertical recording/emulsion area of the full visual capture zone. This represents an overall final, digitized key frame containing over 18 k of data from 16 mm capture. Further, with one key per second being generated on film only, the overall recording area of a single 400 ft roll of conventional 16 mm film stock is still increased to 20 minutes over conventional 24 fps below "2 k" capture, doubling the overall film recording time while increasing image quality approximately 12 fold. This is indeed significant, as filmmaking logistics and methods are not compromised, equipment is not noticeably modified, in weight and selectively in configuration, and there is not only not a demand for more media in providing profound increases in visual quality, but a need for less, e.g., half in this example application.

Again, the horizontal gate configuration would place the strips of emulsion selectively in contact, or very close proximity to each other, one over the other. The selectively variable recording area of the horizontal gate area, would expose selectively images from 4 perforations wide (for TV ratio) to 6 wide, (for 1:85 cinema) and up to 8 perforations wide for providing images of 2:35 (wide screen) ratio, which is remarkably a final image data per visual result of approximately 23 k, from 16 mm stock with recording time still improved per roll, at nearly 16 minutes.

It is important to mention, a key aspect of the proprietary software of the present invention would be the digital means to "eliminate" the fold or "missing data" of the small gap occurring between the two strips of film. The digitally originated images would contain all the data necessary, (at 2 k resolution) for example, for seamless allocation of the "halves" of image data from the film stock, as a small line of "2 k" image resolution marrying halves of much higher resolution, would not be jarring or noticeable. Further, an aspect of the present inventions software would selectively involve extrapolating acceptable "transition" image data between the separate halves of film stock, e.g., captures, for seamless final visuals from the system of the present invention.

An improved aspect is that to expose the emulsion areas detailed herein, no moving optics or moving "gate" aspects need be employed, as both strips of emulsion are exposed simultaneously: Herein 16 mm double strip provides the resolution of single strip 35 mm horiz. 8 perf.

Increasing Quality and Recording Time of Digital Image Capture

A variety of configurations and options related to hybrid cameras are provided for imaging that allow for increased quality, recording time and other advantageous aspects for entertainment imaging, such as for cinema and television and other motion media.

In one aspect, one media captured selectively simultaneously with aspects of another media capture is used to affect the latter:

An all digital hybrid configuration is disclosed herein, for the purpose of extending the resolution, and amount of overall data per visual, possible to capture, for both still photography and motion media.

In a further aspect of the invention, a high definition digital camera captures selectively both a full visual capture of a lens image, and selectively through the same lens portions of the lens image in higher resolution, wherein said portions are captured for the purpose of affecting, or being affected by, said full visual capture, which was selectively of a lower initial resolution.

For example, one configuration of this invention involves a standard or "normal high definition" video (digital) capture of an image being delivered through a camera lens. This is selectively provided by "video tap" configuration, deriving the image capture from only a portion of the lens image, and selectively also this full visual may be captured through its own independent lens, as a part of a single camera with multiple lenses, or as a separate camera altogether configured to work in tandem with the unit capturing the "higher definition portions of the visual for later applications with/by the full visual capture.

In a further configuration, wherein all visuals are delivered through a single lens, the full visual capture is garnered from a selectively minimal portion of the lens image, requiring only a small portion of the "light" or overall visual information gathered by that lens, for proper rendition of the lens visual in the aspect ratio selected, (such as 1:66 to 1, or 1:85 to 1.)

This initial full visual capture may occur via familiar CCD or other "chip" or other single or multiple electronic capture means familiar with digital image capture, and recorded on tape, on a drive, or relayed for electronic transmission or any selected means for recording and/or relaying the digital data captured.

Time code associated or other visual labeling/tracking data means is provided and maintained/recorded relative to each visual of the full visual captures, for later use as an aspect of the present invention, and the objective of the present invention to end with modified digital visuals representative of the full visuals captured, though with overall resolution, and/or overall image data per visual, beyond what is conventionally possible.

A "subsequent" image capture means from the lens image, selectively the same lens that provided the full visual captures described above, involves a selectively high definition capture means, such as a 4 k digitizing chip(s) device(s) or other means for capturing visuals of recognizably high photographic or cinema-graphic resolution. However, herein means for providing over a selective period of time, such as a second, only a portion of the lens image, not the full visual captured by the initial (or other image capture means of the present invention) to the chip(s)/digitizing means. And, this means for providing a portion of the lens image further comprises means to subsequently provide a separate, selectively overlapping or not, portion of the lens image.

In a configuration of the present invention, the "chip(s)" or digitizing plane/means is not flat, but is cylindrical or of a circular or round shape, to allow it to moved, relative to the lens. Further, more than one "chip" or imaging plan/means may be involved in this "cylinder," or unconventional digital capture surface/means, allowing a second "capture" or another portion of the lens image to occur seamlessly and quickly after a previous image portion capture, so that in the course of a second of time, for example, one or more moving "chips" or image capture means, may be provided with new portions of the lens image to provide, for example, a 4 k capture means with a plurality of new lens image portions (of visual data) resulting in a series of visuals that in tandem, may, for example, represent a composite of image-portion captures of a single lens image that when "assembled" into a single visual, may represent a single visual with, for example, 20 k, 40 k or even 120 k of digital data, selectively per visual and/or selectively per second of digital video.

Selectively, the full visual capture, itself, for example, a 4 k, or even 2 k, or even lesser amount of data per visual, may in post production and by way of time-code reference, be used as a "template" for assemblage of the plurality of "4 k," for example, captures of portions of the full lens image. This template provided by a full visual capture, selectively captured at 24, 29.97 or other typical digital video capture rate of visuals per second, thus contains useful image position data for an entire second of digital motion visual data, for the plurality of very high resolution image-portion captures to be "applied to." Reciprocally, this process can be stated as the high definition image portions being assembled into a seamless mosaic with image aspects informed, position wise, by the full visual captures, thus the image portion captures are affected, rather than the full visual captures being affected. In essence, how this interdependence of visual data is "stated" does not change the aspect that they are used in tandem to create final digital visuals, either for still photography, a single visual, or for motion video, at 24 fps frame rate, for example, that are of a very high level of digital data overall, such as 12 k, 20 k, 120 k, employing morphing technology, selectively, and/or the full visual captures to "position" the image portion captures' position, and visual aspects therein, as those image portion captures precluded likely, in an among themselves, the proper capture of overall image-aspects positioning information that was captured, or potentially captured, by conventional full-visual captures, at 24 fps for example.

The lens image may be diverted in part to provide the full visuals' information for capture, prior to optical or other means for focusing, enlarging and/or delivering, selectively smaller portions of the overall lens image to the secondary recording means, such as the 4 k option mentioned above, and further with means to revise and/or move to deliver a new portion of the full lens image for subsequent capture.

Time code thus, in conjunction with "image zone" reference data, corresponding to the "zones" of the lens image a given capture represents, would result for example, in one second of image data, involving 24 digital visuals from the initial full visual captures, and selectively 24 "image portions" captured and referenced according to their image zone data, resulting in a "single" composite visual of, for example, 24.times.4 k, or 96 k; when this "single visual" of data, captured over the course of a second of time is applied to the 24 frames of full visual captures data, selectively employing morphing and/or other digital blending technology, and relying on the full visual captures to modify position of the very high definition visuals' aspects, such as selectively identifiable image zones representing objects and/or image portions distinguished according to selected criteria such as color variation or other means to distinguish image zones, the result is a seamless second of modified digital visual data representing 24 visuals, each 96 k, and all or most modified according to image-zones' position to allow the very high definition "composite" of image zones' data to selectively match the true image zone's position capture through the second of time, represented by the 24 frames of full visual data captured during the same second that the image portions were individually digitized. By making use of the highest information digitizing means, and means to reposition image data based on peripheral data, such as the corresponding full visual captures, a composite of available technologies combined with the new options herein, result in a significantly enhanced resolution capture means.

As with rotating drums in a photo-copying system, and other imaging systems, herein a selectively "moving" delivery of the lens image as opposed to a static delivery of a full lens image, to a selectively moving and/or selectively different capture means, such as 4 k CCD(s), a single lens may provide all of the visual information necessary to capture an extreme level of visual information related to a single lens image-digital repositioning and modification means, (as proprietary software of the present invention, may provide new all-digital video camera systems with resolution and/or overall data captured being a selective aspect, based on "how many" separate image zone captures and how much data the capture means may handle. For example, a 2 k image capture means wherein only three image zones are separately recorded each second, would result in a 6 k imaging system, using said full visuals capture option to affect said 2 k image portion captures, wherein only a maximum of 2 k image capture technology is needed.

By focusing the maximum image capture means/technology to selectively changing portions of a single lens image, it is possible to provide the image data necessary for compatibility with the image management and/or screening systems of "tomorrow." Meaning, if 96 k is the "projection" capacity of theatres in 10 years, today, in one aspect of the present invention, means exists to capture image data to allow for a final sequence of digital visuals, each containing and exploiting the 96 k data means, and resolution, that will make projects "tomorrow" for use; naturally if a "film" exists as 4 k, and the screening capacity in a few years is 96 k, if a film were even possibly "assembled' or revised to contain more than 4 k, such as 48 k, or 96 k, the use of that film or project and appeal of it technically will be enhanced in the future, increasing it's long-term value and possible application and viewing life.

An example application, may involve as simple a scenario as a static, flat chip(s) or other image digitizing means, positioned in line with the capture lens; or selectively a digitizing means with limited repositioning means, such as "tilting" left to right, a selective amount relative to the lens image. As the lens image is provided to the image digitizing means, such as chip(s),) an optic element, mirroring, prism means or other image diversion/delivery affecting means, provides selectively ⅓ of the lens image, left to right for example, then the next third, then the next. Then, selectively, the thirds may be provided relative to the next second of visual data, for example, the in reverse direction, right to left. The image portion selecting or diverting/delivery means, may be a rotating mirror or prism, for example, which is returned to the "first third" of the image, automatically, by virtue of it's repeating motion and position; such as a prism being back to it's original position, after it rotates 360 degrees.

Thus, a selectively fluid continuous motion, if both lens image diversion means and capture means move, capture of different, subsequent aspects of the same lens image, may occur. Or, if the image diversion means has an intermittent motion, stopping three times for example, as a new portion of image is delivered to a static image digitizer, such as a CCD for example, a 4 k digitizing means may provide 12 k of image data relating to the lens image, per second for example, (one complete visual composited, which may be used to affect 24 full frames of visual data, in essence "upgrading" the resolution of 24 "2 k," or lesser resolution, visuals to 24 "12 k" visuals, employing the single, composited/mosaic of 4 k image data representing distinct portions of the lens image, all occurring in lesser resolution within the full visual data of the conventional, e.g., "video assist" or primary capture stage of the invention, digital images captured.

Aspects of the invention include: How many distinct image portions of the lens image are digitized per second; How much they overlap with each other; How many conventional full visual digital images are captured per second; whether the lens, secondary optics and/or the digitizing means, chips or other means, move, are all selective options. The primary issue affecting the choice of these options is the eventual display system(s) both in regard to resolution, aspect ratio and frame rate.

The objective is to create digital visuals of resolution exceeding the capture resolution of available "full visual" digitizing means. The software options making this feasible include means to affect visuals of the same, or similar, images, by way of time code, and other data options, cross referencing and in regard to image aspects that are identified to correlate: Lips moving over the course of a second, in a the continuous full visual images captured, 24 of them for example, may be enhanced in resolution in all 24 visuals thus, as though each portion of the visual has only a single high-high resolution reference, it is possible to extrapolate that the lips moving, as they "smile" maintain the additional digital data in the high-high resolution composite visual, or mosaic, only in slightly revised positions, informed by the actual position shifts of visual aspects recorded in the conventional full visual digital images.

Again, the mosaic of high-high definition data, creating for example a single frame of visual data per second, may upgrade all 24 frames of corresponding video captured, full visuals, during the second that "single frame" of high-high definition information was captured, resulting in the single reference, or "key frame" of visual data.

The selective capture of a key frame of visual data from a portion of the lens image diverted from another portion, used to capture more conventional digital data, such as 24 fps of 2 k digital visuals' data, is created at a selectively lesser capture rate, such as 1 overall total visual per second, for the express purpose of being used in affecting and modifying the more conventional digital material captured for a specific objective/reason, to "recolor" aspects/zones of the visuals to correspond to the "filmed color rendition" of those same image zone aspects; in the invention herein, to upgrade the more conventional full visual captures to a higher resolution, even a resolution higher than any full-visual capture means existing may allow, through digital application of the assembled key frame "mosaic" representing a single visual captured during the time a number of visuals were captured by the more conventional full visual means.

Again, digital image zone correlation and modification means, and even familiar morphing technology, make the present invention timely, feasible and logical; hybrid technology points the way to modified digital visuals, both in the simulation of preferred "looks," acting-as-if a selected film stock had been the original recording media overall, and in the simulation of enhanced resolution, acting-as-if a very high resolving digitizer had been used to capture the full visuals, even one surpassing by far those presently existing. Quality and Resolution of Hybrid Film and Digital Cameras In a further embodiment a hybrid film and digital cameras are provided wherein the media is configured in tandem for the purpose of capturing visuals with the visual quality of film and with a resolution amount of visual information surpassing conventional image capture utilized today:

A film camera capturing a visual through a single lens, which is "split," visually fragmented by a beam splitter of other lens-light diverting/dividing means, remains in the conventional film configuration of film stock and magazine containment. With regards to a 35 mm motion picture camera, such as PanaVision units, this means a magazine positioned on top of the camera, film which is delivered vertically to a gate for exposure and returned to the "take up" reel of the film magazine containment.

What is altered in the present configuration, related selectively to the optics and/or gate, or exposure area, of the film camera. Further, the digital or electronic picture capture aspect of the hybrid camera is high definition digital, with image quality similar to that of digital cinema units, such as the Sony CineAlta camera.

Herein, selectively variable aspects of the optics occurring selectively after the lens image has been in part diverted to the digital capture unit, or other flickerless "video assist" aspect allowing for electronic capture of the lens image, focus a portion of the lens image only to the film plane, for film emulsion recording continuously or intermittently within the film gate. Selectively the digital visual capture may occur through a separate lens, or other stage of the single lens capture process, in this configuration however a portion of the lens image is diverted for digitizing prior to the secondary aspect/process of the present system method's optics. However, conventional "video assist" options, such as the relaying of the lens image during the intermittent motion of the film, when the film plane is not receiving the lens image, may be employed selectively herein, allowing for conventional flick-free digital capture to couple with selectively conventional film capture process.

The difference herein, toward the objective of increased capture resolution, involves the delivery of a selectively different portion of the lens image to the film plane, to subsequent unexposed portions of emulsion (moved into the gate continuously or intermittently, as is conventional. As with a "zoom lens" where focal changes deliver a selectively different portion of the total possible lens image or scene to the film plane, herein at a selectively conventional 24 fps, or slower rate, even 2 fps, for example, selectively different portions of the overall lens image are delivered automatically to the film for recording, frame after frame. For example, in a simple configuration of the present invention, an image being originally captured at a given focal setting is delivered by lens optics toward the film plane for recording. Herein, selectively variable and/or moving optical elements, provide an amplification of what would have been the normal visual headed for the film plane, providing selectively half of the full lens image to the 35 mm film plane, and then after continuous or intermittent transport of the film to the next portion of unexposed motion picture film, selectively the other half of the lens image is provided to the gate and film plane for recording.

In this system and method, instead of a single lens visual being recorded at one instant onto a selected piece of emulsion, the lens image is delivered in stages two in this example to separate pieces of emulsion, allow for distinctly different recorded visuals to occur within two sequential frames of film emulsion, overlapping in visual content. Herein, digital means or other means, may be employed in post production to create a single visual, representative of the full lens image (delivered to these variable optic aspects, or other electronic image delivery and varying means) from the sequential film frames.

What is gained, herein, is visual quality. When a widescreen cinematic visual is initially recorded by a 35 mm camera, for example, the emulsion available for the visual is limited by the width of the film stock. Typically, in a camera not anamorphically altering the scene captured, the wide visual occupies less film emulsion, than even a typical filmed television show capture means; this is because the ratio of the display means for a television show is more "square" allowing for more of the "4 perf" emulsion area to be utilized in capturing a single visual. Thus, ironically, significantly less emulsion is used per original scene/image area, when capturing a visual for a large screen display means, such as a 1:85 to 1 cinema screen, than is used when capturing a visual for a small screen (1:33 to 1) television display intent.

The entire emulsion surface area found within 4 perforations (vertically) of 35 mm film, may be utilized in recording a selected portion of the lens visual that would have been delivered in it's entirety to a single frame of film. So, in one example, the variable optics may provide 12 or less representation of the "left side" of the lens image that would be have been recorded on a single frame of film, and 12 or less representative of the "right side" of said lens image. Thus, in this example, a visual of as wide or wider than the cinema screen ration 2:35 to 1, may be captured within two subsequent frames of 35 mm motion picture film, providing a final visual, if the "sides" are married in digital post production, for such wide screen display means stored initially within an overall emulsion surface area many fold that which would have been utilized in capturing such a lens image, conventionally. This affects image quality.

Further, not being limited to horizontal, or left to right, partitions of lens images, sophisticated variable optic means may provide, for example, 12 separate portions of a lens image, or less, or more, with portions of the lens image coming from different areas both horizontally and vertically within the original lens image. Such a capture system then provides, from a single second of recording for example, 24 frames of high definition, or regular definition, digital visuals captured by the electronic capture aspect of the hybrid camera, such as the well known "video assist" aspect, and 24 frames of 35 mm picture film, wherein selectively the configuration capturing two frames of 4 perf visuals for each overall framed scene visual, resulted in a visual quality, e.g., emulsion, more like 70 mm film capture. In a scenario where in 12 frames of film, if running at 12 fps, wherein a selectively unique portion of the lens image is delivered to each frame, an imaging result may exceed any currently known approach to capturing images for entertainment.

In that scenario, the mosaic of captures from portions of the overall image, provides a final emulsion surface area, per visual, that is enormous; in essence, as large as all 12 frames' recording area pasted together, more like still photography's 2¼" negatives.

In post production, by way of existing morphing technology and selective digital replacement means, the digital images or video captured may selectively provide all of the image elements' positioning data necessary to apply the filmed image, once assembled as one, digitally for example, per second, to the 24 frame of originated digital material. As a result, for future display, and current very high resolution display means, the large "key frames" of data, created by different subsequent frames of film that in tandem represent a single "scene" being photographed, provide all of the original visual data necessary for display systems of the future, that may exceed even 30 k, for example.

In one aspect of the invention is disclosed a relatively unchanged camera configuration, with optics including means to isolate distinct portions of a scene, through a lens, for subsequent recording on a film stock. When digital assembled, and selectively utilizing conventional digital visuals originated of the full scene framed, the image "portions" recorded on film provide an increased emulsion recording size of a selected amount, for selective digitizing and assemblage, in association with the digitally originated material, or not.

In a further aspect, 24 frames of digital material captured, may be selectively applied to the extremely high resolution overall visual resulting from (even 24) distinct 35 mm frames representative of a single "scene" framed by the cinematographer. Therein, though somewhat absurd at the present, perhaps less so in the future, morphing and image aspect repositioning means may provide post production software to allow those 24 distinct captures from a single scene to result in 24 frames of the full scene, provide by the full frame original digital captures, with the potentially more than 6 k of data per film frame resulting in 24 overall frames of motion media, each and every of those 24 frames containing potentially over 140 k of data.

Though the uses for 140 k images may be limited today, the availability of the ability to extract such image quality from entertainment projects shot today may affect such projects' compatibility and use in the future—wherein projects limited to 4 k, for example, may be less desirable for systems and audiences geared to much higher quality future systems of viewing.

Again, in the simplest configuration, a single 2:35 to 1 ratio visual, for example, may be captured within 24 frames of 35 mm emulsion as 12 "left side" portions of the framed scene, and 12 "right side" portions, (recorded in staggered order, left, right, left, right, selectively.

24 frames of video material captured in tandem with said filmed images, even "video assist material," may be referenced or employed in allocating the "sides" of filmed visual data, once digitized for example, to assemble 24 final digital images with selectively an image quality exceeding 12 k, and likely approaching 20 k, considering the efficient use of the 4 perf emulsion area.

In essence, the 35 mm cameras of today may provide approximately 70 mm originated cinema images, meaning images similar to those captured with 65 mm or 70 mm "equipment" and film stock.

16 mm cameras, for example, with the hybrid configuration, purpose and means herein, may provide final visuals well in excess of conventional 35 mm cameras today. And, in any gauge size, while selectively extending the recording time of the film media. For example, if a lens image or scene is captured on film as 6 distinct areas, or portions, totaling the full scene, that is 6 fps. So, the net effect is while increasing image quality by at least 6 times, over conventional 16 mm capture, the recording time of a single roll of film is quadrupled, as film is running at ¼ the normal frame rate; as film is capturing reference frames, while the digital aspect of the hybrid unit is capturing full frame visual data, including image data relating to the shifting or changing or repositioning of elements recorded during a single second, that may have been "missed" by the filmed frames.

Thus, digital technology allows for the higher resolution of the single assembled film frame, to not be compromised in repositioning those higher resolution "elements" relative to their counterparts within the digitally originated visuals. Thus, nothing is compromised in resulting in digital images, with the "look" of film, with virtually unlimited resolution and wherein film recording time is simultaneously extended dramatically.

The present application is further described in connection with key frames being generated in relation to and/or in tandem with lower resolution, and/or overall data captures for the purpose of generating new images from data contributed by the key frames and lower resolution images.

More particularly, disclosed is a system for generating one or more images that create a higher resolution image representative of portion of lens image, namely the desired scene or "live area" a photographer (or cinematographer) wishes to capture. Hereafter the "scene" such a photographer/cinematographer is framing and wishing to affect with at least the higher resolution benefit of the present invention, is referred to herein, generally, as the live area. A smartphone, other wireless device or otherwise imaging plus computing plus transmitting array related to capturing, initially processing and transmitting image data related to the live area, is which hereafter may be referred to, generally, simply as the capture device or phone, or smartphone.

Herein, by way of an image sensor or at least one additional image sensor (or capture device) being related to image information related to the live area, images representing the entirety of at least the live area captured by a lower resolution, and more frequent capture rate (i.e., frame rate), a basis for interdependence in the generating of inferred high resolution images by dedicated computer processing is provided. This is enabled by a distinct cross referencing data basis, such as time code, which correlates at least one key frame (high resolution image) with at least two video frames (lower resolution images) that represent image information of the live area. This can occur locally on a linked computing module and/or remotely by way of linked hub computing of the present system, accessible by wireless and/or wired data connectivity. Hereafter this hub computing is referred to, generally, as the cloud computing, or simply the cloud.

In one configuration, key frames are captured with less frequency than a sequence of video images, such as those generated by a wireless device video capture assembly. Such a system, captured for dedicated computer processing and management via a dedicated application/program, a sequence of video images can herein also capture very highly resolved "still" images, by what of the same or a linked capture devices, such as an electronic imaging sensor. This video sequence in the present configuration represents images captured at 720i (720 line interlaced) resolution. This is a non-limiting configuration, as any selected capture basis can be engaged.

In this configuration, key frames of a 32 megapixel or higher image capture, for example, can enable, by way of dedicated code and/or referencing data, exact temporal cross referencing between key frame video images. A final sequence of 24 frames per second (in one configuration) with all or some of those frames, then embody a computer modified version of the 32 megapixel "key" image capture. These computer modified version(s) are hereafter referred to, generally, as the enhanced images.

The software herein, employed by the dedicated computing operability to generate inferred images of higher resolution, or the enhanced images, is hereafter referred to, generally, as the expansion program.

At least references to boundary information discerned by linked computing, related to elements within the image live area, the boundary discerned areas can be used as an expansion program cross referencing basis between the high resolution key frame and a plurality of lower resolution video frames. This, to modify the key frame's discernable visual objects to approximate the position of those same objects, as represented in the lower resolution video captures.

Prior technology of relevance enabling one aspect of the improvements herein, include early "colorization" of black and white films, employed image boundary identification technology for example, to allow a single hand-colored image to have its unique information extrapolated to varying boundary areas, based on a related boundary area in the key frame(s).

Indeed, in some configurations herein, information that cannot be properly discerned can remain lower resolution, as with the video images, and/or integrate aspects of the key frame information determined in relation to programmed parameters to remain in a fixed position. In such a case, those image objects able to be "extracted" from others, can be moved in relation, or over, those fixed objects.

Other options for providing acceptable inferred final higher resolution images, by computer managed referencing the key frames and video images in creating new inferred images, can also be employed in other configurations deemed to result in high resolution images that are visually acceptable in sequence. In one sense this means that they are not perceptually distracting to the typical viewer, in creating an image that would have been the result of a 32 megapixel capture at the time a lower res video frame was alone actually captured.

Thus, a single second of final video, having the maximum resolution potential enabled by the relevant key frame data captured and linked system processing capacity, can be created from a small amount of video data and a single still image. In some configurations, this can require one key frame per second. In others, more or less frequent key frames can be generated, selectively, by user and/or computer determination of the necessary higher resolution information for acceptable image inferring creation by the expansion program.

In fact, in some configurations, the clarity or other aspects evaluated by dedicated computing can specifically affect and vary the quantity of key frames per selected time frame, generated to insure a consistent final inference image creation result of final enhanced images. Further, the allocation of image information associated with key frames can include the expansion program borrowing advantageous image data from at least one previous or subsequent key frame, and/or video image, to enable a better enhanced image(s) creation result. This, for example in relation to the clarity and/or focus of image aspects.

Through this additional functionality, moving objects typically relegated to being represented in a blurry or less than detailed final image result can be enhanced not by (or not only by) the speed of exposure at the time of capture, but by borrowing relevant image information from images that benefitted from more stable and resulting detailed capture of information associated with objects within the live area. Thus, an improvement for simulating higher speed exposures is further provided, based on inferring image information at a given capture time, had the exposure rate been faster, by borrowing more detailed image information from other image(s) and applying and/or modifying it to fit as least the inferred position such an improved capture would have likely had.

As a result, to the human eye, the objective of an inferred capture of improved detail and/or resolution has the potential of being virtually indistinguishable from an actual faster exposure or otherwise different capture basis at a given moment in time. For example, within 24 frames per second, image information gathered as key frame and/or video image data at the moment frame 22 is captured, which is very clear and stable, can be utilized by the expansion software to improve the visual result of an enhanced image representing frame 9, which is otherwise only represented by a blurry video image lacking essential detail.

Herein, several additional and important improvements are provided for at least the consumer. A wireless device, such as a smartphone, cancan provide the essential captures of video (720 interlaced or progressive video imagery data for example generating from lens captured and sampled light) and can be further equipped with wireless high data volume conveying operability, such as Wi-Fi.

For example, a consumer captures and enjoys seeing and viewing lower resolution video captured immediately, while the background/subtext image capture and transmission function of the present system continues to occur. This includes at least, the capture of high resolution images related to the lower resolution video images, with associated time code or other cross referencing data between the different image resolution captures. Herein, the significant data rich image files of the "key frames" can be transmitted with reference data by Wi-Fi, or other data conveying functionality to an associated "cloud" or relevant external data storage system with linked image processing capability, distinct to this system and invention.

An essential improvement herein includes the linked computing of the wireless device and linked "cloud" computing functionality, enabling an "invisible" capture and conveyance of the key frames. As this high resolution images are captured and linked transmission/reception (such as Wi-Fi) is established, these can be conveyed to a member and/or wireless device recognizing storage, and/or account. These high resolution images can selectively be deleted (and/or set for deletion mode) by/from the smartphone, as they are conveyed wirelessly, to free storage on the device after successful transmission is confirmed.

As seamless and viewable lower resolution, (such as 720 or 2 k) is captured and made available locally on the wireless device, the remote process via cloud computing, or comparable, can be engaged seamlessly and quietly. Interruption or delay in transmission of key frames, can involve a decided amount of storage, which can be engaged automatically or otherwise, and if limited, can dictate the maximum resolution and/or amount of material that can be captured relative to high resolution key frames ("keys"), until acceptable and permissible connectivity such as Wi-Fi is established/reestablished.

Indeed, the use of a "free" data network, for such large volumes of data associated with the key frames, can be a default selection set by the system operator at each capture session or as an overall default setting, to avoid costly 4g or other wireless data charges from such large data exchanges. Herein, this short term storage of large individual picture files is manageable by smartphones typically, for example, with the large files being replaced by subsequent ones, as the previous are transmitted with associated cross referencing data, such as time code.

In at least one configuration, the lower resolution video is also transmitted concurrently or in the general time frame in which the high resolution key frames are also conveyed. This video can selectively be maintained, or also removed from the wireless device or other camera devices with transmission capability on board or linked. In the present configuration, lower resolution video can be both maintained on the wireless device storage and transmitted, as Wi-Fi connectivity is available and enables.

In one or more configurations, the expansion program aspect(s) featured within the wireless device (or capture device) computing operability, enables more frequent key frame capture to enable and evaluation by local and/or remote computing, leading to the selection of one key frame over another. This can first occur immediately after capture, enabling local memory and/or storage to be engaged in a first step of selecting the clearest and most beneficial key frame and/or video image data for the expansion program to employ after transmission to the linked computer cloud processing.

In capturing a plurality of 32 megapixel images per second, concurrently with video image captures of equal or frequency (which can initially literally be the key frame captures if the frame rate is high enough, such as 24 images per second) a selection of one or more key frames per second can be made based on expansion program initial detection of richer image data for live area aspects/objects. This enables the capture, selection and transmission of the most useful, such as detailed/clear, key frame information, prior to this information being automatically or selectively deleted from the local wireless (or other capture) device, such as the smartphone.

Important configurations also can enable all or most of the present processing and storage challenges to occur locally, within the computing operability of the capture device. This can be entirely a local computing event, employing the expansion program, and/or can enable at least extended periods of expansion based capture and key frame selection prior to available Wi-Fi or other data conveying, wireless or wired, or otherwise.

Thus, a locally managed process of frequent key frame captures, even as many as 24 per second, occurs locally in this configuration, whether with or without concurrent lower resolution captures. This, as key frames can be quickly selected, saved (and/or transmitted) with other key frames being compressed to lower data/resolution levels, leading quickly to 24 captures (in one configuration) of 32 megapixel images being reduced to two key frames, based on image clarity found between two thus triggering the computing to accomplish two (not one) key herein, with the full 24 captures being also compressed locally and stored as 720i video images. Thus, in certain configurations of this configuration, all can be stored locally, or some can be transmitted such as the key frame(s) and/or all can be transmitted including the two key frames and the compressed video images.

Further, any or all of this imagery, such as the compressed version of the key frames at 720i, can be maintained as viewable video for a consumer, and displayed as such, as "behind the scenes." This significant processing and selection process of key frame(s) occurs leading to selection, transmission and deletion of data (optionally) at the local computing device level to maintain as an option a reasonable amount of memory and/or storage locally. Indeed, a balance between volume of transmitted image data and memory and/or storage freed up at the local computing (capture) device level is another aspect of the present system that can be computer managed by computer determinations made by the local computing and/or cloud computing level of the linked system herein, after detection and determination of the priorities and available resources of the system. This is coupled with the speed (bandwidth) of the data conveying network available to the linked capture device (which this disclosure also refers to, generally, as its linked computing and transmitting module(s)), and the available memory and/or storage of the capture device relative to preset, user and/or system priorities for maintaining space within these data managing aspects.

Herein, the user engages an imaging device that has or is linked to wireless (or wired) connectivity that allows for the programmatic collaboration initially of computing associated with the imaging device to affect at least the storage and subsequent processing actions engaged by computing remote to the capture and transmission imaging assembly/device.

Returning to the core operability, system computing receives key frames and associated lower resolution (lower per image data groups and/or files) images, associated with a video sequence reflecting imagery associated with the same scene captured by one or more lenses and one or more capture sensors (or capture components), whether electronic or physical image capture(s). The receipt of video, representing lower resolution images than associated key frame(s) images, can occur before, concurrent and/or after the transmission of captured key frame(s), selectively.

Moreover, "video images" can refer to the sequences of lower resolution imagery relative to the "key frame" images, which can in fact be replaced and/or augmented by spatial gathering data and/or image data captured and transmitted to the linked cloud computing by another imaging device and/or spatial data gathering component, working in tandem with the primary capture device, such as the smartphone referenced herein. Spatial data can be derived from image data and/or bounced signal spatial data, such as radar/sonar or other environment sampling option not limited to temperature, infrared, or other measurable dynamic.

This tandem function can be accomplished primarily by virtue of the data being transmitted for conveyance to the same image processing computing system(s) and/or more elaborate, allowing devices to function in concert, sending less image information from each, but collaborating and even communicating locally and/or through the linked cloud computing, to share more information to improve the tandem image and/or spatial data gathering tasks accomplished by the systematically connected devices.

Herein, yet another configuration enables a third computing device to be directly and essentially configured distinctly by the present system.

After the capture and transmission of the image data from at least one device, representing at least two different resolution image captures of a scene captured by one or more lenses of that and/or multiple devices, local and/or cloud computing can engage programming dedicated to processing this imagery from the capture device(s) for being made concurrently and/or subsequently available for linked user(s) engagement of the processing options. These can be the same user(s) who captured relevant live area data and/or members of a related serviced and/or network.

In one group of configurations, the user or an associated user(s) related to the user and device, accomplishes the "triad" of computing devices (at least) that represent a minimal viable and distinct configuration of the present system. A laptop, or other image managing system(s) for generating images for display by at least one associated monitor, projector or other 2d or 3d imaging manifesting assembly(s)(hereafter collectively, "laptop") can be configured by system computing and/or dedicated programming maintained locally by the laptop and/or accessed remotely by the laptop, to operate functionally in the management of data related to imagery managed by componentry of the present invention.

Relative to image display, in tandem, this laptop (also covering a plurality of computing/display assembly(s)) accesses information managed and made available by the cloud computing (cloud), enabling a default and/or user selection engaging and/or accessing images generated by the system from video images and associated higher resolution key frame(s). Herein, a user selects at least a resolution to "download" for display by at least one display associated with the laptop. This laptop can instead be a control setting on a monitor, including a monitor that can be dedicated to manifesting selectable images in tandem with programming of the present invention at least operated by the linked/affiliated cloud.

In this configuration, with the option of selecting a final resolution of generated video as high as the key frame resolution of 32 k, the user selects 4 k final image display quality, representing a lower overall resolution potential, best suited for the 4 k display his laptop will provide image data to, in generating final "expanded resolution" final video.

To reiterate, this 4 k video enabled and/or accessed is not actual 4 k video frames of the scene, or at least all images are not from actual 4 k images captured at the represented moment in time, but are in large part 4 k images inferred from image data contributed by a key frame captured at a different time applied to a lower resolution video image taken at and/or sufficiently around the time, to be represented in the user selected 4 k video sequence. Or, the 4 k image can be related to a sequence of key frames that were conveyed with lower resolution compressions of key frames, representing video images generated from key frames to increase data storage and/or conveying efficiency. Further, such video images and/or key frames can be used all or in part to extract even lower data requiring spatial data, representative of positional aspects of objects within the live area, in 2d and/or 3d.

Again, in referring to the lower resolution video, this can be all or in part spatial data related to image and/or spatial data gathered by the first user phone/smartphone and/or linked smartphone or other sampling device(s) linked by at least their contribution of data to the dedicated cloud computing/processing system.

Herein, the first user used his smartphone to capture and transmit video to the system cloud computing. This video was maintained as 720 line "HD" (as a non-limiting configuration basis) resolution file(s) within his smartphone storage. Invisibly, during this capture and transmission of the video, 32 megapixel pictures/images of at least a live area associated with the same visual scene, were captured through the same and/or offset capture element(s) and/or sensor(s).

These large data files, each related to a 32 megapixel image (in this configuration) are maintained in the smartphone (or comparable imaging camera or device) memory and/or storage until successfully transmitted by Wi-Fi, herein, with at least associated data for relating the key frame image to at least a plurality of the lower resolution video images.

In the "display" stage, the laptop directly affects by instruction, the selection and/or creation of inferred "fictional" 4 k video images, delivered as a display worthy high resolution video sequence that was generated, not actually captured. Based on the frequency of the key frames and the discreet allocation of positional information from the video to the key frame data, the effect in this configuration is seamless and the generated 4 k images are ideally not visibly different from images that might have been captured by a 4 k, 24 frames per second image capture device of the same visual scene. However, in this system, a key value is that less than one twentieth of the data typically necessary for capture and transmission related to uncompressed imagery, is necessary for a comparable final displayed image result.

Further, the engagement of tandem devices, enables the imagery to be manifest as 2d and 3d images that enable more processing operability, as image and/or spatial data imposed to the first user's video and/or key frame data, at least, is expanded. Further, configurations are enabled, including offset and/or associated units (or capture devices such as sensors), which can contribute low or high resolution data, and/or spatial data associated with objects in the visual scene captured by at least one device as visual data, to improve the imagery captured by the first user's smartphone.

In such as configuration, a plurality of units providing image data to the cloud computing, can all capture key frames only, for example, enabling enough data to infer 2d and/or 3d images from at least one vantage point. Multiple devices, providing time code data with images, or comparable data, used by the cloud to correlate images and/or other data for processing, are enabled by the present system to contribute and even be alerted to contribute or contribute more substantially, to an overall image generating objective.

This objective can be an enhanced 2d, layered 3d, or 3d navigable environment, whether in a 2d or 3d virtual experiential display scenario. Other imaging processing and display options can further be enabled here, beyond these.

Further, with enough visual and/or spatial data captured, and fed to the linked computing, the operator of the laptop (or one of the associated laptops, or again any related computing for generating displayable images) allows a user to not only select the resolution of images, by generating hypothetically generated images, but even a hypothetical camera vantage point can be engaged, determined by the cloud based processing to be representative of what would have been captured, had a capture devices such as a smartphone occurred at that location at the relevant time(s).

From image and/or spatial data contributed by multiple synched devices, inferred imaging capture and/or quality can be generated. These fictional image captures are enabled herein, to be close enough perceptually to actual image captures that the data load efficiency gained herein offsets the value and/or need for the data intensive capture of actual images at certain qualitative levels and/or vantage points, or other variable capture scenario related to the generating renditions of all or part of the live area.

In an important range of configurations herein, at least 3 linked computers affected by the system programming in tandem enable the processing and display 2d and or 3d information over one or more display surfaces. These can allow a user to even navigate the environment via controls, as if moving through the 3d area within the capture area.

Further, a user and/or the system can navigate or explore the generated data and/or imagery until a better image rendition is available or visible, by virtue of available system data. This "quality" being featured as a visible improvement and/or measurement, such as an available resolution statistic to the laptop operator, can allow for several options. For instance, live improvement of information capture by multiple devices, informing of live area regions needing better data contribution, can affect automatic or user selected contributions by linked devices. These include the option of a device being affected and/or alerted automatically or by the first user, to vary a position or setting, to contribute in a more desirable way to the overall data capture by the system relative to at least a part of the live area.

Further, subsequent imaging processing instructions after image capture, such as a preferred vantage point of the 3d area of the visual scene, or other color, resolution or associated image relevant aesthetic and/or aspect, can be selectable and even navigable by a user, for generating preferred 2d or 3d image(s) representing the of the live area.

Thus, the present system enables the generating of conventional and device friendly video/image data, as other image data and/or spatial data is captured and conveyed for subsequent more elaborate processing and qualitative final imaging options, managed by a third system computing device, such as the laptop herein. It further enables image and/or spatial data to improve the subsequent generation of one or more preferred 2d or 3d image(s) featuring all or part of the live area, by one or more users accessing the cloud computing and data processed or available for special processing, including processing based on new first user (or other user) image processing requests by way of interface controls/instructions.

In yet another configuration, cloud and/or phone computing operates in wireless tandem with at least one other wireless and/or wired device, including another phone/smartphone or capture/computing/transmission device, or environmental sampling device, not limited to spatial and/or light sampling. Though the following functions can be accomplished by computing local or in the vicinity of the first user phone, the present configuration is disclosed in relation to cloud computing, accessed wirelessly, affecting the settings and or information gathering logistics for at least one device. This, to improve and/or increase the informational efficiency of an overall imaging result.

This configuration is designed to affect the capture rate and/or capture data volume (and thus at least resolution potential) and/or position of at least one phone, camera, spatial sampling or other data transmitting system contributor, hereafter "the linked device." As the cloud computing (and/or computing aspect or linked to the first user phone) engages programming for evaluating qualitative aspects of at least visual aspects in the live area, determinations provide computer managed transmissions, preferably via the cloud computing operability, for altering (updating) the setting(s) and/or position of at least one linked device contributing to an intended rendition of all or part of the live area.

Thus, exposure, frame rate, or whether video frames and/or key frames are captured and if so at what frequency, are among the variables that can be impacted. The system herein can involve devices that are positioned by human operators and/or automated support systems, not limited to electronic cranes, camera heads, drones or other computer operable modules capable of repositioning at least a part of a linked device.

A drone, or flying system, can contribute bounces signal spatial, audio sampled, video, or other information relevant and/or featuring all or part of the live area. This can then, in at least one configuration, be used to affect the enhancement, allocation and/or quality of information gathered by at least one other linked device, including the first user phone (again referring the previous broader definition of phone always).

For example, a human operator can receive a system alert to change position, including the providing of a "map" of the area, to suggest (from cloud computing preferably) a more useful position, angle, framing or setting for that linked device. Further, the system can automatically alter at least the amount and/or type of information that linked device is contributing to the cloud computing.

Indeed, this configuration can be entirely managed locally with tandem computing between linked devices, with subsequent transmission to the cloud computing. One of the linked devices, and/or a computing system dedicated to managing this multi-device contribution to at least an imaging rendition of the live area, can include a computing aspect that is not an imaging or live area sampler, in some configurations. This can be a wirelessly equipped laptop, or other device, functioning as the manager of multiple linked devices and even as the connectivity to the cloud computing, though not necessarily, at the time of capture and/or subsequently.

In these configurations, a system for optimal data efficiency while achieving also a preferred threshold (quality potential) of 2d and/or 3d imaging process-able information, is provided.

Following such capture, with enough information at a high frame rate, some devices can be engaged to only contribute key frame(s) and or other data, that cannot be necessarily viewable at the time as conventional video sequences. Though, after cloud computing processing, a user accessing the processed imaging results can be able to navigate such perspectives as a computer manifest imaging result, including a highly resolved still image(s) in 2d or 3d, a video sequence of a selected resolution, and/or an inferred position and image(s) that may not have had a capture device(s) present at the inferred location and/or qualitative setting represented in the linked device data based rendition of the requested position and/or resolution and/or other aesthetic attribute.

In many configurations, it is important to state and illustrate that positional, not just spatial data is gathered and evaluated by the present system of linked componentry and/or devices. Phone(s) for example, having a locational reference by internal (measuring angle, attitude and other position relative to a fixed point) or external dedicated objects (such as the satellites of a GPS system), can transmit this data to the system thereby affecting generated imagery. This may or may not be or contribute to any spatial information processed/factored by the system, which can be bounced signal information, compared visual information, (such as those between two devices capturing aspects of the live are from two identifiable positions), or otherwise spatially and/or positional sampled information associated with aspects and/or objects within the live area. Thus, system determinations of dimensional relevance at least can be determined, at least in part, based on contributing sampling unit(s) position at a given time, which is yet another data point collected and sampled by the system herein. Note: "live area" also refers to the subject area of imagery, in 3 dimensions, when a plurality of units are capturing data related to different capture locations and/or parameters of such a live/subject area.

For visual, spatial and/or positional data contributing units, their position whether fixed or moving such as with a drone, vehicle or otherwise variable dynamic, can be continuously updated by positional sampling, not limited to GPS data. Thus, the position of a drone, or comparable unit, can be provided as data with visual, heat, spatial or other information gleaned from system compatible sampling of at least part of the live area.

Further, the present system is a dynamic optimal imaging evaluator and adjustor/updater. This includes enabling at least one computing module, such as the cloud, to determine and transmit information used to update positions and/or settings for contributing units (and/or their components), such as the phone(s) and/or drone(s) or their equivalents in certain configurations. Further, the settings that their sampling devices herein engage are not limited to sampling frequency such as frame rate, and can include device attitude, position, location, exposure, capture resolution, focus, focal setting, among other variables affecting image capture.

Further, system alerts for manned devices/units to be updated and/or repositioned to improve live area informational coverage, power the goal of an optimal collaborative imaging potential from cloud processed overall data related to the live area. This can enable members capturing an event to electively update their position and/or imaging device choices, based on alerts that suggest the potential of more useful contributions at a given time to the imaging initiative. Such a goal or initiative can be known to the operator of a linked device, or can be generally assumed based on membership dynamics of a collaborative service providing imagery from the linked cloud. Additionally, contributors may or may not know what the system and/or primary operator or first user have as the live area related imaging priority at least at a given time. In cases where they do know, the secondary option to enhance and/or be rewarded for actively improving their informational contribution to the cloud, can motivate competing and/or collaborating contributors to the objective of the desired live area image processing latitude.

In one or more configurations, such contributions involve rewards and/or payments, for contributing knowingly or blindly to an imaging priority associated with a scene valued by at least one user other than the rewarded contributor. In such an instance, computer managed alerts inviting contribution can occur and many even increase in value as featured, to drive participation by potential contributor(s) to the overall imaging objective. The power of a collaborative imaging network of at least some human operated device(s) is provided herein.

For example, informational contributions of greater system and/or controlling user determined value, can receive disproportionate rewards, whether cash or other value, such as points valued for other goods/services. System/cloud evaluation of these factors enables an improved collaborative imaging basis, motivating, alerting and/or automatically controlling devices dedicated to and/or operated by users, who can be members of a service associated with the cloud (and/or imagery) enabled by the present invention.

In a distinct value sharing configuration managed by the cloud, many contributors to a scene (live area) such as a rock concert, can share in member fees and or viewing fees and can herein share in those fees based on discreet priorities and parameters. This includes the amount of traffic by viewers over the imaging area covered by the contributor, selectively. Thus, a more valued or viewed angle and/or rendition of a scene, even if just a portion of a longer video sequence, can reward a contributor more than another, whose imaging or other contribution to the collaborative member viewable (and/or paid viewable) service was less viewed or relied on for image manifesting to system parameters.

Thus, more interesting, risky and/or engaging imagery associated with the live are and/or variable live area(s) is incentivized. In one or more embodiments, the present system thus enables image evaluating programming to facilitated aligned image gathering processing and transmission data that affects the devices and/or accounts of contributing members, leading to improved contributions not limited to device(s) being repositioned to cover "weak areas" in an overall 3d coverage scenario of the live area.

An additional configuration includes a user who moves well and contributes smooth and intriguing video of a scene, via a system/cloud linked (or compatibly programmed) device, compared to other less valuable imagery of the live area, which can be more static or less up-close to key objects of the live area(s). In total, a system for driving the most engaging and qualitative imaging result, such as a 3d environmental recreation that users can navigate in 2d or 3d through paid interface options (or otherwise) is created distinctly, in part by engaging a plurality of device computing aspects in a tandem imagery processing initiative leading to more valuable final imagery for at least one user and/or member.

Further, contributions by members to an imaging initiative include the creation of a layered, dimensional rendition of the live area (or part of it) for navigation through or viewing of that imagery by member(s). This enables a value sharing imaging proposition that is distinct. Indeed, subsequent use of contributed imagery and/or related data from members, and/or other network member's ratings or other expressed interest in such member data contributions are among the variables that can impact the remarketed and/or rewarded value of information contributors of data associated with the live area.

In one or more embodiments, sponsors can engage the network to generate more valued advertising imagery, paying or otherwise rewarding participants for their contribution(s) based on their own use of related imagery for marketing, and/or their own valuing of related users' feedback/interest in such contributed imagery/information/data by user(s) who can also be members of such an imagery based social network.

Figure 22:
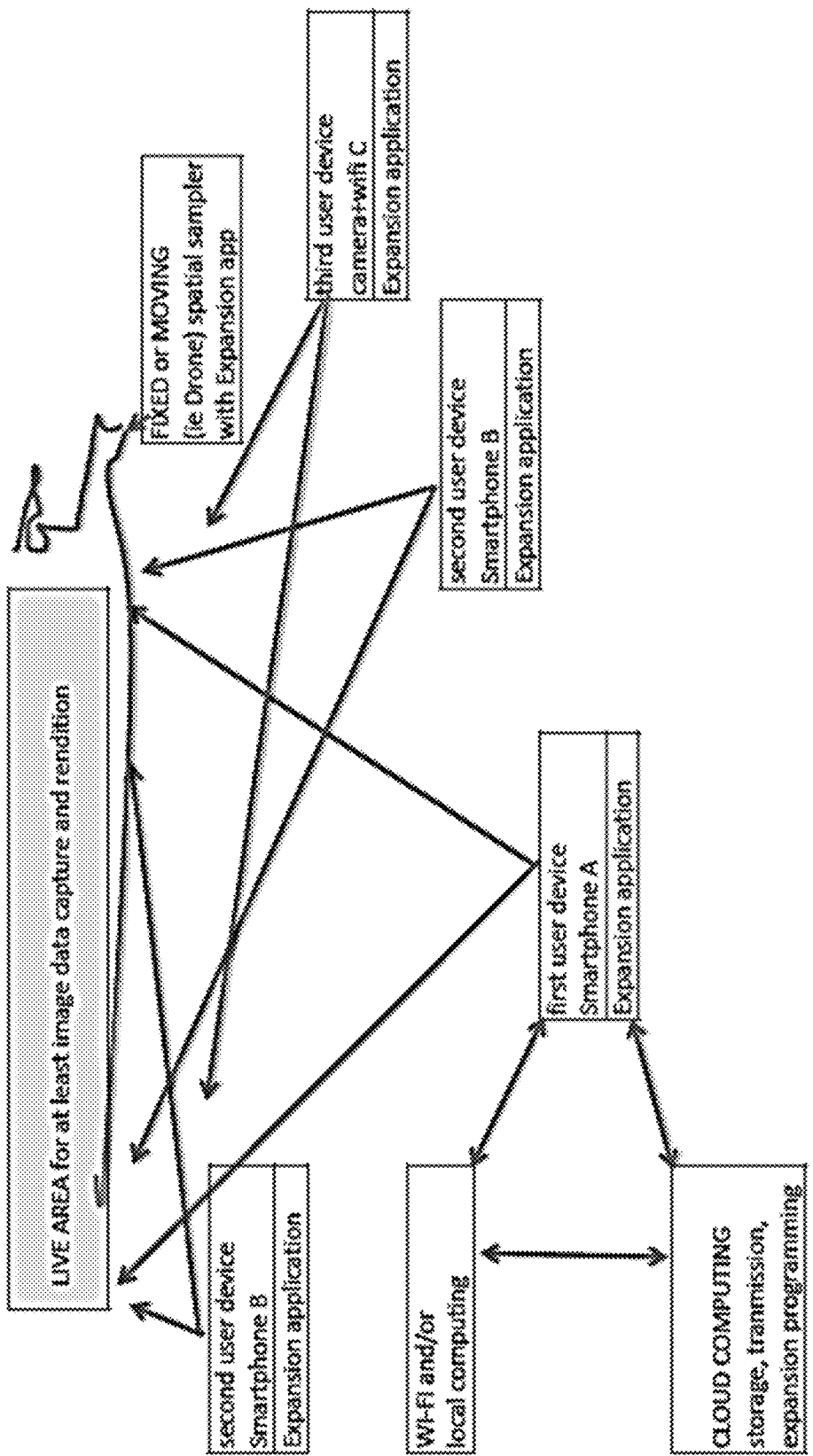
FIGS. 22-38 illustrate additional features and implementations in accordance with the present application.

The present application includes features that enable improved imagery from less data by one device, such as smartphone. Contributing device(s) can be linked by system software, and Wi-Fi, for example, thereby improving further image processing options including via a linked external cloud computing system. Fixed and moving image and other data can be featured, including drone contribution of spatial information and GPS data, as with the GPS data contribution with (and/or referenced with) time data managed by the cloud to enable temporal manifestation of the collaboratively contributed data to viewer(s) or to ensure proper rendition of objects at a given moment in time, even in still image(s) form. See, for example, FIG. 22.

FIG. 1 below represents an example interaction between a user device, herein a smartphone and linked cloud computing, each operating compatible aspects of the Expansion software of the present invention. In this example, the first user phone captures 24 frames of 720 line resolution video, in one second of time. It further, in this non-limiting configuration, captures one or more than one high resolution key frame, herein three 18 megapixels of 16 bit uncompressed images per second. Local computing (though not necessarily) determines one of the three key frames herein, to be of superior quality and/or clarity. Indeed, a plurality of key frame portions may have contributed their attributes to form a single key frame transmission, selectively, allowing the best captured aspects of key frames to contribute in tandem, even if dispersed over a plurality of key frames.

With continued reference to FIG. 1, cloud computing receives, by WiFi reception from the phone and conveyance through wired internet connectivity to the cloud (or other means wired or wireless transmission combination) approximately 2 mb of data related to the 720 line video images and 36 mb related to the selectively uncompressed computer selected key frame. Cloud computing employs expansion software, now capable of inferring revised versions of the key frame based on at least aspects' changing positions in the video images, is capable of generating up to 576 mb of 18 mp uncompressed imagery at 24 frames per second, from under 40 mb of originally received image data. Indeed, key frame resolution, selection of color bit level, compression basis, frame rate and other variables can be factored in generating, transmitting and/or generating imagery from such imagery contributed by a lined. device, such as a phone.

Figure 23:
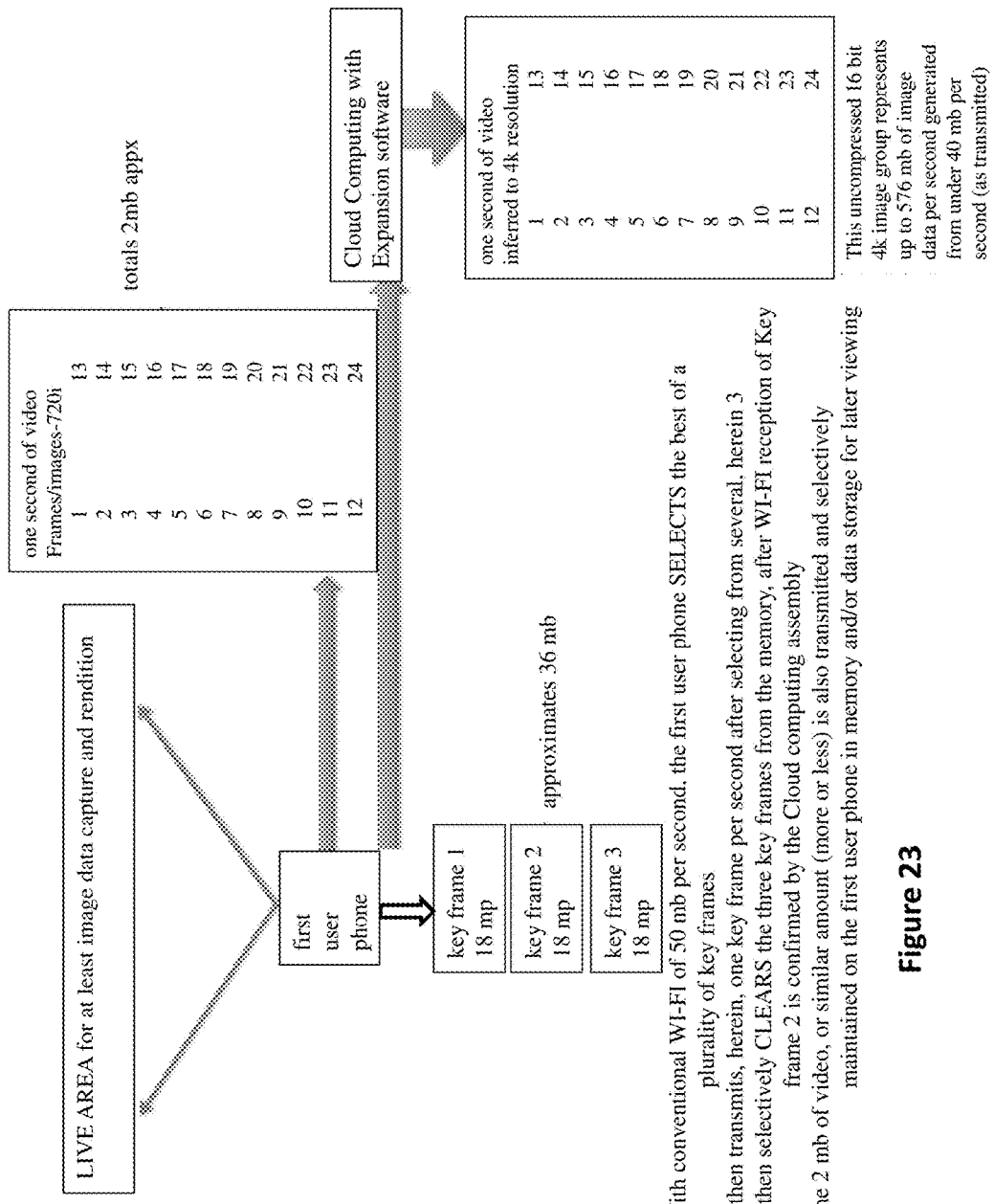

It is again important to indicate, key frames can be generated herein in tandem (or concurrently) with related lower resolution video images, or the lower resolution video images can result from the local computer managed compression by the phone, via the programming of this system all or in part, enabling a greater number of high resolution key frames (such as 24 per second) to be captured, evaluated, and then compressed (and conveyed as at least one selected exemplary key frame) before being selectively deleted from the phone's memory (and or storage). See, for example, FIG. 23.

In this way, one series of captures at a very high resolution, can enable an image inference alternative to image compression, allowing for the recreation of likely information related to one second of imagery, rather than the degradation of the key frame images used as a high quality basis of final image creation. Thus, compression is replaced by anti-compression, or image extrapolation based on information reliable enough to infer perpetually good renditions of the high resolution images that might have occurred instead of the lower resolution video images relied on in part in generating the 24 inferred final images for the one second of time, herein.

Figure 24:
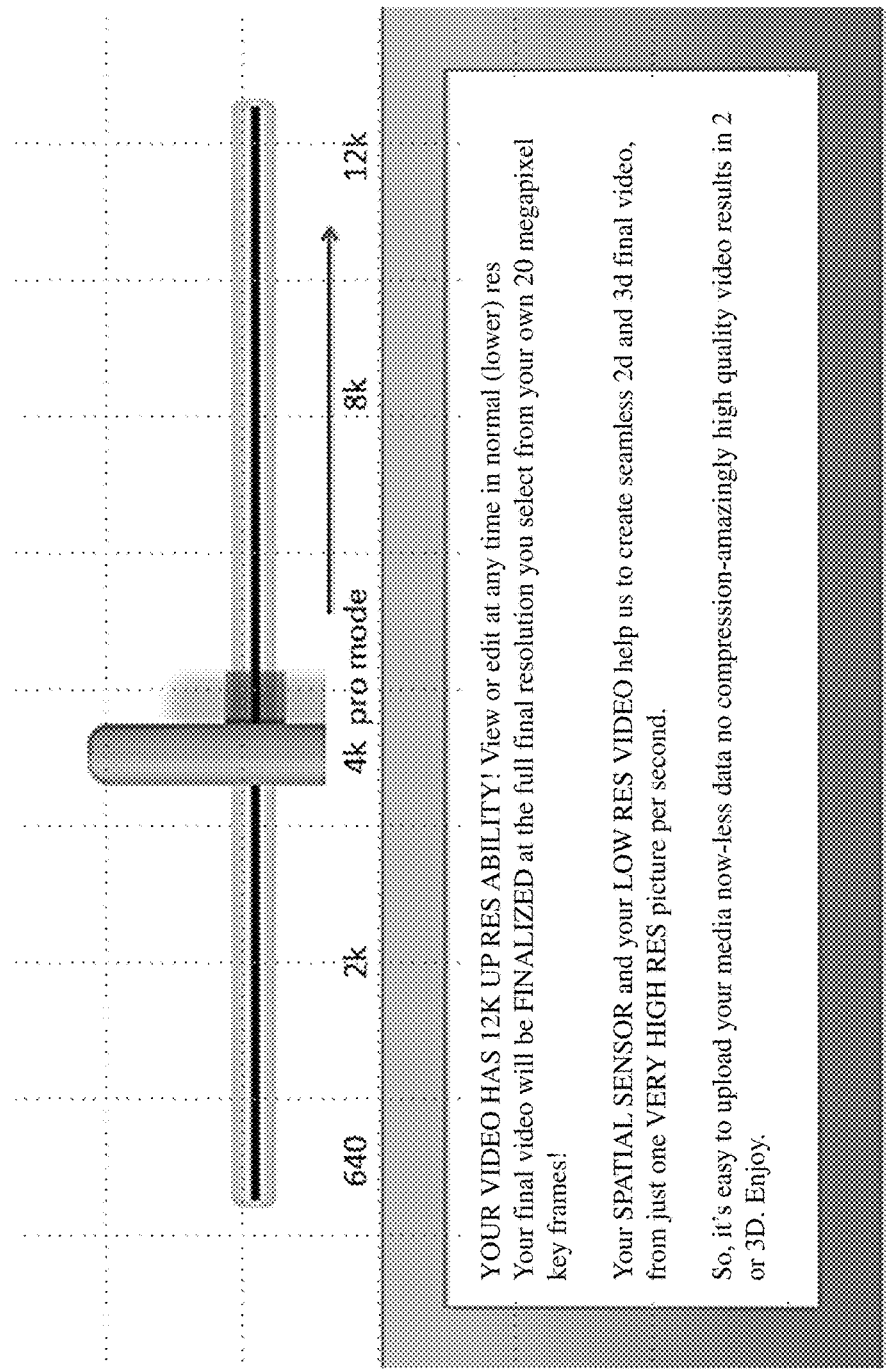
Figure 25:
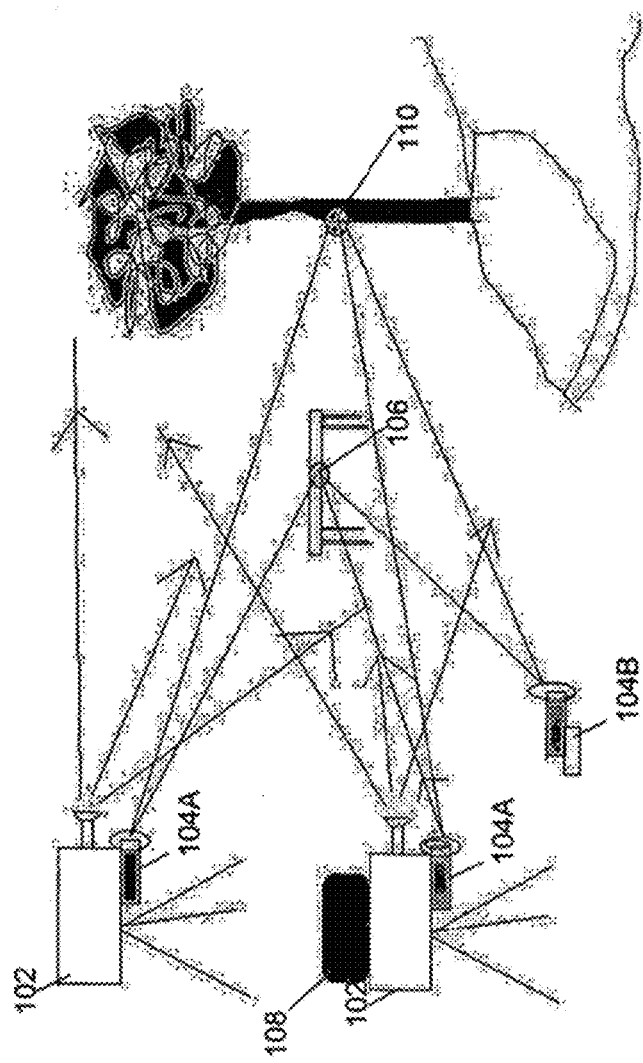
Figure 26:
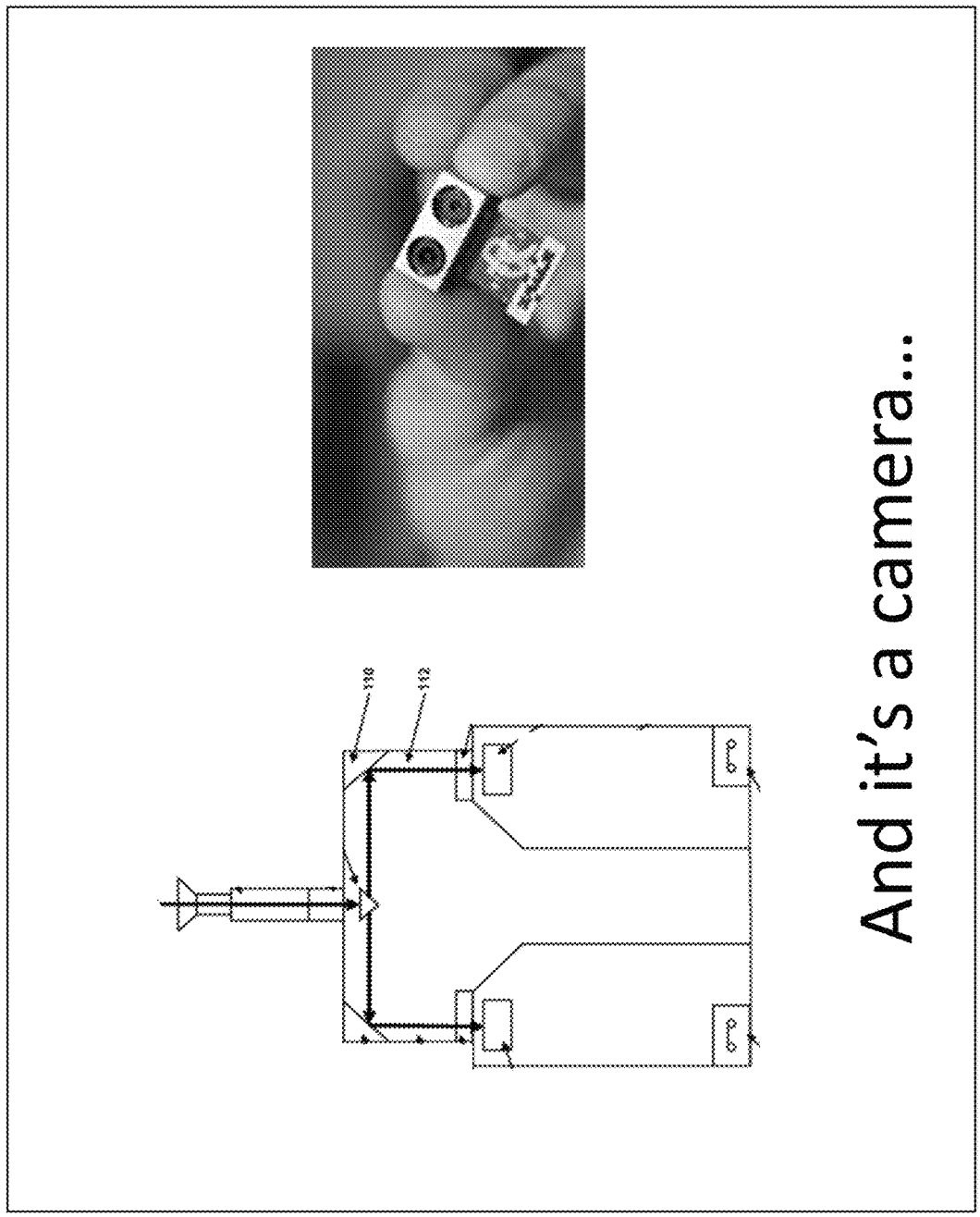
Figure 27:
Figure 28:
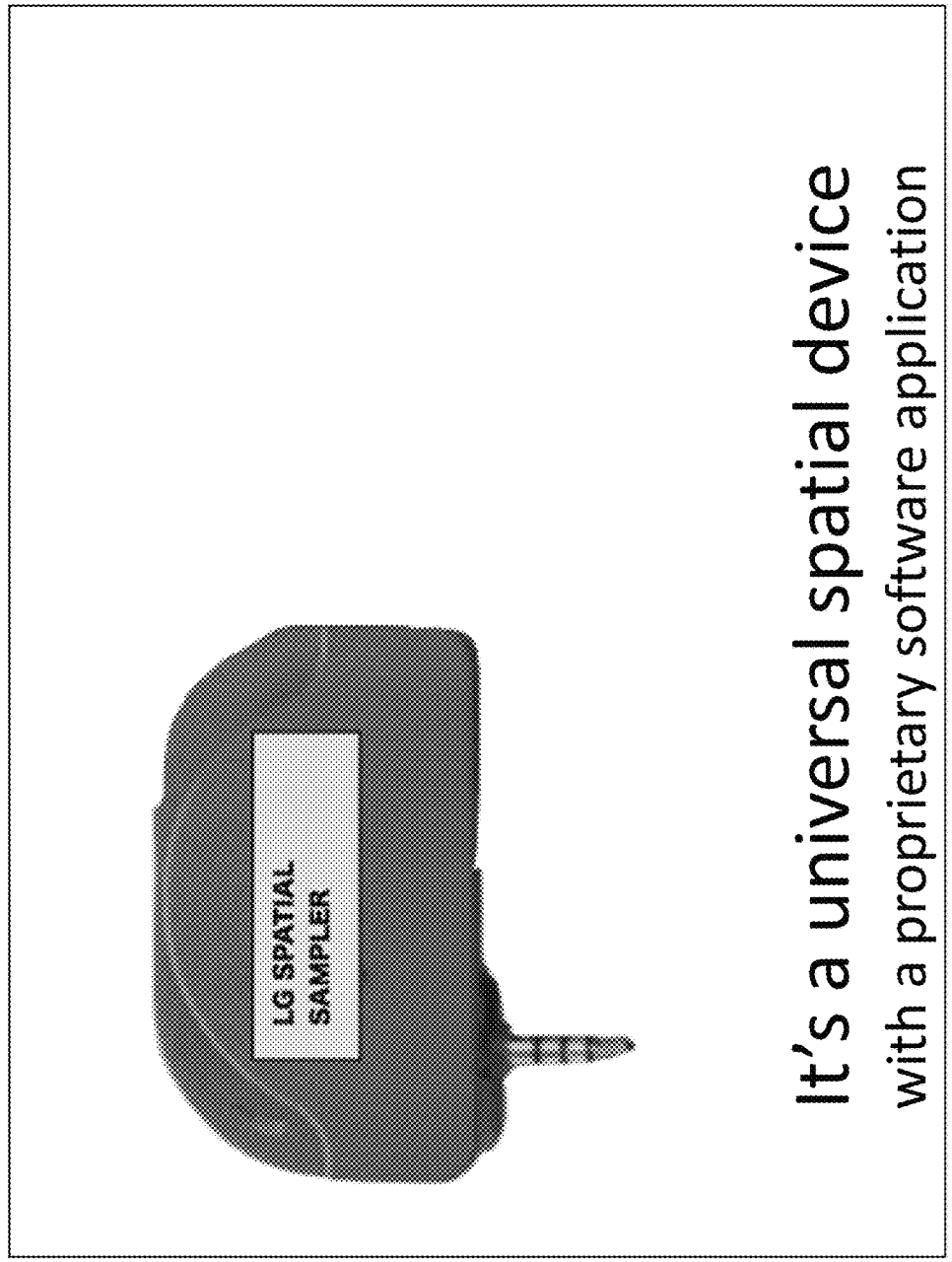
Figure 29:
Figure 30:
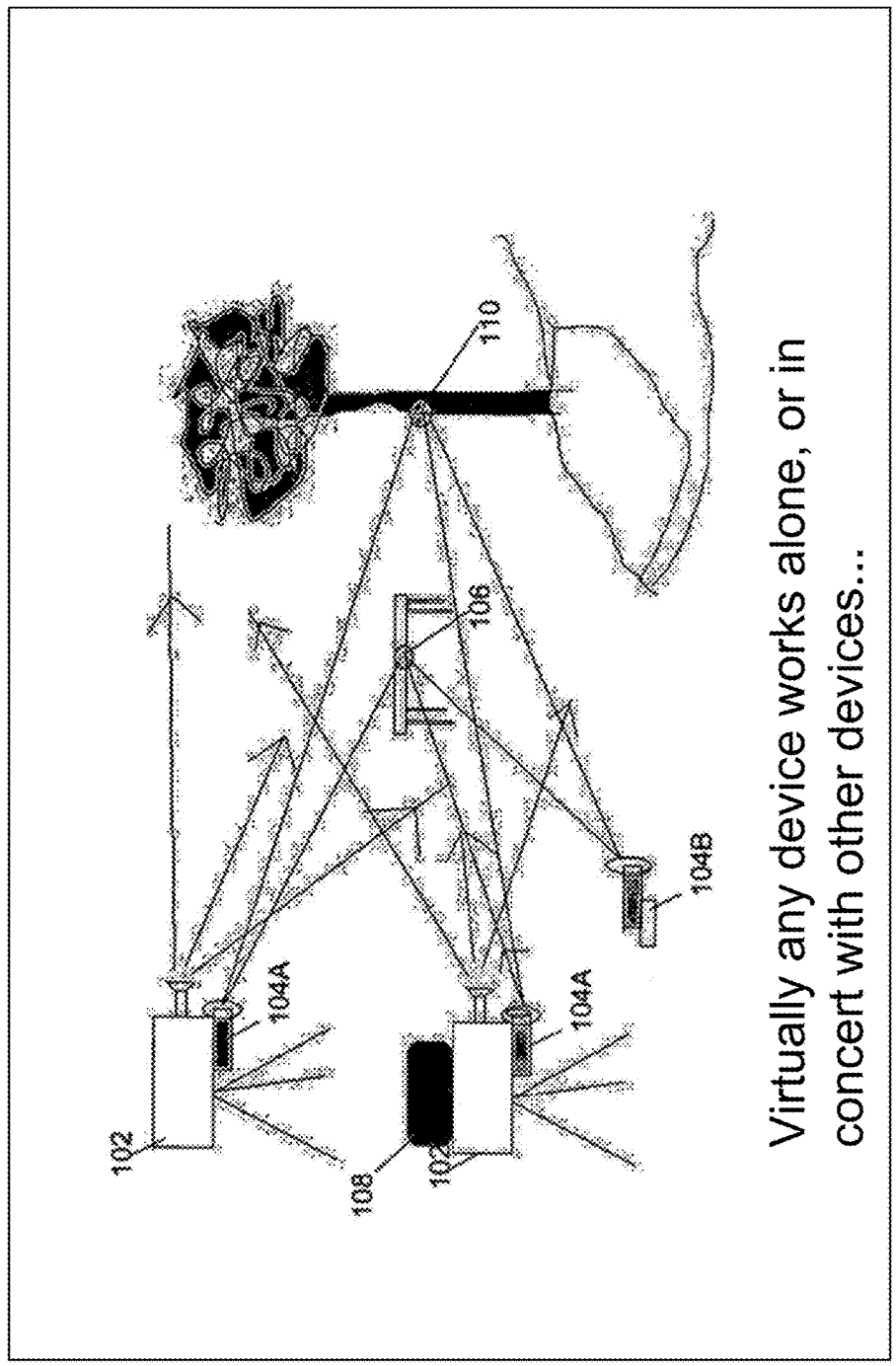
Figure 31:
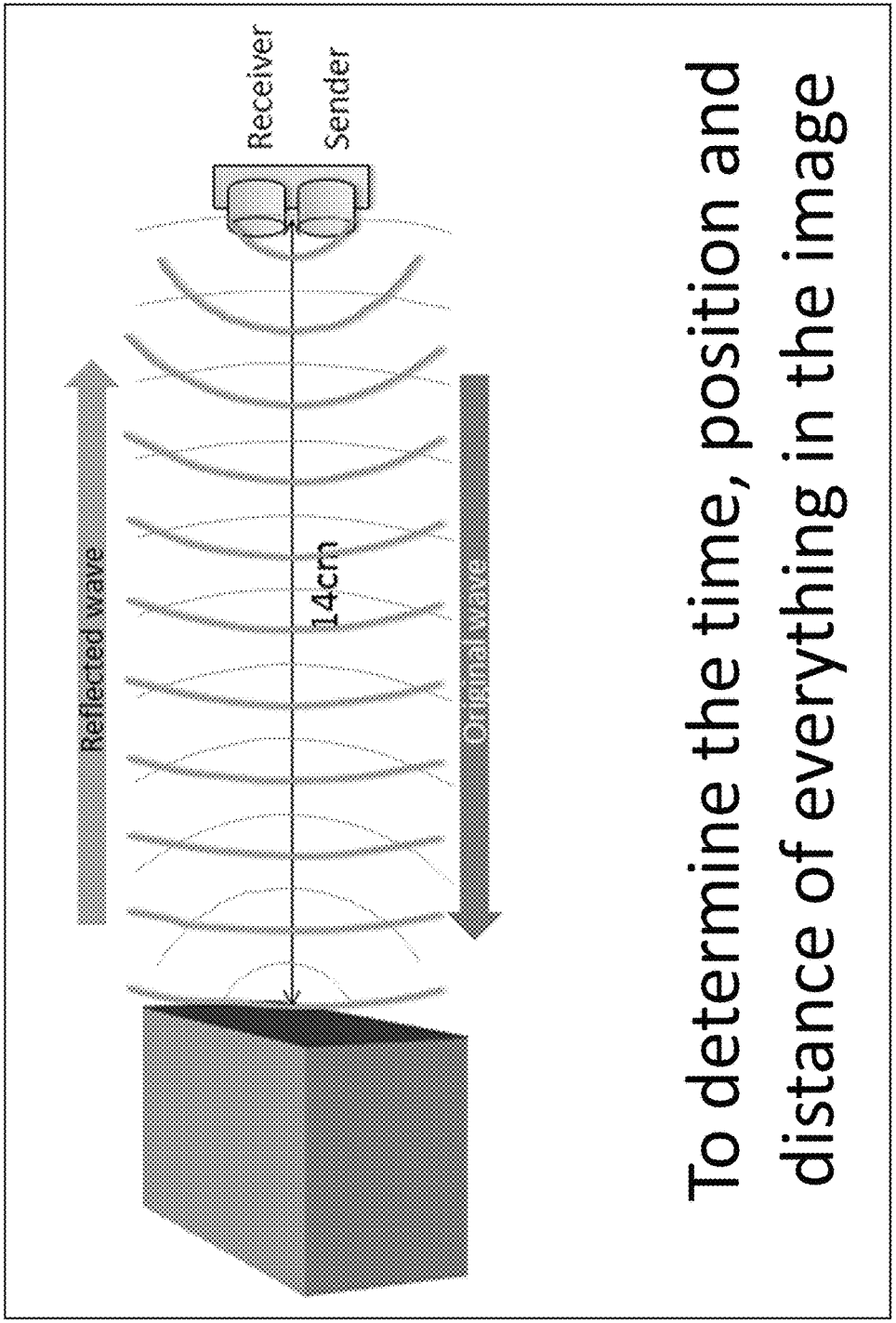
Figure 32:
Figure 33A:
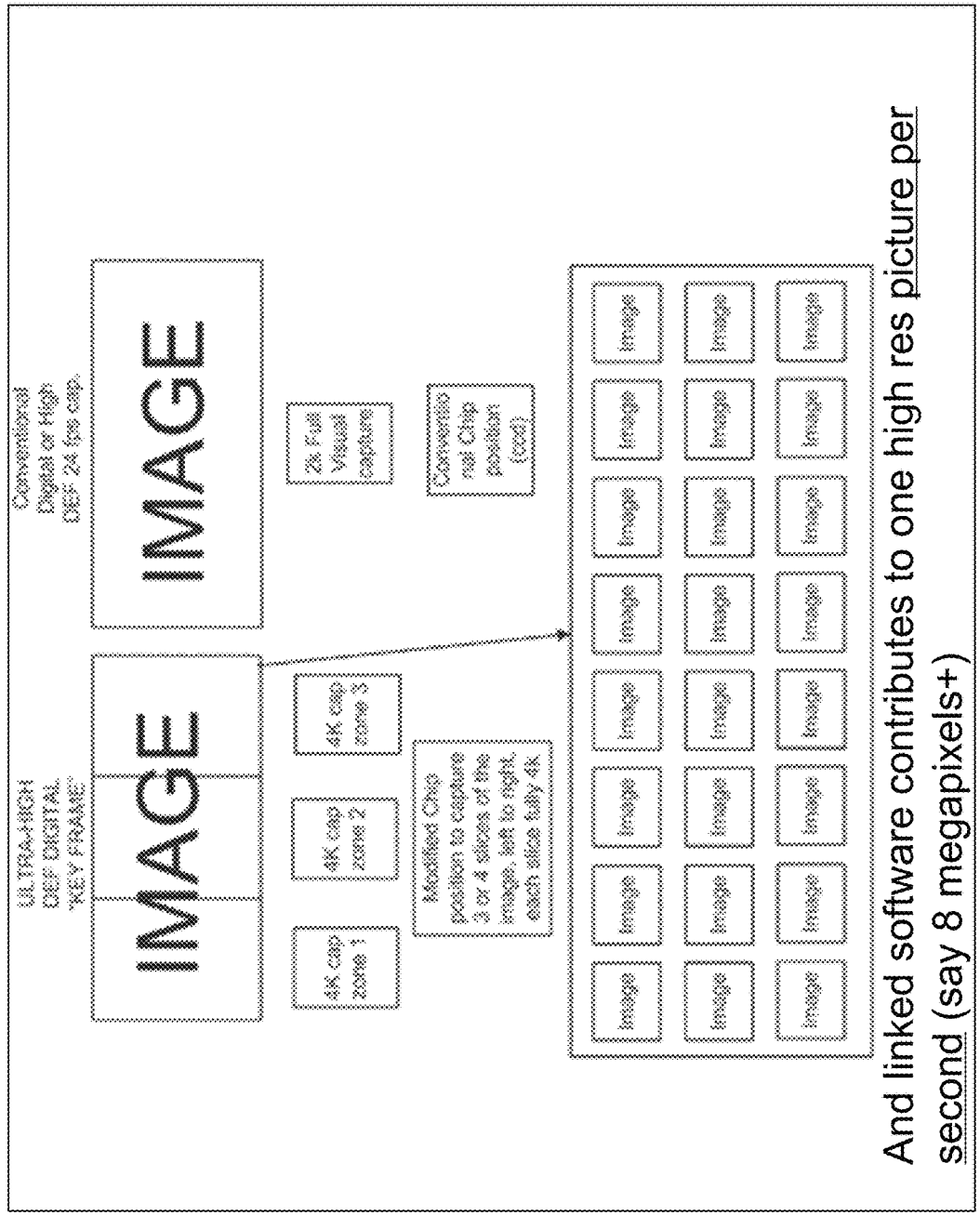
Figure 33D:
Figure 33E:
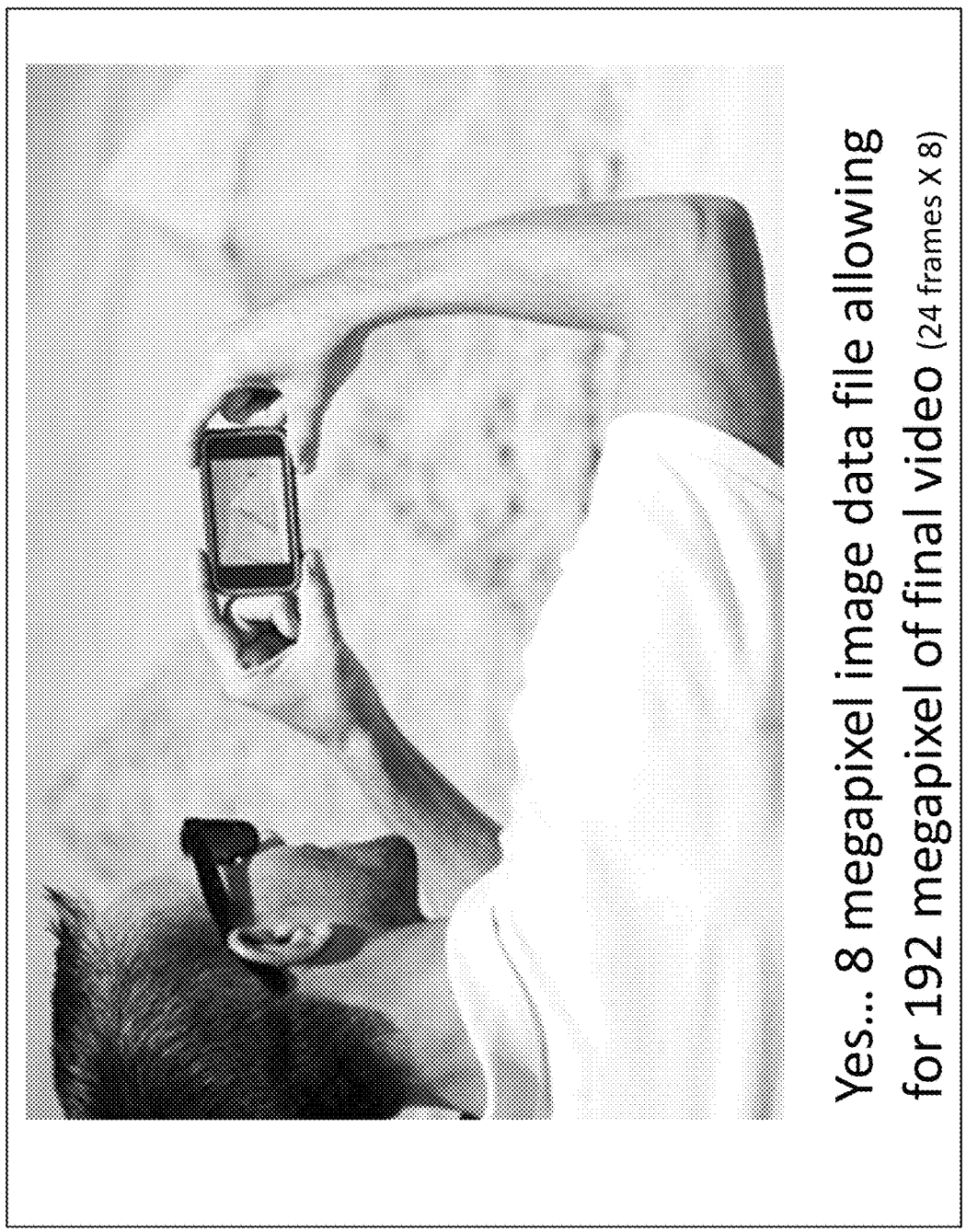
Figure 34:
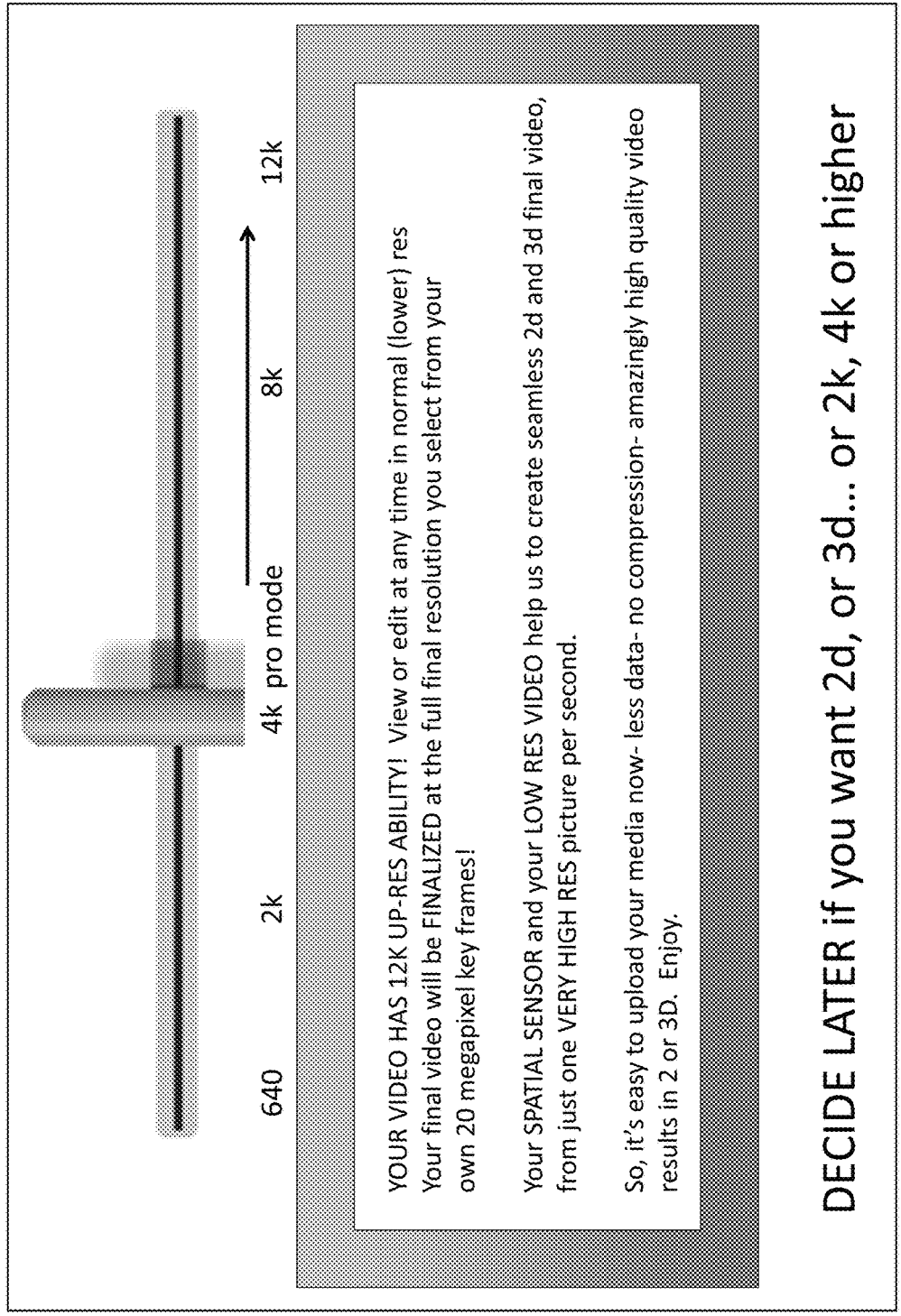
Figure 35A:
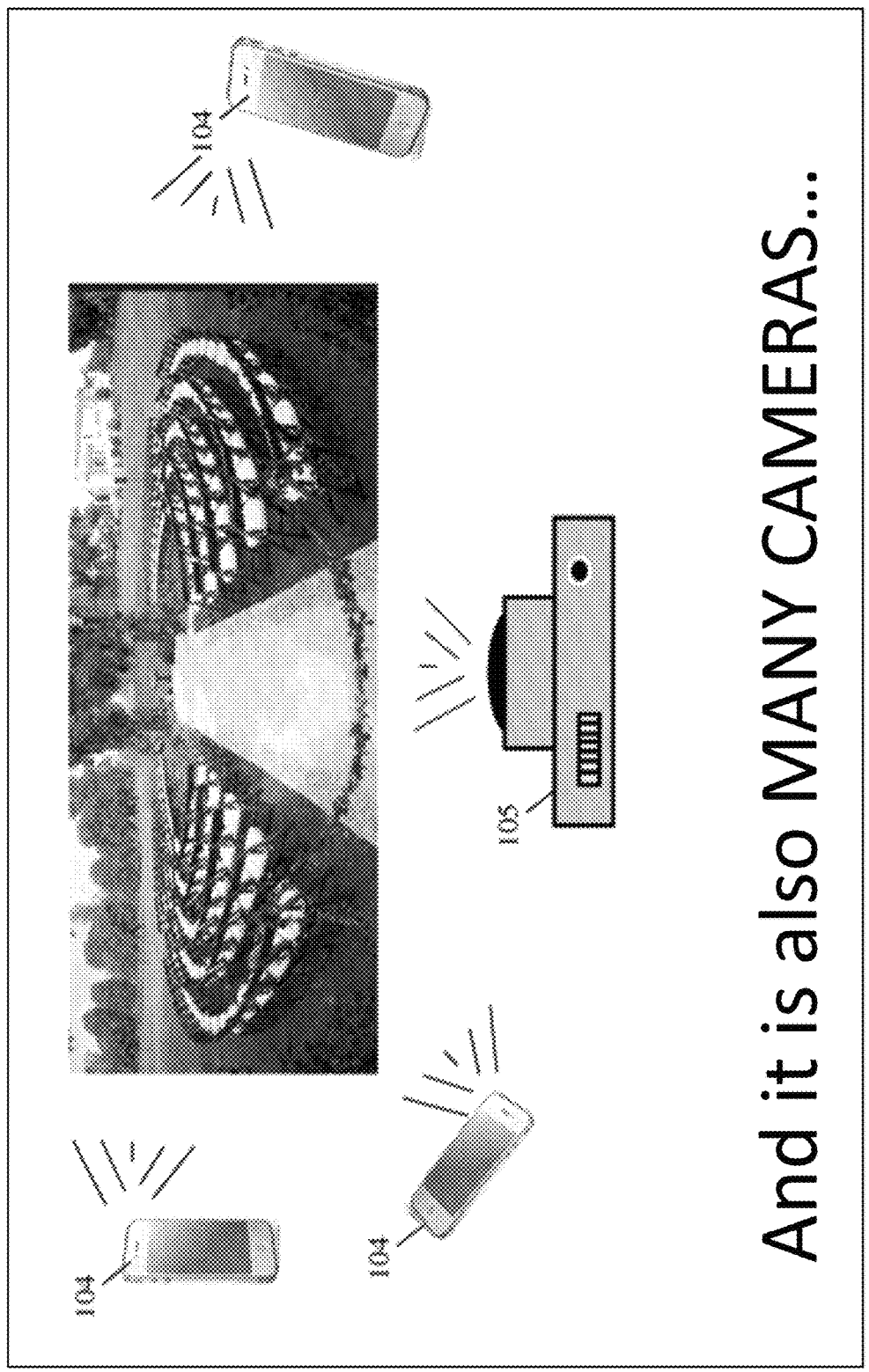
Figure 35B:
Figure 35C:
Figure 35D:
Figure 36A:
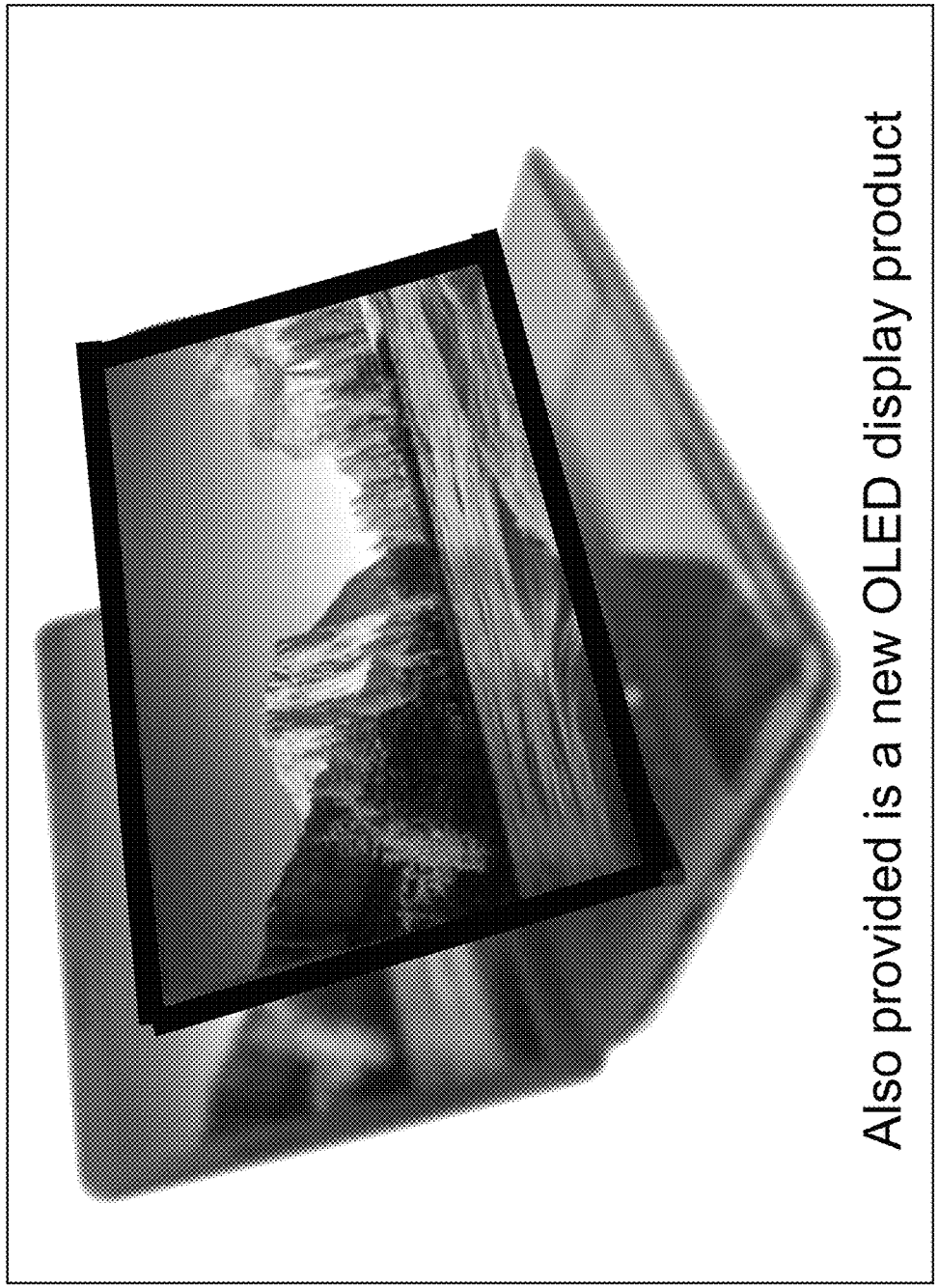
Figure 36B:
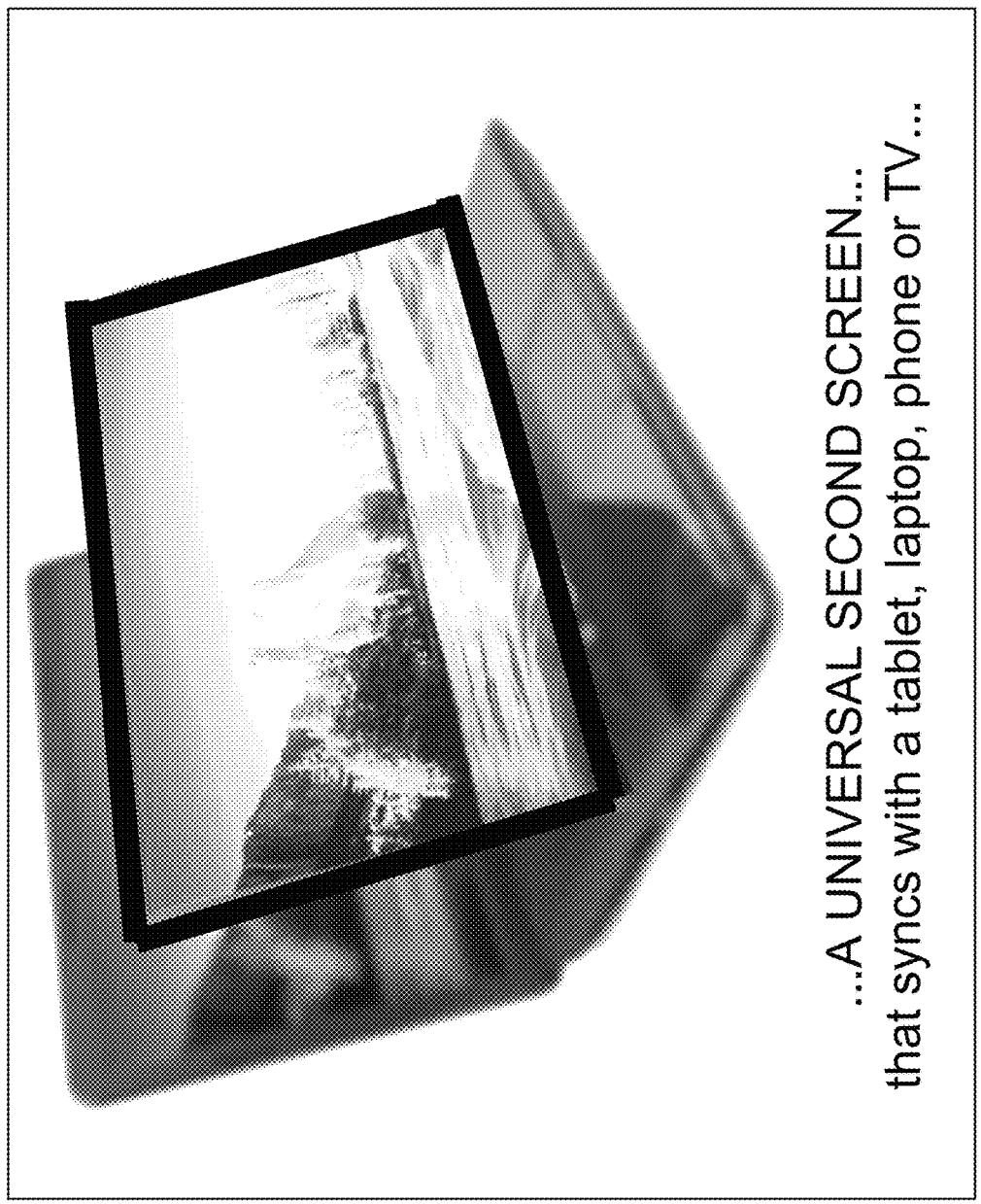
Figure 36C:
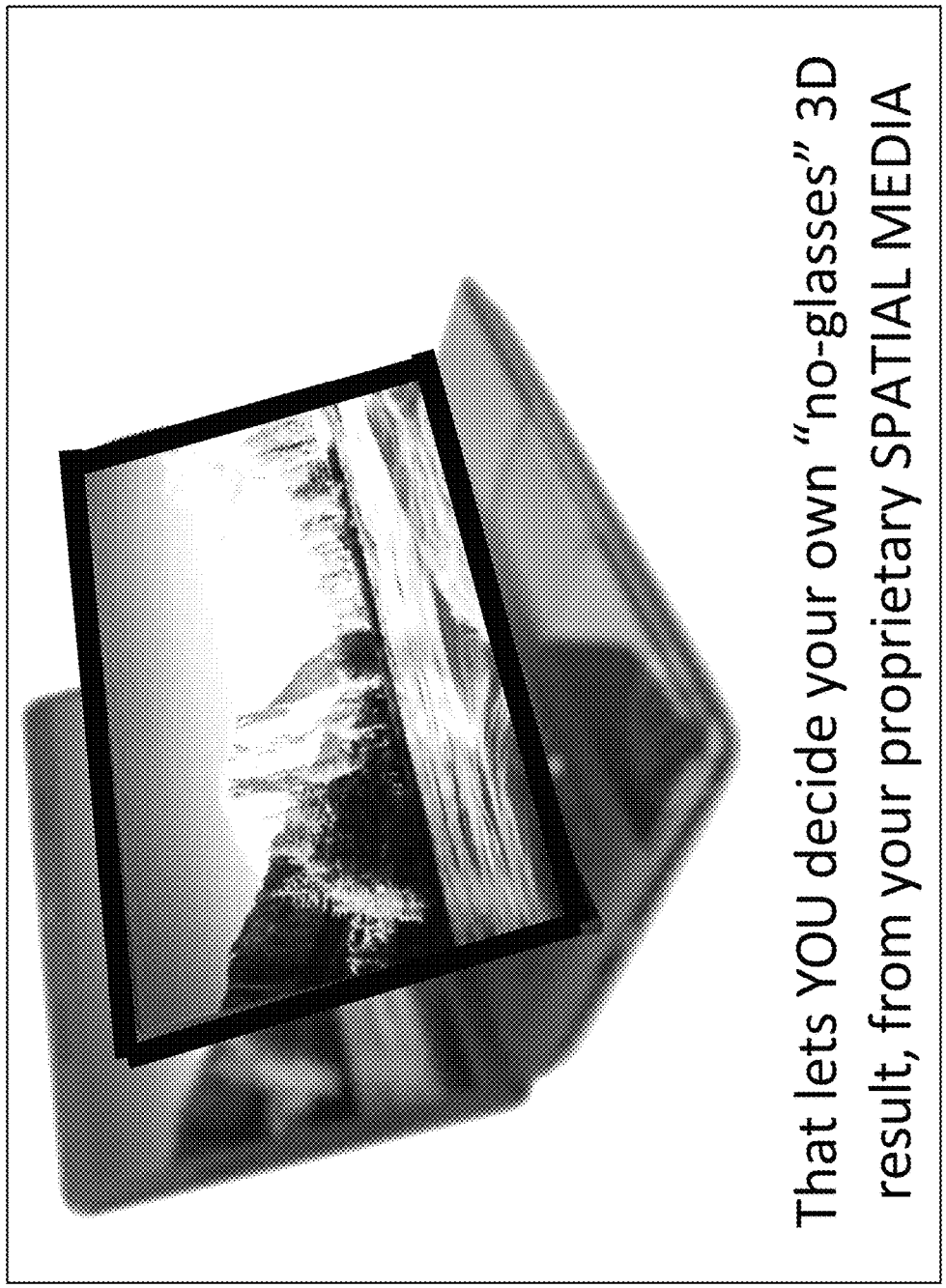
Figure 37:
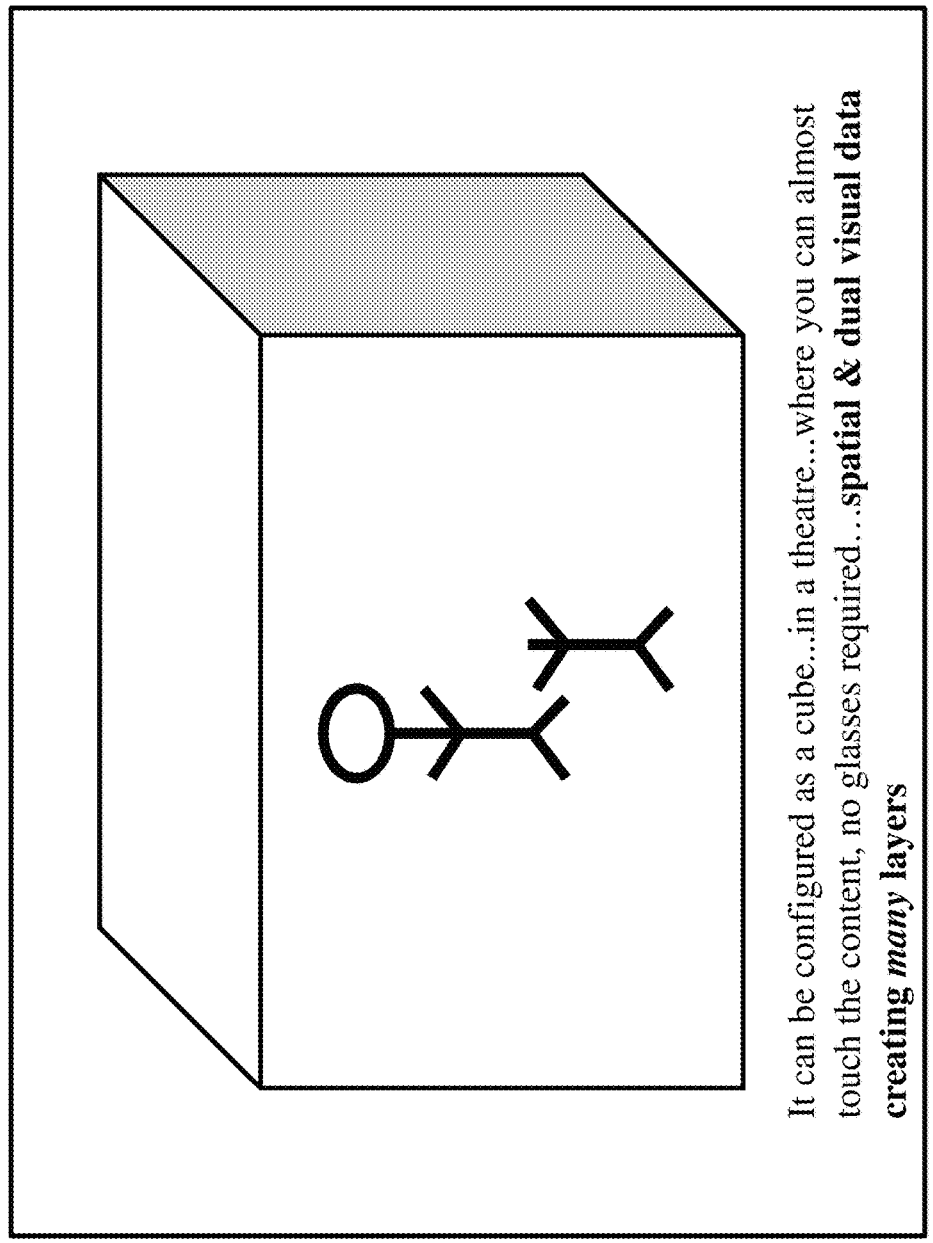

FIG. 24, below, illustrates the user control, enabling the user who captured imagery and/or an affiliated member of the cloud associated imagery service, to select the level of resolution for display, in accordance with one or more embodiments. This can occur via a wireless device and/or laptop or related user controlled computing device, which at least impacts the display of inferred/generated images by the cloud computing on at least one target monitor. The target monitor can include direct view, projected, OLED, and/or 3d or any display device comparable to these. Indeed, other selections such as color bit level, compression, and frame rate among other process-able variables can be affected at this point, selectively, to allow not only resolution to be selectable, but the size of the 4 k data files (as in the present example) and other variables impacting the eventual display and imaging managing system conveying the generated imagery to the display, such as the user laptop computer also equipped with compatible Expansion software in this configuration.

Indeed, the present system affects linked devices at capture, for at least conveying useful data to the linked cloud. Further, subsequent affect of compatibly programmed user computing can be provided with image data from the cloud to be directly impacted by the distinct image managing of the present system/method.

Cloud computing, in many configurations, can factor in at least one or more of: visual data; spatial data; time related data; system devices setting data; GPS and/or other positional data; user input data at capture by at least one device(s); user input data affecting cloud processing and improved image creation (inference); a user value variable impacting rewards for at least transmitting image data directly or indirectly to the cloud; user imagery qualitative data related to the category and/or determined interest level of viewer(s) in transmitted imagery/data; alert data for impacting the action of user(s) engaging device(s) to capture and contribute data including image data to the cloud; service data correlating members who view imagery from the cloud; value sharing data and programming for determining a value of data contributions by participating users operating device(s) transmitting data processed by the cloud; and rewards partitioning programming for allocating an available amount, including an amount determined from overall interest in the cloud generated imagery, to each contributing data providing member with the option of this being allocated disproportionately, among other video data or other informational aspects at least managed by the cloud and/or local computing aspects affiliated with at least one image capture device, not limited to the phone of a first user.

Additional examples in accordance with one or more embodiments of the present application are shown and described as follows and with reference to FIGS. 25-37.

In relation to and providing additional operability in relation to a system for factoring information provided by at least a first image capture device and at least one positional sampling system and dedicated module related to at least the position of the first image capture device:

A digital camera is provided capable of providing at least one image sensor or related capture of a desired scene and/or plurality of captures of that scene from a camera equipped with multiple sensors and/or lenses. This camera is further equipped with a spatial and/or positional referencing unit, for determining the position of at least an aspect of the camera and/or of an object(s) visible within a scene captured by sensor(s) of the camera; ie the "first visual."

In one configuration, GPS related information is gleaned by a dedicated module(s) of the device which also houses at least the image sensor(s) related to capturing system relevant image data. In this configuration, time/temporal information associated with the time of at least one image capture is also captured. The present configuration provides remote computing, accessed wirelessly, and in this configuration this is will be referred to as "cloud" computing, which manages a database of at least one concurrent and/or previous image data file featuring at least an aspect and/or object visible within the first visual.

Herein, the system is disclosed to two cameras contributing information wirelessly to the cloud computing toward the creation of a tandem imaging result incorporating at least image data from one of the two cameras and spatial/positional and time information from both. These may be primarily camera units or primarily wireless units with camera aspects, such as SmartPhones, that provide their data substantially live and/or subsequently. These may also be recording imaging units that provide their image, positional and time information subsequently by another computing and transmitting device(s) that are compatible, among other configuration possibilities.

In one configuration, two cameras capture image, positional and/or spatial information, and temporal/time information associated with the respective captures, at different times. This represent a first and second capture of the first visual; in this example, still image captures. Both cameras provide their information all or in part, wirelessly by image data wireless transmitting means and through a dedicated application of the present system, to system computing. System computing manages a confluence of image, time, positional and contributor information, which include accounts associated with the imaging device(s) and/or their operator(s).

Continuing with this configuration, a first user and a second user operate the first and second cameras, herein, respectively. The first user and second users provide by way of their respective cameras, and thus system computing receives, in any system manageable order, at least these data aspects:

an image of the first visual transmitted as digital image data or the equivalent;

a specific instant in time represented by system compatible temporal data;

respective user identifying data that may be first user device ID such as cellular phone number and/or other identifier;

GPS referenced positional data associated with the respective camera;

And in another range of configurations, additional data representing camera attitude including information associated with an angle of the respective camera relative to at least one universal reference point determined in relation to gravity and/or another external measurable influence.

In yet another configuration spatial data may provided, representing positional information of objects within the first visual, by way of bounced signal and/or visual data evaluation local to the camera computing and/or in via system computing after receipt of such data/information. (Herein, data represents electronically provided information, generally).

In one configuration and scenario, the images are still images. In another configuration at least one includes the capture of a sequence of images, including but not limited to familiar video frame rates such as 24 and 30 frames/images per second. In another configuration and scenario, communication between system computing and the camera(s) enables system transmitting recommendation or automatically engaged instructions, to maximize image quality generally and/or in relation to image data stored and or being received from the other camera(s).

With the benefit of multiple images gleaned, including selectively more than one tandem images captured through one or multiple lenses of each camera, and in relation to correlation of time and positional (and selectively attitudinal) data, a range of image improvements are provided. Not only may an image be advantaged by more than one "on board" capture of the first visual, such as multiple sensor and/or lens(s) capture of the scene for factoring offset similar captures, and/or captures representing different focal, focus, filtering (such as color) and/or other image capture variable(s), but herein imagery is improved by enabling the sharing of data between devices that are or have captured image data of the same, or aspects featured in the same visuals.

Thus, an operator of an application on a camera (such as a Smartphone camera, or other, including cameras recording image and associated data for subsequent download to a computer with access to system computing and related images from other contributing camera(s)), may take an image of the first visual such as the Eiffel Tower, and engage or be prompted to engage, or automatically benefit, from the contribution of image and/or other non image data contributed by another camera and/or non imaging device linked to the system contributing system managed data, such as spatial, light source, positional or other data.

In one configuration, a Smartphone operator, has or has downloaded and application enabling compatible image capture for user by the present system, ie the Cloud computing. Before, During or After capturing an image, that user may be prompted to, or experience, the engagement of collaborative image resources, which have been contributed by another camera compatible with the system computing, (hereafter just "cloud").

In one configuration, other imagery may simply be "reference" or made available based on image and/or positional reference data recognized by the cloud and deemed relevant to other imagery within a linked database(s) and/or accessible from other contributing device(s)/camera(s) at that time generally, such as other tourists engaged in the application of the cloud providing imagery and/or available to do so.

In this scenario, still imagery may be enhanced with detail, color or other image data attributes, or otherwise altered aesthetically, based on the reference and reliance on the image and/or data contributed by a separate camera. Herein, a configuration enabling variable changes to a user's photo and/or video, may be provided by controls, which detail and/or illustrate the improvements available. These may also selectively provide a degree of integration of external user/contributor resources, relying selectively more on that image and/or associated data, to affect and likely improve the image, and eventual photograph, desired by a user.

Indeed, other users who are not camera operating users may thus create image results from imagery and data from a plurality of live and/or previous image data contributors, allowing the range of image and related data, (positional, temporal, and/or spatial and/or other) to contribute to a multi source 2d or 3d final image creation that may even reflect a degree, or %, of final contribution by the involved camera/user contributions.

Further, as disclosed and implemented in an improved version here, such contributions may be engaged substantially live by picture taking users of the application herein, to generate improved 3d pictures and/or video. This being variable to the desire of the user, allocating 3d imagery based on a provided control/option, to affect the allocation of information to each eye by way of exiting 3d offset image files or the disclosed engagement of offset viewing screens, at least one of them being positioned above the other and enabling see-through, semi-opaque viewing of the under screen. In this configuration, a smartphone would in one configuration have a "screen protector" transparent surface, that when moved into position, by hinge or other connector, is positioned an optimal and/or selectable space above and substantially parallel to the under screen, which is in this configuration the usual OLED screen of the device. Thus, image data allocation is engaged enabling distinct but complementary still and/or motion video data to be allocated to the two (or more) displays, offset to enable a literal spatial offset mimicking and enabling a facsimile of the actual spatial offset between objects within the visual scene captured, such as the first visual.

In this configuration, a "slider" or other variable control, may enable a custom allocation to the plurality of displays. In another important configuration, this plurality of displays occurs within a fixed or variable space, enabling like a cube of amber, more than two display depths by the 3 dimensional display section, or OLED block in this case. Thus, pixels of different color and brightness relative to each other, may be manifest at many unique depths from the viewers eyes, creating a multidimensional impression based on the actual subjects in the original visual scene and/or placed at depths affected by user selection and control, or system determination of optimal display potential based on technical details and/or aesthetically based programming parameters.

What is created herein, includes a virtually infinite collaborative image creation system, only limited by the number if image(s) and/or camera(s) and data sampling devices contributing, that have provided information related to and area featuring at least one shared object/subject. Imaging inferring programming can enable the reference by users of actual and/or inferred imagery, including that familiar to morphing between available images to create intermediate "fictional" imagery, and the Mowry expansion image inferring, enabling lower resolution imagery to inform the creation of fictional higher resolution images between available higher resolution images, such as those taken at a slower frame rate.

In enabling such image reference and creation, a user might navigate by system controls, provided by application for example, through a space and "take" a photo within the space that he prefers, that includes and/or is based on imagery contributed by multiple devices that at different time(s) captured useful aspects of the visual environment. Indeed, depth of field can be affected by the best captures of aspects destined for the "background" of a final image; and color might be selected from imagery taken at sunset, rather than noon, for the preferred aesthetic result informed by actual imagery captured.

Such image manipulation and creation by way to cloud data accessed may happen at or around the time of image capture by a user who is at least capturing data related accessible imagery of the same visual area. And/or the image creation herein may be accomplished by that user, or another member who is not one of the users capturing that visual scene, by referencing available imagery and data by linked computing device such as a laptop accessing the cloud by log in to the application.

Herein further is demonstrated the new create and/or commercial market enabled by the present system, cloud and application:

Using value related points, cash (represented by amounts) and/or bit coin or the equivalent, each user may selectively participate in creating and/or contributing to imagery in relation to providing and/or receiving value/compensation.

In one configuration, a user is and/or is prompted to provide imagery to the cloud. This is provided with, or without represented compensation, and/or compensation potential, relative to the permission and transmission(s) valued by the cloud.

A high value scene, such as a performance or subject of cloud anticipated public curiosity, may even prompted a user to capture imagery based on his position and potential for providing desired media. Further, the public may be sampled or otherwise informing the value and/or desire for such a contribution by a user, either live or by way of previously received preference and/or request information and/or media purchased including imagery related to the subject (or location). Indeed, bidding and even pre-purchase commitments, may be made for actual and/or potential imagery contributions.

Users providing imagery may also be included, compensated or otherwise valued based on a social, professional and/or creative status known or made known to the system by user(s). Thus, an "A1" photographer who is at the scene of a historic event, or who reaches a once inaccessible location, may already have or become associated with a higher degree of media contribution compensation than another user who is not as highly ranked by cloud parameters and/or previous or current, even elicited, feedback from other user(s). Indeed, even a single user knowing and or becoming aware that such imagery may be or become accessible, may order and impact the current or future value of imagery being captured, having been captured or to be captured by a relevant user.

Indeed, in navigating an environment on a laptop, until the perfect 2d or 3d image or video sequence is selected from actual and/or inferred imagery from actual contributing user data, a user may be "charged" or deducted a value of 74 cents which may be, for example, dispersed by system parameters and guidelines between the 7 contributing still and/or video providers, whose imagery impacted the final media generated by the media "buying" and/or creating user.

Further user creating reach is demonstrated by being able to preview, incorporate, adjust and manipulated the contribution(s) of others (and or devices) to available relevant real, or inferred, data about a subject, scene, area, etc. For example, even limiting the creation to a moment or time period, in which still and/or motion media was captured, can enable event or visual specific result. Thus, a storm creating remarkable light and clouds around the Eiffel Tower, may still provide 39 contributors of relevance to possible image creation, from that key time period of special visual and/or even interest.

Had that user not used the expert imagery of the 7'th "professional" level contributor, for example, his final picture and/or video would have cost only 36 cents, providing 6 cents to each "standard" contributor, avoiding the premium 38 cents necessary to include the pro's media. Such pro status may be determined by system/cloud relevant parameters These may include previous interest in that provider's media, other users' feedback and/or ratings of the image provider, and/or other system criteria related to media value and/or interest generated by the user otherwise.

It is important to indicate, that I such a multi-media and multi user system, still and video imagery may be generated from user(s) who provided still and/or video media. Including but not limited to, a single still image providing detail or imagery repeated in a sequence of video frames. Also including but not limited to, a sequence of video images providing individual or multiple aggregate frame data contributions to a single, or multiple, images generated by an image referring (and creating) user as a photo and/or video sequence.

The present system essentially represents a new and distinct creative and/or commercial market for creating and/or buying user generated media, including and/or reference from still and/or motion imagery (digital imagery).

Indeed the "copyright" of each contributor may be allowably released, for the contribution and according to system rules/parameters, in the creation of distinct new copyright media.

Further, user of such system unique media, generated from the data contribution(s) of others, may have limits in its use, or have parameters in such use affecting compensation, (ie the exchange of value between image using and image providing members at least). Further, users who have not providing imagery by camera may provide other services for contribution, such as enhancing a user's imagery or image request, from other user(s) or device(s) provided photos and/or data. Again, a new marketplace of image sharing, for the purpose of hybrid imagery from and/or referencing compatible contributions, including imagery of a common "thing" area, or visual, is created herein.

As cameras and system strive to grow the resolution and image capture potential of single devices, a system herein is provided that recognizes that others have, are or will be capturing imagery of the same subject and/or area, as stills, video, 2d, 3d or other captures. Herein, others taking or having taken photos of video, may enhance, or improve, their captures through the free permissible, and/or compensated use, of other's imagery and/or data contributions. Even the potential is provided to end up with the "lottery winners" of imagery, including those accidentally capturing a natural disaster or other fleeting, or special interest temporal even, themselves or in tandem with others, may experience high value by bids or other system criteria managing supply, demand and/or general and even special value parameters. Such value may even be determined by users, and not yet known to the system, based on determined interest in media associated with a special event, making topical and not just image quality relevance for contributed imagery/media and related information, which may include but not be limited to reporting or verbal/literal matter accompanying such imagery.

Further, some imagery may be provided "free" from members, and referencing may be selectively limited to such. Other images, such as from contributors proven and/or recognized to be high value contributors, and/or those requiring compensation for the user of their contributions, may be included in an overall image and/or video creation by a user or such image creation might even be limited to such "expert" (or other value level(s)) media providers, to improve the potential final image results, for example.

Thus, herein a media, capture (aspects) data, user value, and rights management system is also provided in an additional configuration. In yet another configuration, a media providing user might capture imagery of a supermodel, or other high value subject. In such a scenario, a commercial creation of a single or multi-contributor media version may result. Such a media provider, might designate a threshold of value to at least generate imagery from the high value imagery, if not designate additional value necessary to exchange to user the imagery in advertising or related media.

In one important version, the user of a contributor's media is tracked across at least the accessible digital realm, by way of reference data associated with the media and or signature(s) unique to aspects of the media, such as data represented within the face portion of the supermodel imagery. Thus, unreported and improperly used imagery by a user, directly or within composite image creations, may be tracked and thus impact that user account or membership adversely, or otherwise "cost" the user who did not self report and buy "up front." For example, a determined use not paid prior, may be 5× (of other penalty) in cost, when discovered by computing later. This important system use managing operability may further enable, by cloud creation of the images, the full signature of final imagery created by users, and the respective system known contribution (by % for example) of user to a final image creation result.

As an aspect of system value, such final imagery may in one configuration be tracked across the accessible digital media realm, including advertising and entertainment media, to at least report uncompensated use of such imagery and/or to automatically dock users for such use, according to rules. This, even if their final image creation was not used by them, in one configuration, encouraging the policing of new media creations with the same responsibility as professional photographers must track their own unique imagery.

Thus, in yet another configuration, a system for generating unique media from multiple user contributions is provided. And a system for generating this unique media and is provided, including the determination and compensation of those relevant contributors, based on parameters that may include determined value associated with the imagery, the users capturing and/or providing the imagery, the subject(s) in the imagery, the use of the composite media, among other options.

Further, the of some imagery may have more standard, such as "flat" fees for using it regardless of the other media "mixed" by user selection, to generate final imagery. For example, a photographer photographing a model may be the one paying the model; dozens of others may be shooting the scene, from other angles. The photographer shooting the model may get a flat fee for use of his imagery, and or the use of other imagery known to the system to be associated with his provider account. For example, a media provider may indicate to the cloud that the scene is a restricted rights area, controlled by him. Others taking imagery in tandem, simultaneously or otherwise, may be alerted wirelessly to their device(s) then or later to a linked device used by to access the cloud and related user account, may be prompted about, or to acknowledge, the compensation and/or rights restriction necessary for the other providing user to use even one's own captures of such rights restricted subjects. In one example, such a scenario may be determined by location and time, as indeed a "model" will exit that area and the rights protected timeframe specific to the subject model, will end.

This illustrates the valuable potential for system trafficking of media and related valuables, that may be permanently and/or temporarily ascribed to an area by time or other system acknowledged criteria. Indeed users applying for such criteria, agreeing to it, or being notified of it such as during image capture(s) illustrate the additional layers of control, permissions and commercial potential enabled uniquely by this system, this applications, and confluence of still image, video or motion media, and contributing data devices enabling unique image creation and management associated with a scene, area or subject (at least).

Figure 38:
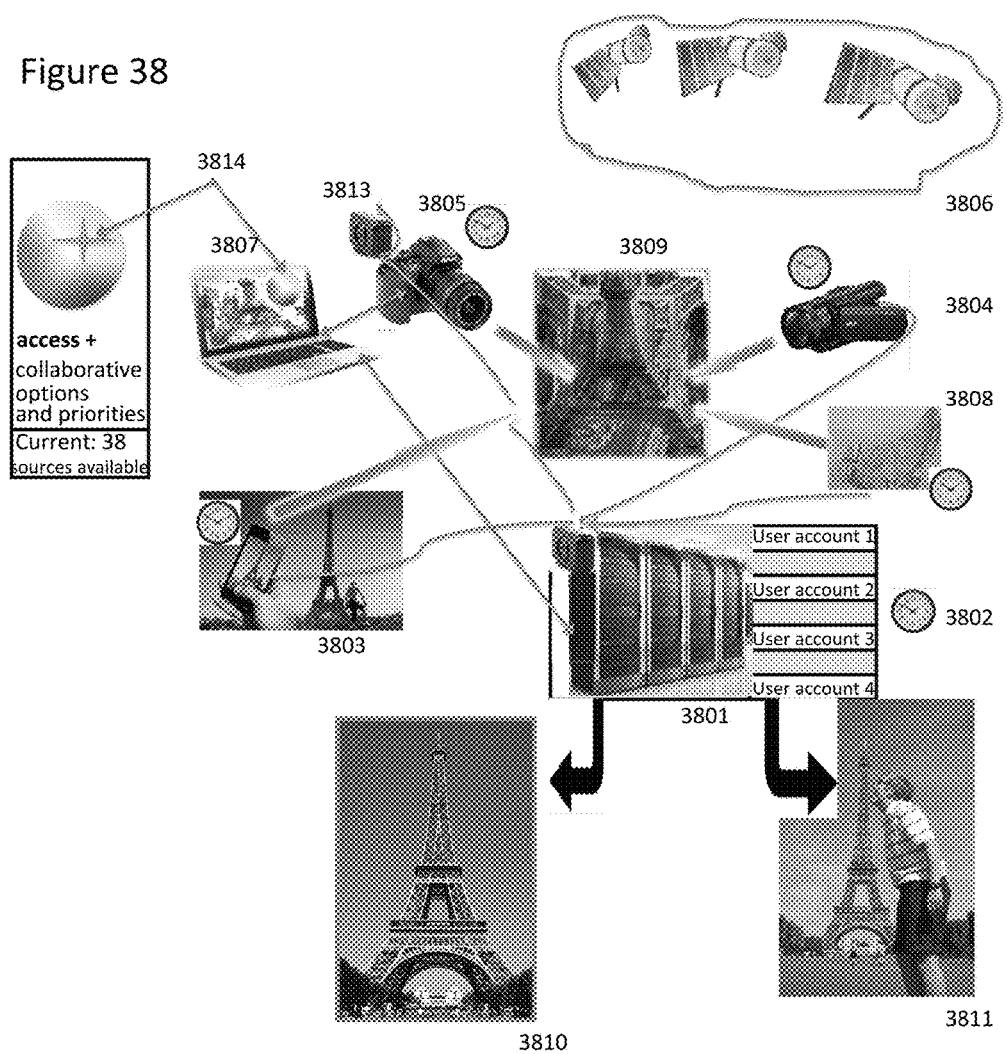
Figure 1:
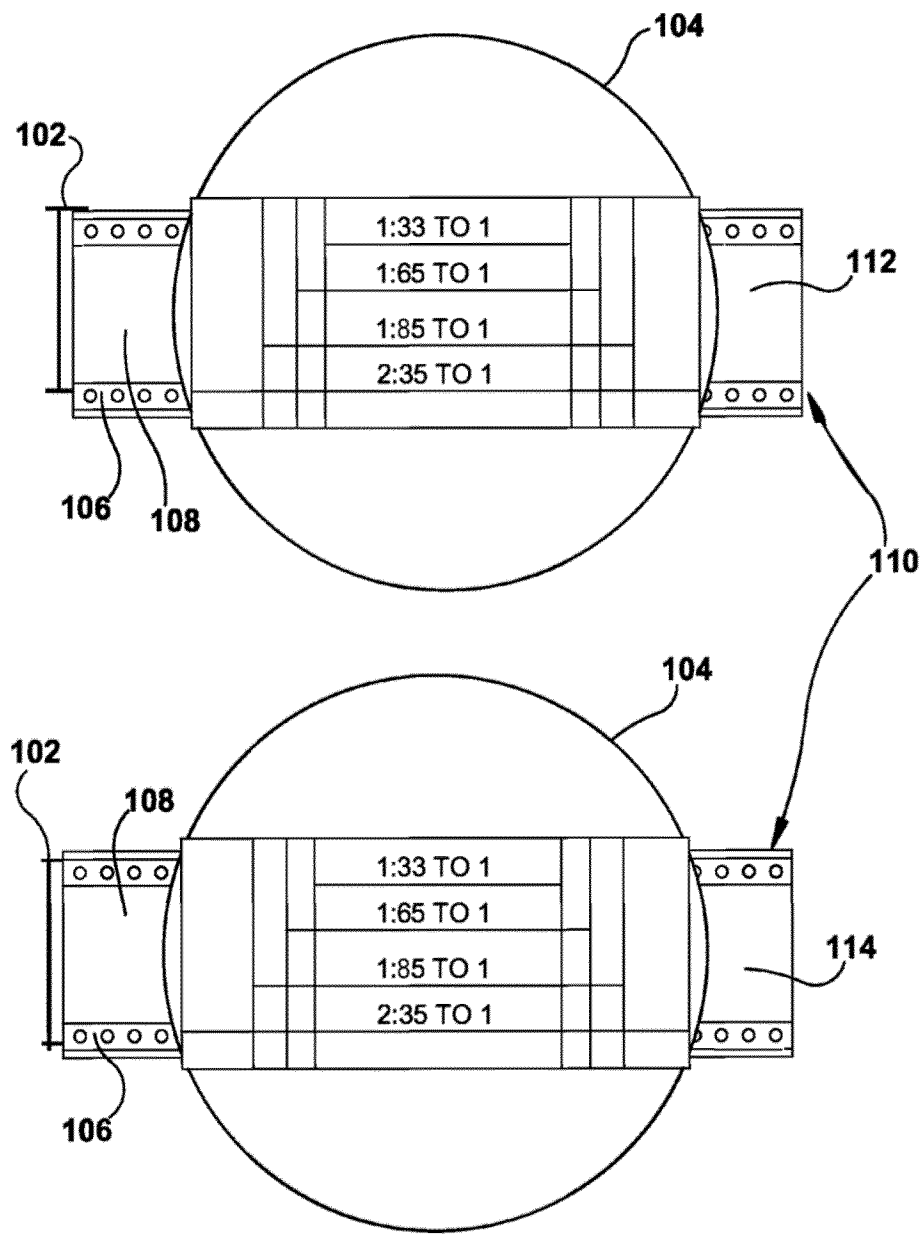
Figure 8:
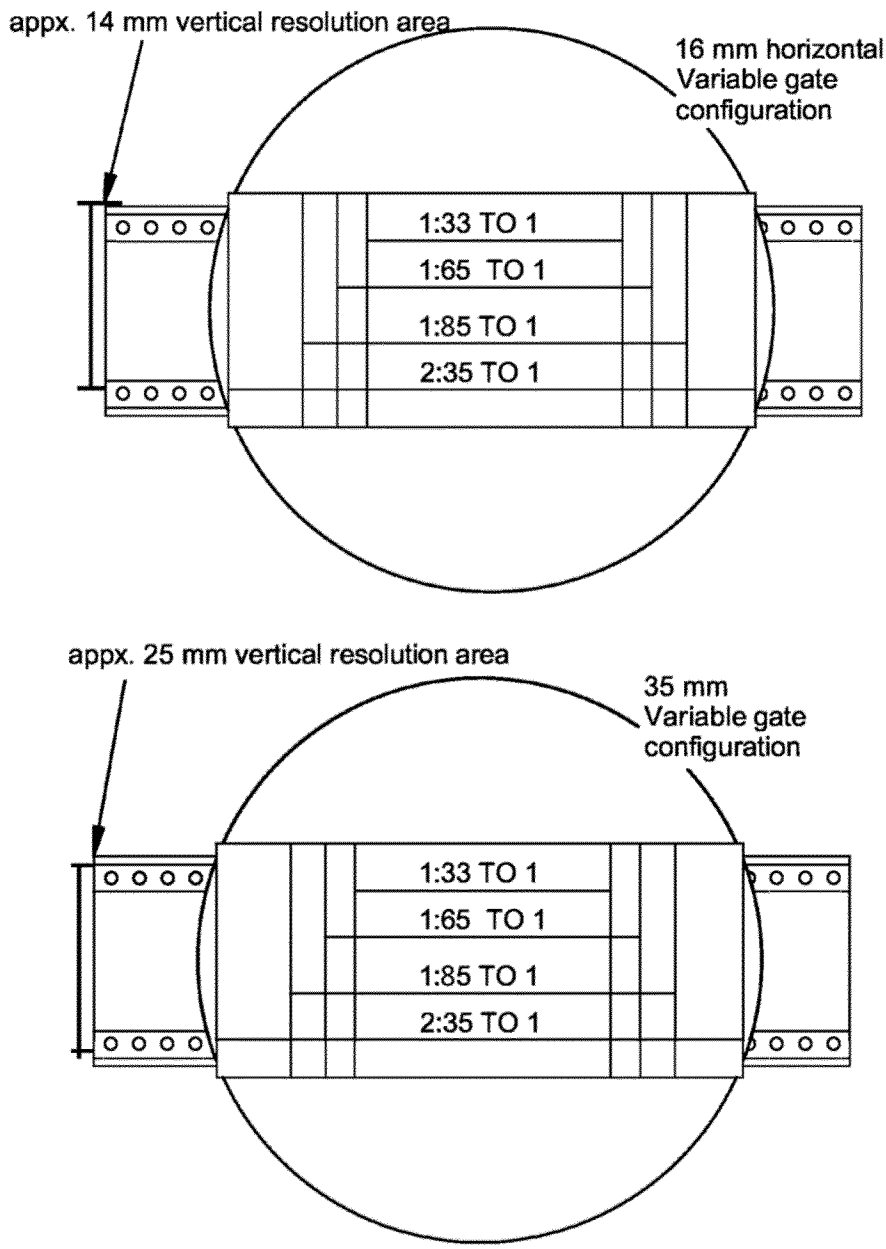

Referring, now, to FIG. 38, a configuration of the present invention and a representative range of contributing components is shown. Featured is a subject area with a primary object, the Eiffel Tower and environs. Multiple imaging and/or sampling devices demonstrate many configurations governed by a central computing hub, managing a range of media, positional data, user account and temporal information among other information.

Cloud computing 3802 manages information received and transmitted by wireless communications module(s) 3812, which may be local and/or remote to the system. Wired communications, such as those providing internet access herein for computer 3807, are shown. Of many user accounts, including users who have provided visual media to the system and those who have not, are databased and managed by "cloud" computing 3802 (or the equivalent) with linked database(s). Herein, 4 user accounts related to 4 members of the media sharing, and in some configurations the value sharing (and transacting) community are shown.

Featured user accounts, 1 through 4 managed by cloud 3802, are respectively associated visual media contributed and or user generated (via the cloud) through devices camera 3805 with it's wireless communications capability/module 3812, video camera unit 3804, imaging smartphone 3803, environmental positional and/or spatial data sampling device 3808, GPS satellite references and programming 3806, and user laptop 3807 operated by a "user 4" in relation to user account 4 housed at cloud 3802. Laptop 3807 and variable media collaboration control 3814, feature a configuration of user determined engagement of one or more other media sources having imaged the Eiffel Tower based on variables including but not limited to device position, device angle/attitude relative to the horizon (and or external, measurable constant) time, color, clarity, framing, angle, or other qualitative aspect(s) valued by the system relative to the contributed media, the device, the contributing user, special event, or other variable(s).

In some configurations, users 4 and/or other users who are generating collaboratively informed (hybrid) imagery including within their system linked camera (before during or after saved capture(s), may indicate/control variables of importance relating to imaging priorities including but not limited to: resolution; focus; focal priorities; lighting and/or related color, brightness, contrast; time of visual contribution capture; quality of contributors; cost; and/or subjective results previewed a such variables may be manipulated and/or changes to which contributing media sources are engaged, to what degree and under what additional selected (and/or system managed) parameters or constraints.

Given the myriad and virtually infinite number of 2d, 3d and 3rd party imaging aspects that may be referenced or engaged, in a preferred configuration at least one user and/or system parameter group is imposed in the user selection of contributing media to view, preview or engage in creating new hybrid (custom) media. Further, automated options may even permit the cloud to control variables of at least the camera and/or mechanized supporting gear, (including drone, tripod head and other) to optimize camera setting, resolution, focus, cropping and position in some cases where the user is willing the benefit to contributing system desired media may outweigh user control or preference. Further, default compensation, such as point rewards, bit coin, currency or the like, and/or solicited permissions (and or actions) may affect imagery captured and compensation to the related user contributor at least.

Herein, User 4, providing compensation to all 3 other users herein and several others, by virtue of selected collaborative engagement variable switch 3814, has generated a video sequence of his brother licking the tower from a variety of sources including video and still image from camera 3805, taken a month earlier, to generate a crystal clear Eiffel Tower at a more attractive time of day "color wise" on the metal of the structure, with remarkable depth of field. In this case, that single still image 3809, was relied on for multiple video frame revision, providing clarity to a range of video frames. Further, the media is enabled, unlike user 4's limited video sequence capture originally, to have many points of 2d and 3d exploration, allowing a simple image to be zoomed in to (focal change) to almost any point in the image, without image degradation and while opening even more options, as the exploration of the environment focuses more heavily on other users' imagery and the unique parameters and options each may provide as each is relied on more heavily, respectively.

Indeed, herein a contributing user and/or a home user of the application based service, may maneuver in 2d and or 3d, through the subject area and while referencing time or other details, or not, "take a picture or video" at any point that may include one or more contributors, known to him or otherwise. In this instance, user 4 chose to not be limited to the "freely permitted and available media" that many users provided, in exchange in one configuration for barter to access media they desire and/or as an unrestricted contribution to the system cloud. User 4 engaged an image from device 3805 and user 1, namely still 32 megapixel visual 3810, which required compensation for that high quality (pro) contributor, resulting in an especially professional new media, hybrid result.

A point value was taken from User 4 in this case, most which was conveyed to User 1 by cloud computing 3802, in this case when user 4 engaged the "save media" option, making permanent a preview and releasing the previewed media as new copyright protected imagery of user 4, as "released" by the contributors. When user 4 later created another image using another professional's visuals within the composite, unique media creation, the copyright was restricted allowing for the creation of a unique image(s) for user 4, but as one contributor was not willing to even sell the imagery for advertising or entertainment use, the copyright was clearly restricted and shown as such and a warning that media used publicly was traceable by unique visual code and/or visual digital data fingerprint, and either a high fee, loss of membership, restriction of membership or warning among other options could apply to any such use restrictions, according to system parameters.

In another case, the use of the media was agreed and released by system determined fee based on media providing user preset parameters and in another case, based on a system prompted request for release and "terms" from the provider. Further, unlicensed or over use of the media a year later was determined by the cloud, as engaged to the digital ecosystem, and a warning and then a severe additional fee was charged to the unlicensed user's account based on use beyond what was agreed.

Another image that a user used permissibly, involved a visibly higher fee than others, made apparent as he moved toggle 3814 over the variable "contributors" field and discovered a great result involving a special photographer's contribution. Herein, part of that expense related to the premium status of the media, as the user was alerted by the system during the time he was positionally within range of the Tower, as determined by his device 3805 as informed by GPS contributing modules 3806, that moving to a certain angle and getting a specific cropping of the Tower would have a premium payment aspect, completing system valued coverage of the area and or specially ordered media from at least one other user. Even bids, enabling contributing users to compete and work to inform the system with better and better media, and more desirable coverage, are managed by cloud 3802 to engage users and contributors to discover, engage, share and created new types of hybrid media, more valuable in ways than any one vantage point or single photographer/videographer might have been able to acquire, at one time or even over a range of time(s).

Indeed, a superior areal visual of the tower by drone operated by another user, capture 3809, ended up netting the contributor over $1,000 after a period of time, due to the extensive use of his contribution and image file(s) entirely or in part, by those engaging the value system to use his imagery entirely and/or engage his data to improved 2d or 3d still and/or motion imagery they generated with cloud managed image generating capability and dedicated programming.

As the contributors and users become more and more adept at the media and/or value sharing system, advertising and promotion appears for at least media and then contributors themselves. For example, as a member user images the Eiffel Tower, a small option or indicator of available media, even a thumbnail, shows the imagery form the air within the accessible database(s) of cloud 3802, and the bit coin or cash (or other value) used to promote the imagery by the provider generates far more value/revenue, from those liking the accessible image and incorporating it or some of it's attributes into their media creations.

Indeed, in some instances photographers whose imagery was too dark, blurry or poorly captured find clarity, color and artistic range beyond what their software and digital files alone could provide before the reach of incorporating other data pertinent to the same subject(s) capture over time(s) by other media contributors, who in one configuration are all or in part compensated and whose contributions affect not only unique media creations but unique "packages" of rights managed micro-media releases, enabling a single use to affect a pool of people connected by the present system as an application, web site and/or interactive venue accessible by wireless and/or wired connectivity and synched componentry belonging to users who usually do not know each other, before discovering their mutual membership and interest(s).

Further, profiles and related information gleaned, accessed and/or actively provided by user/members, may broaden the basis of searching for media, including connecting with media provider(s) and/or other users, by virtue of personal aspects and information, or prior transactions, opening a new market of social discovery and potential commercial and personal interaction around a common media, location, topical or human aspect that is shared and made accessible or searchable, by parameters provided to users of the system herein. In some configurations, this may be to grow user experience and interest of the system. In others, that may be a factor and/or the primary objective may be to generate more bases for exchange of at least media and/or value, provoking engagement and user of the system, growing the richness and scope of the system database, revenue and/or aspects of the user(s) accounts and accrued (or committed) value.

Although the foregoing invention has been described in some detail by way of illustration and example for purposes of clarity of understanding, it will be readily apparent to one of ordinary skill in the art in light of the teachings of this invention that certain changes and modifications may be made thereto without departing from the spirit or scope of the appended claims.

What is claimed is:

1. A method, comprising:
receiving, by a system including a processor, first image data of a scene captured at a first resolution;
receiving second image data of the scene captured at a second resolution less than the first resolution;
identifying an object represented by a portion of the first image data;
determining a position of the object as represented in the second image data; and
generating a third image of the scene from the first image data and the second image data, wherein the third image represents the object according to the position of the object as represented in the second image data.

2. The method of claim 1, further comprising:
capturing the scene at the first resolution at a first capture rate; and
capturing the scene at the second resolution at a second capture rate greater than the first capture rate.

3. The method of claim 1, wherein the generating the third image of the scene from the first image data and the second image data includes generating the third image having a third resolution greater than the second resolution.

4. The method of claim 1, wherein the generating the third image of the scene from the first image data and the second image data includes generating the third image having a third resolution that is equal to the first resolution.

5. A system, comprising:
an image capture device configured to obtain a first image representing at least one object at a first resolution and obtain a second image representing the at least one object at a second resolution that is different than the first resolution, wherein the position of the at least one object of the first image is represented according to first positional information; and
an image processor configured to:
determine second positional information of the at least one object from the second image that is different than the first positional information; and
generate a third image from the first image and the second image, wherein the position of the at least one object in the third image is represented by the second positional information.

6. The system of claim 5, wherein the image capture device is further configured to obtain positional information of the at least one object represented in at least a portion of the second image, and the image processor is further configured to generate the third image using the positional information of the at least one object.

7. The system of claim 5, wherein the third image includes a third resolution that is greater than the second resolution, and the second resolution is less than the first resolution.

8. The system of claim 5, wherein the image capture device is further configured to capture the first image at a first capture rate, and capture the second image at a second capture rate that is greater than the first capture rate.

9. A non-transitory computer-readable storage medium comprising computer-executable instructions that, in response to execution, cause a device comprising a processor to perform operations, comprising:
receiving first image data of a scene having at least one object located according to first positional information, the first image data having a first resolution;
receiving second image data of the scene having the at least one object located according to second positional information, the second image data having a second resolution lower than the first resolution; and
generating third image data of the scene from the first image data and the second image data wherein the receiving the second image data includes receiving the second image data including a plurality of frames captured of the scene at sequential times, and wherein the generating the third image data of the scene includes generating a same number of frames as the plurality of frames that have a resolution greater than the second resolution.

10. The non-transitory computer-readable storage medium of claim 9, wherein the operations further comprises: capturing the first image data of the scene at a first frame rate; and capturing the second image data of the scene at a second frame rate that is greater than the first frame rate.

11. The non-transitory computer-readable storage medium of claim 9, wherein the generating the third image data includes generating the third image data based on the first positional information and the second positional information.

* * * * *

UNITED STATES PATENT AND TRADEMARK OFFICE
CERTIFICATE OF CORRECTION

| | | |
|---|---|---|
| PATENT NO. | : 10,341,558 B2 | Page 1 of 3 |
| APPLICATION NO. | : 15/419810 | |
| DATED | : July 2, 2019 | |
| INVENTOR(S) | : Craig P. Mowry | |

It is certified that error appears in the above-identified patent and that said Letters Patent is hereby corrected as shown below:

In the Drawings

FIG. 1 should be replaced with the attached FIG. 1.

Figure 8:
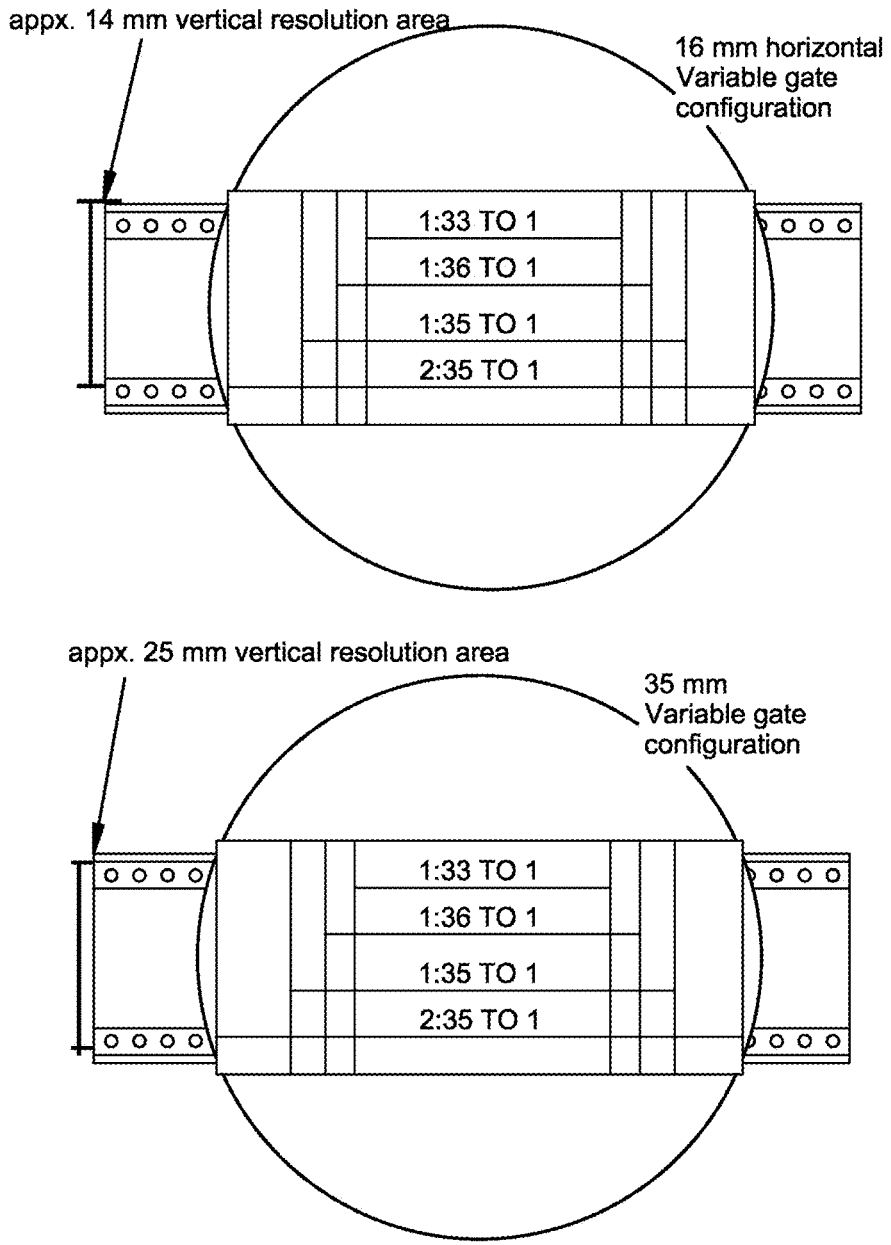
FIG. 8 shows a variable horizontal film gate in a camera.
Figure 9:
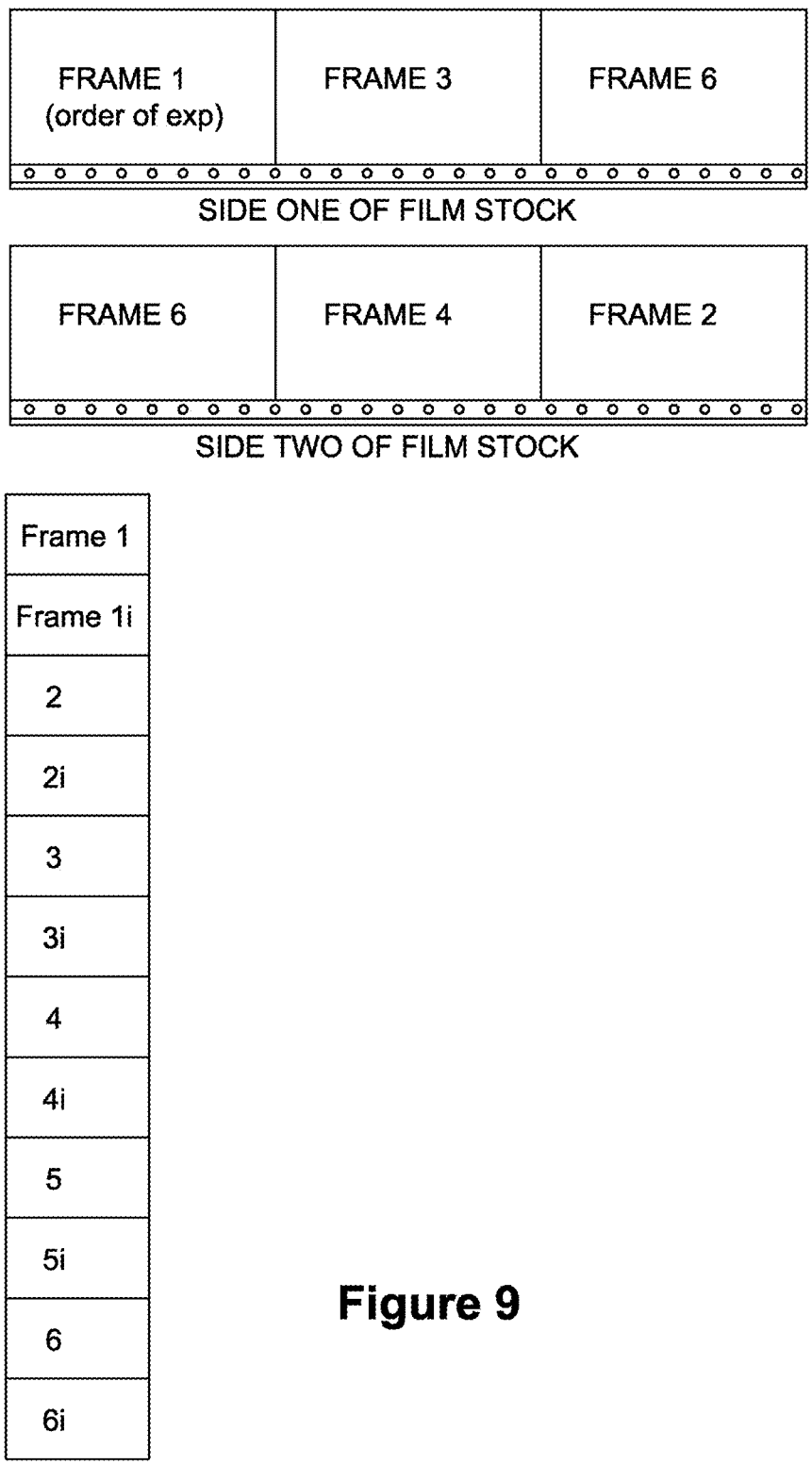
FIG. 9 shows data code referencing on film stock for post production reference.
Figure 11:
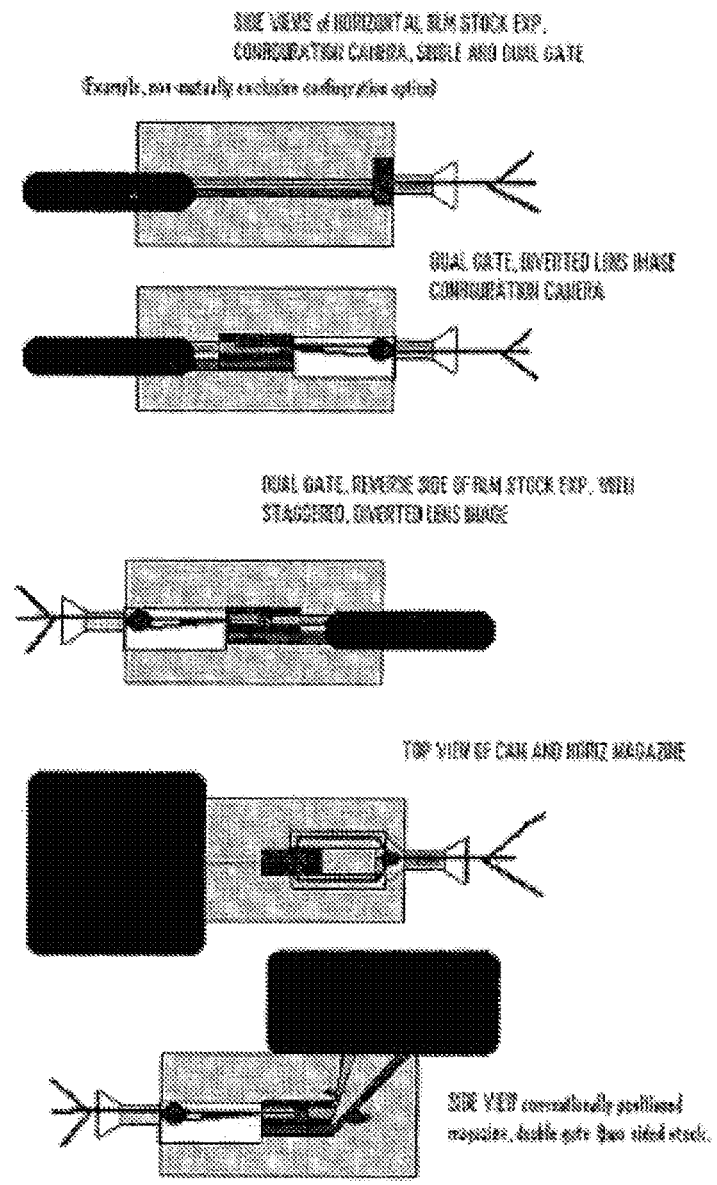
FIG. 11 shows top view and side view of horizontal film stock configuration in camera.
Figure 12:
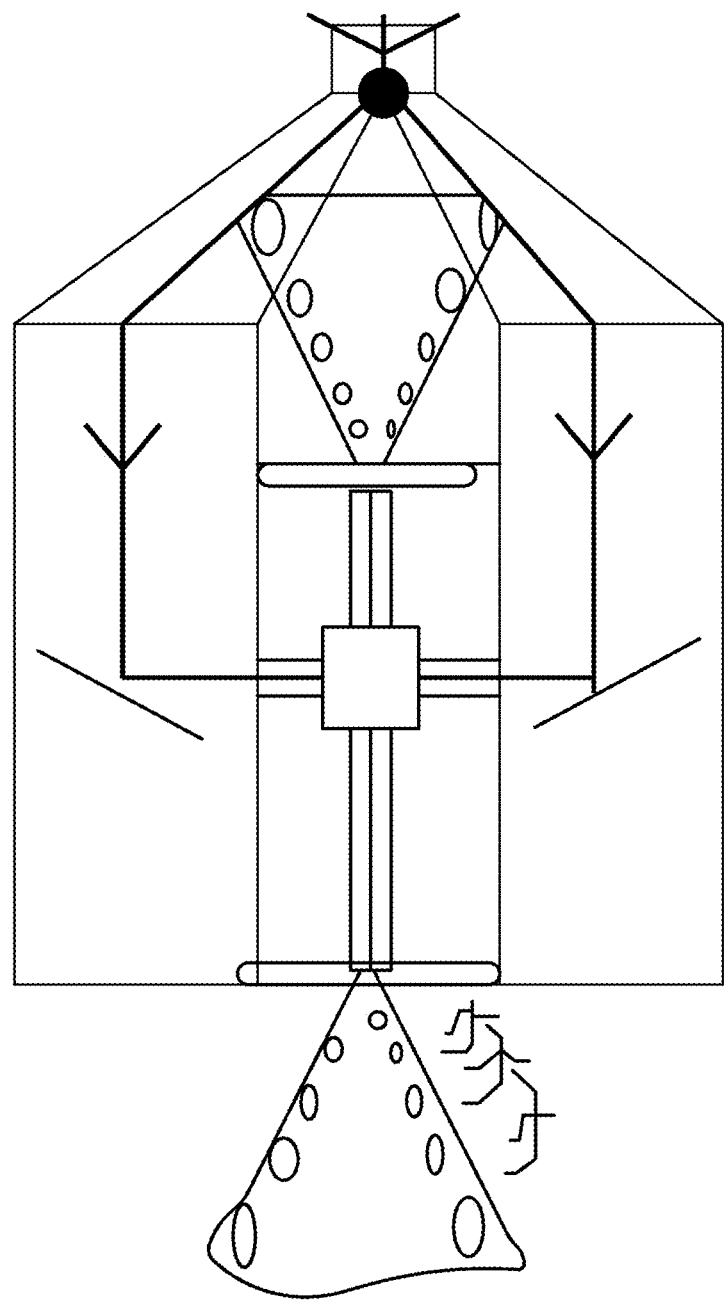
FIG. 12 shows a top view of a dual gate to expose double sided film stock in a camera.

FIG. 8 should be replaced with the attached FIG. 8.

Signed and Sealed this
Twenty-sixth Day of November, 2024

Katherine Kelly Vidal
*Director of the United States Patent and Trademark Office*